(12) United States Patent
Schwengler et al.

(10) Patent No.: US 10,330,882 B2
(45) Date of Patent: Jun. 25, 2019

(54) APICAL RADIATOR

(71) Applicant: CenturyLink Intellectual Property LLC, Denver, CO (US)

(72) Inventors: Thomas Schwengler, Lakewood, CO (US); Michael L. Elford, Calhoun, LA (US); Michael P. Winterrowd, Calhoun, LA (US); Thomas C. Barnett, Jr., Atchison, KS (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 687 days.

(21) Appl. No.: 14/973,460

(22) Filed: Dec. 17, 2015

(65) Prior Publication Data
US 2016/0109678 A1    Apr. 21, 2016

Related U.S. Application Data

(63) Continuation-in-part of application No. 14/517,574, filed on Oct. 17, 2014, and a continuation-in-part of
(Continued)

(51) Int. Cl.
*H04M 1/00* (2006.01)
*G02B 6/50* (2006.01)
(Continued)

(52) U.S. Cl.
CPC ........... *G02B 6/504* (2013.01); *G02B 6/4451* (2013.01); *G02B 6/4459* (2013.01);
(Continued)

(58) Field of Classification Search
CPC ........ Y10T 29/49718; Y10T 29/49826; G02B 6/504; G02B 6/4416; G02B 6/4442; G02B 6/4451; G02B 6/4459; G02B 6/4466
See application file for complete search history.

(56) References Cited

U.S. PATENT DOCUMENTS 2,754,101 A   7/1956   Haworth et al.
4,034,567 A   7/1977   Roggen
(Continued)

FOREIGN PATENT DOCUMENTS

CA   2337284   8/2002
FR   2750717   1/1998
(Continued)

OTHER PUBLICATIONS

U.S. Appl. No. 14/316,665; Notice of Allowance dated May 19, 2017; 15 pages.
(Continued)

*Primary Examiner* — Nhan T Le
(74) *Attorney, Agent, or Firm* — Adsero IP

(57) ABSTRACT

Novel tools and techniques are provided for implementing FTTx, which might include Fiber-to-the-Home ("FTTH"), Fiber-to-the-Premises ("FTTP"), and/or the like. A method might include routing an F1 line(s) from a central office or DSLAM to a fiber distribution hub ("FDH") located within a block or neighborhood of customer premises, via at least an apical conduit source slot. From the FDH, an F2 line(s) might be routed, via any combination of various apical conduit components, to a network access point ("NAP") servicing one or more customer premises. An F3 line(s) might be distributed, at the NAP and from the F2 line(s), to a network interface device ("NID") or optical network terminal ("ONT") at each customer premises, via any combination of the apical conduit components, which include channels in at least portions of roadways. In some embodiments, at least one wireless access point is disposed in each of one or more channels.

25 Claims, 52 Drawing Sheets

Related U.S. Application Data application No. 14/578,851, filed on Dec. 22, 2014, and a continuation-in-part of application No. 14/316,676, filed on Jun. 26, 2014, now Pat. No. 9,780,433.

(60) Provisional application No. 62/127,701, filed on Mar. 3, 2015, provisional application No. 62/188,100, filed on Jul. 2, 2015, provisional application No. 61/893,034, filed on Oct. 18, 2013, provisional application No. 61/939,109, filed on Feb. 12, 2014, provisional application No. 61/874,691, filed on Sep. 6, 2013.

(51) Int. Cl.
*H02G 3/08* (2006.01)
*G02B 6/44* (2006.01)
*H04W 88/06* (2009.01)

(52) U.S. Cl.
CPC .......... *G02B 6/4467* (2013.01); *H02G 3/083* (2013.01); *G02B 6/4416* (2013.01); *G02B 6/4442* (2013.01); *G02B 6/4466* (2013.01); *H04W 88/06* (2013.01); *Y10T 29/49718* (2015.01); *Y10T 29/49826* (2015.01)

(56) References Cited

U.S. PATENT DOCUMENTS

| | | | |
|---|---|---|---|
| 4,329,083 A | 5/1982 | Parkinson |
| 4,815,814 A | 3/1989 | Ulijasz |
| 4,940,359 A | 7/1990 | Van Duyn et al. |
| 5,239,129 A | 8/1993 | Ehrenfels |
| 5,313,546 A | 5/1994 | Toffetti |
| 5,528,684 A | 6/1996 | Schneider et al. |
| 5,566,622 A | 10/1996 | Ziaylek, Jr. et al. |
| 5,583,492 A | 12/1996 | Nakanishi |
| 5,606,606 A | 2/1997 | Schneider et al. |
| 5,760,706 A | 6/1998 | Kiss |
| 5,879,109 A | 3/1999 | Diermeier et al. |
| 6,099,080 A | 8/2000 | Hirashita et al. |
| 6,272,346 B1 | 8/2001 | Fujinami |
| 6,371,691 B1 | 4/2002 | Finzel et al. |
| 6,414,605 B1 | 7/2002 | Walden |
| 6,499,410 B1 | 12/2002 | Berardi |
| 6,503,025 B1 | 1/2003 | Miller |
| 6,807,355 B2 | 10/2004 | Dofher |
| 6,829,424 B1 | 12/2004 | Finzel et al. |
| 6,866,448 B2 | 3/2005 | Finzel et al. |
| 6,990,192 B1 | 1/2006 | Denovich et al. |
| 7,050,683 B2 | 5/2006 | Dofher |
| 7,095,930 B2 | 8/2006 | Storaasli et al. |
| 7,514,628 B2 | 4/2009 | Kadrnoska et al. |
| 7,522,805 B2 | 4/2009 | Smith et al. |
| 7,674,980 B2 | 3/2010 | Lubanski |
| 7,740,417 B2 | 6/2010 | Jang |
| 7,849,886 B2 | 12/2010 | Carew et al. |
| D640,290 S | 6/2011 | Stellman et al. |
| 8,061,344 B2 | 11/2011 | Dofher |
| 8,480,332 B2 | 7/2013 | Miller |
| 9,062,423 B2 | 6/2015 | Allouche et al. |
| 9,226,418 B2 | 12/2015 | Magno et al. |
| 9,270,098 B2 | 2/2016 | Isaacks et al. |
| 9,531,174 B2 | 12/2016 | Elford et al. |
| 9,588,315 B1 | 3/2017 | Turner |
| 9,742,172 B2 | 8/2017 | Elford et al. |
| 9,780,433 B2 | 10/2017 | Schwengler et al. |
| 9,786,997 B2 | 10/2017 | Schwengler et al. |
| 2002/0057945 A1 | 5/2002 | Dahowski et al. |
| 2002/0061231 A1 | 5/2002 | Finzel et al. |
| 2003/0123935 A1 | 7/2003 | Dofher |
| 2003/0210958 A1 | 11/2003 | Nothofer |
| 2004/0115004 A1 | 6/2004 | Serrano |
| 2004/0129445 A1 | 7/2004 | Winkelbach |
| 2004/0142658 A1 | 7/2004 | McKenna |
| 2004/0221324 A1 | 11/2004 | Ansari et al. |
| 2004/0234215 A1 | 11/2004 | Serrano et al. |
| 2005/0013566 A1 | 1/2005 | Storaasli |
| 2005/0191113 A1 | 9/2005 | Frazier |
| 2005/0191133 A1 | 9/2005 | Purcell |
| 2005/0207711 A1 | 9/2005 | Vo |
| 2005/0259930 A1 | 11/2005 | Elkins et al. |
| 2005/0285807 A1 | 12/2005 | Zehngut |
| 2006/0008231 A1 | 1/2006 | Reagan |
| 2006/0093303 A1 | 5/2006 | Reagan et al. |
| 2006/0118338 A1 | 6/2006 | Maybury, Jr. |
| 2006/0204187 A1 | 9/2006 | Dofher |
| 2007/0018849 A1 | 1/2007 | Salser, Jr. |
| 2007/0154152 A1 | 7/2007 | Morris |
| 2008/0298755 A1 | 12/2008 | Caplan |
| 2009/0177172 A1 | 7/2009 | Wilkes |
| 2009/0214163 A1 | 8/2009 | Lu |
| 2009/0317047 A1 | 12/2009 | Smith |
| 2010/0010117 A1 | 1/2010 | Bricout |
| 2010/0047021 A1 | 2/2010 | Scola |
| 2010/0071596 A1 | 3/2010 | Konczak |
| 2010/0086254 A1 | 4/2010 | Dofher |
| 2010/0243096 A1 | 9/2010 | Berglund et al. |
| 2011/0016754 A1 | 1/2011 | Ruhl et al. |
| 2011/0052131 A1 | 3/2011 | Park et al. |
| 2011/0315259 A1 | 12/2011 | Kelly |
| 2012/0048148 A1 | 3/2012 | Konczak |
| 2012/0195694 A1 | 8/2012 | Konczak |
| 2012/0268886 A1* | 10/2012 | Leontiev .......... G06K 19/07749 361/679.31 |
| 2013/0011198 A1 | 1/2013 | Pichler |
| 2013/0044918 A1 | 2/2013 | Nielsen et al. |
| 2013/0121761 A1* | 5/2013 | Dixon .................. E01C 11/222 404/3 |
| 2013/0216187 A1 | 8/2013 | Dowling |
| 2013/0216313 A1 | 8/2013 | Gustavsson et al. |
| 2013/0223807 A1 | 8/2013 | Elford et al. |
| 2013/0287500 A1 | 10/2013 | Miller |
| 2013/0294839 A1 | 11/2013 | Gustavsson et al. |
| 2014/0146905 A1 | 5/2014 | Zavadsky |
| 2014/0202571 A1 | 7/2014 | Spijker |
| 2014/0270971 A1 | 9/2014 | Allouche et al. |
| 2014/0327583 A1 | 11/2014 | Sparks |
| 2015/0035704 A1 | 2/2015 | Schwengler et al. |
| 2015/0070221 A1 | 3/2015 | Schwengler et al. |
| 2015/0110453 A1 | 4/2015 | Elford et al. |
| 2015/0139598 A1 | 5/2015 | Barnes et al. |
| 2015/0230008 A1 | 8/2015 | Elford et al. |
| 2015/0288161 A1 | 10/2015 | Allouche et al. |
| 2015/0300527 A1 | 10/2015 | Konczak |
| 2016/0064829 A1 | 3/2016 | Schaepperle |
| 2016/0109036 A1 | 4/2016 | Elford et al. |
| 2016/0112779 A1 | 4/2016 | Barnett et al. |
| 2016/0226231 A1 | 8/2016 | Elford et al. |
| 2017/0059802 A1 | 3/2017 | Elford et al. |
| 2017/0110784 A1 | 4/2017 | Vermes et al. |
| 2017/0317482 A1 | 11/2017 | Elford et al. |
| 2017/0358837 A1 | 12/2017 | Schwengler et al. |
| 2017/0358869 A1 | 12/2017 | Schwengler et al. |
| 2018/0084596 A1 | 3/2018 | Schwengler et al. |
| 2018/0136424 A1 | 5/2018 | Elford |
| 2019/0124425 A1 | 4/2019 | Elford et al. |

FOREIGN PATENT DOCUMENTS

| | | |
|---|---|---|
| GB | 2327680 A | 2/1999 |
| JP | H03 139705 A | 6/1991 |
| JP | 10-140507 | 5/1998 |
| WO | WO 99/61710 A1 | 12/1999 |
| WO | WO 02/29947 A1 | 4/2002 |
| WO | WO 2013/130644 A1 | 9/2013 |
| WO | WO 2014/151726 A1 | 9/2014 |

OTHER PUBLICATIONS

U.S. Appl. No. 14/316,676; Notice of Allowance dated May 19, 2017; 12 pages.

(56) References Cited

OTHER PUBLICATIONS

U.S. Appl. No. 14/517,574; Final Rejection dated Mar. 24, 2017; 23 pages.
U.S. Appl. No. 14/973,470; Non-Final Rejection dated Jul. 3, 2017; 34 pages.
U.S. Appl. No. 15/352,869; Non-Final Rejection dated May 15, 2017; 20 pages.
U.S. Appl. No. 13/779,488; Final Rejection dated May 2, 2016; 7 pages.
U.S. Appl. No. 14/517,574; Final Rejection dated Jun. 16, 2016; 15 pages.
U.S. Appl. No. 14/578,851; Non-Final Rejection dated Jun. 8, 2016; 26 pages.
U.S. Appl. No. 14/973,458; Non-Final Rejection dated Jun. 7, 2016; 25 pages.
U.S. Appl. No. 13/779,488; Issue Notification dated Dec. 7, 2016; 1 page.
U.S. Appl. No. 14/316,665; Final Rejection dated Feb. 8, 2017; 17 pages.
U.S. Appl. No. 14/578,851; Non-Final Rejection dated Nov. 17, 2016; 17 pages.
U.S. Appl. No. 14/971,243; Non-Final Rejection dated Dec. 29, 2016; 51 pages.
U.S. Appl. No. 14/973,458; Non-Final Rejection dated Nov. 18, 2016; 21 pages.
European Patent Application No. 14768062.3; Extended European Search Report dated Oct. 18, 2016; 5 pages.
U.S. Appl. No. 13/779,488; Notice of Allowance dated Aug. 16, 2016; 16 pages.
U.S. Appl. No. 14/316,665; Non-Final Rejection dated Aug. 10, 2016; 38 pages.
U.S. Appl. No. 14/316,676; Non-Final Rejection dated Aug. 10, 2016; 43 pages.
U.S. Appl. No. 14/517,574; Non-Final Rejection dated Oct. 21, 2016; 18 pages.
Abram, E.R. and Bowler, N.; Center for Nondestructive Evaluation, Iowa State University, Ames, IA, USA; "Effect of relative humidity on the curing and dielectric properties of polyurethane-based composites"; 2005 Annual Report Conference on Electrical Insulation and Dielectric Phenomena; pp. 457-460.
Lejun Qi, Linnea Petersson & Tieliang Liu (2014) Review of Recent Activities on Dielectric Films for Capacitor Applications, Journal of International Council on Electrical Engineering, 4:1, 1-6, DOI: 10.5370/JICEE.2014.4.1.001.
International Search Report and Written Opinion prepared by the U.S. Patent and Trademark Office as International Search Authority in PCT International Patent Application No. PCT/US2014/026325, dated Aug. 8, 2014; 12 pages.
International Search Report and Written Opinion prepared by the U.S. Patent and Trademark Office as International Searching Authority for PCT International Patent Application No. PCT/US2013/0280 dated May 3, 2013; 20 pages.
PCT International Patent Application No. PCT/US20141026325, International Preliminary Report on Patentability dated Sep. 15, 2015; 8 pages.
Preliminary Report on Patentability for PCT International Patent Application No. PCT/US2013/0280 dated Sep. 12, 2014; 13 pages.
Publication Notice of PCT International Patent Application No. PCT/U/26325; dated Sep. 25, 2014; 1 page.
U.S. Appl. No. 13/779,488; Final Rejection dated Sep. 24, 2015; 9 pages.
U.S. Appl. No. 13/779,488; Final Rejection dated Feb. 9, 2015; 9 pages.
U.S. Appl. No. 13/779,488; Non-final Rejection dated Feb. 17, 2016; 13 pages.
U.S. Appl. No. 13/779,488; Non-final Rejection dated Jun. 11, 2015; 11 pages.
U.S. Appl. No. 13/779,488; Non-final Rejection dated Sep. 10, 2014; 11 pages.
U.S. Appl. No. 13/779,488; Requirement for Restriction/Election dated May 30, 2014; 5 pages.
U.S. Appl. No. 14/209,754; Issue Notification dated Jun. 3, 2015; 1 page.
U.S. Appl. No. 14/209,754; Non-Final Rejection dated Jan. 13, 2015; 16 pages.
U.S. Appl. No. 14/209,754; Notice of Allowance dated Feb. 18, 2015; 11 pages.
U.S. Appl. No. 14/517,574; Non-Final Rejection dated Feb. 26, 2016; 28 pages.
U.S. Appl. No. 14/517,574; Requirement for Restriction dated Jan. 15, 2016; 6 pages.
U.S. Appl. No. 14/746,508; Non-Final Rejection dated Dec. 3, 2015; 16 pages.
U.S. Appl. No. 14/316,676; Non-Final Rejection dated Feb. 14, 2017; 17 pages.
U.S. Appl. No. 14/973,458; Non-Final Rejection dated May 3, 2017; 21 pages.
U.S. Appl. No. 14/578,851; Non-Final Rejection dated May 3, 2017; 19 pages.
U.S. Appl. No. 14/971,243; Notice of Allowance dated Apr. 17, 2017; 23 pages.

* cited by examiner

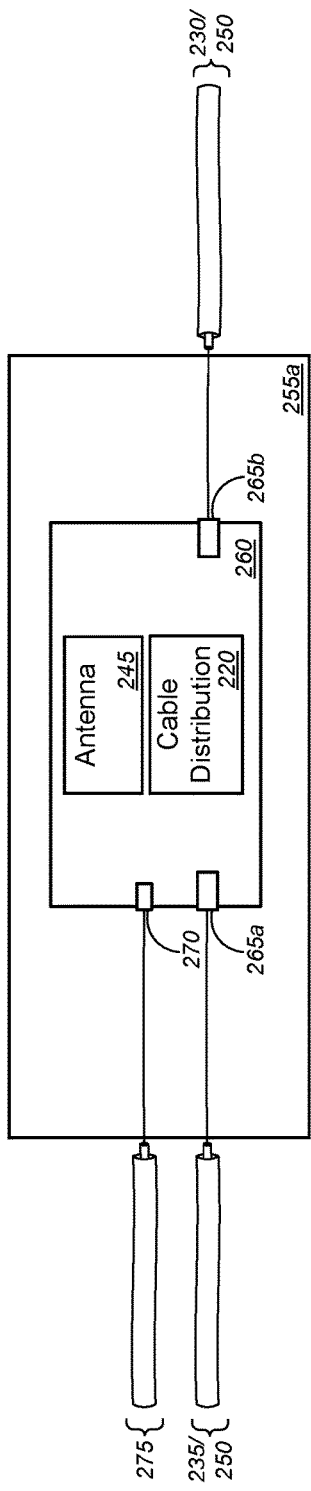
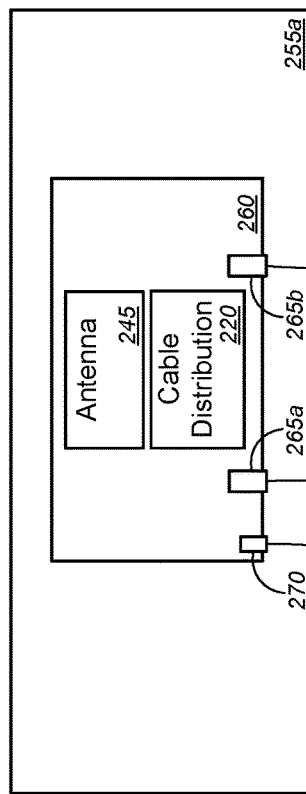
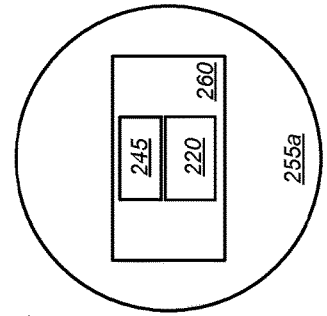
Fig. 2K
Fig. 2L
Fig. 2M

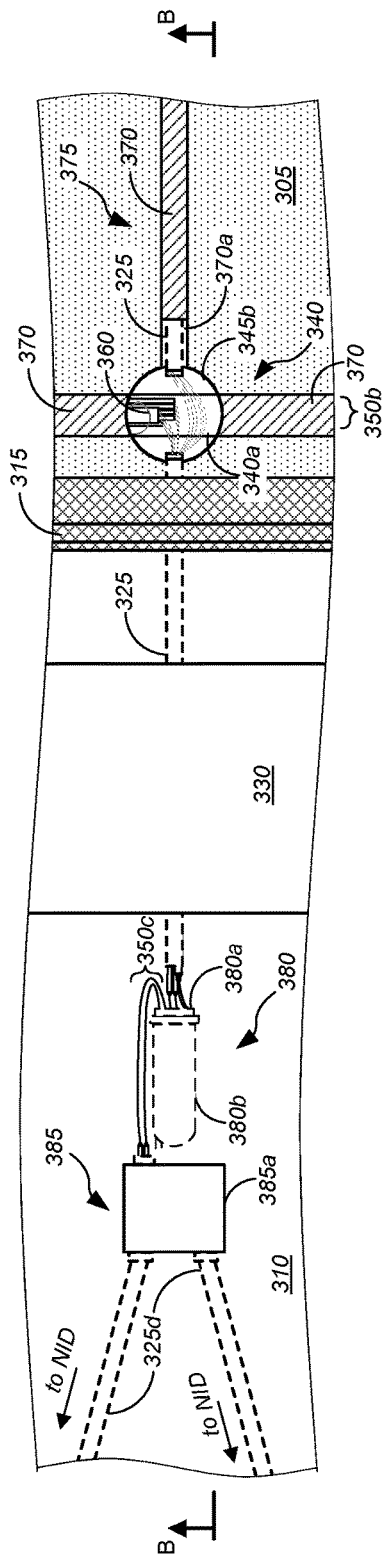
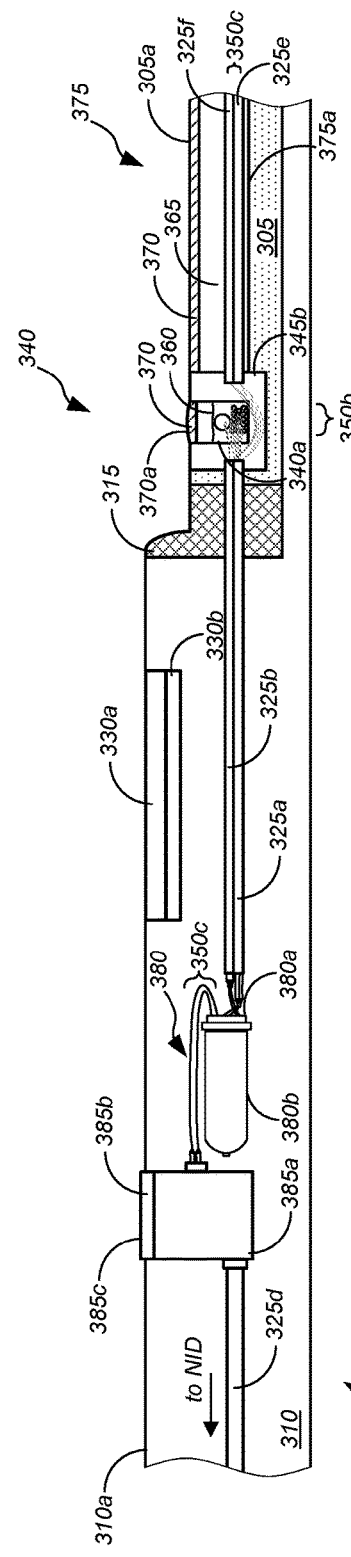
Fig. 4A
Fig. 4B

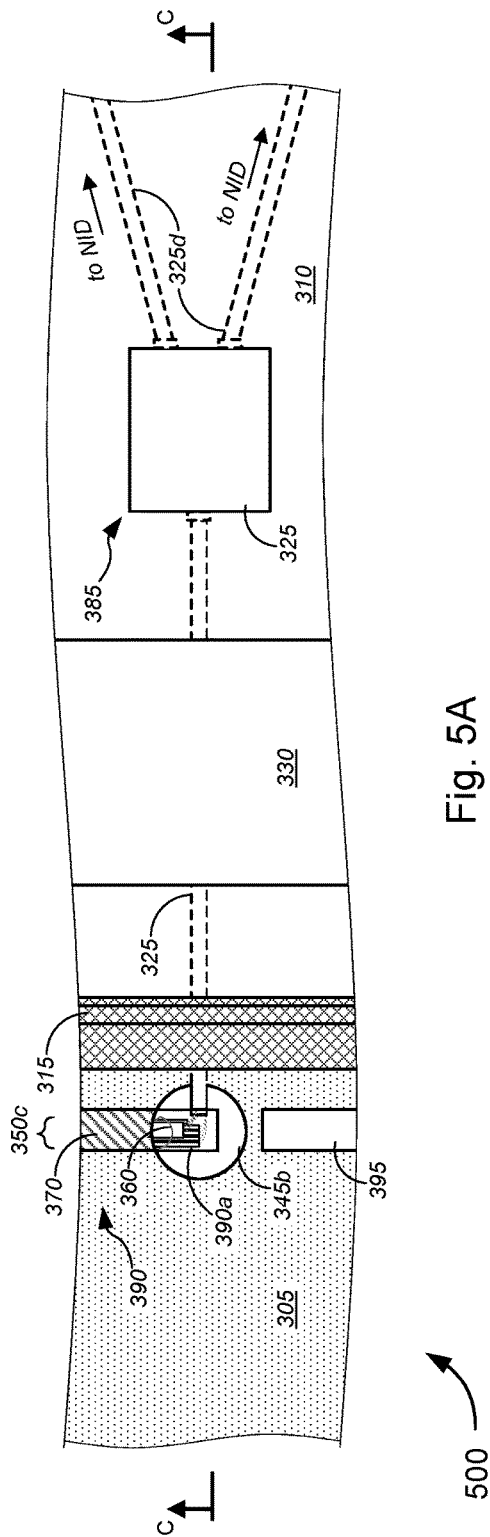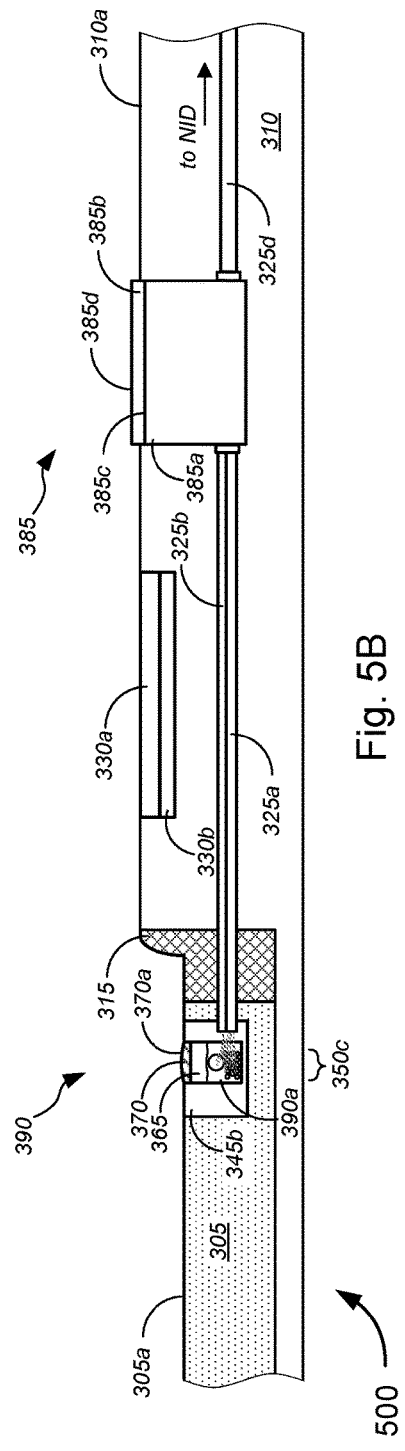

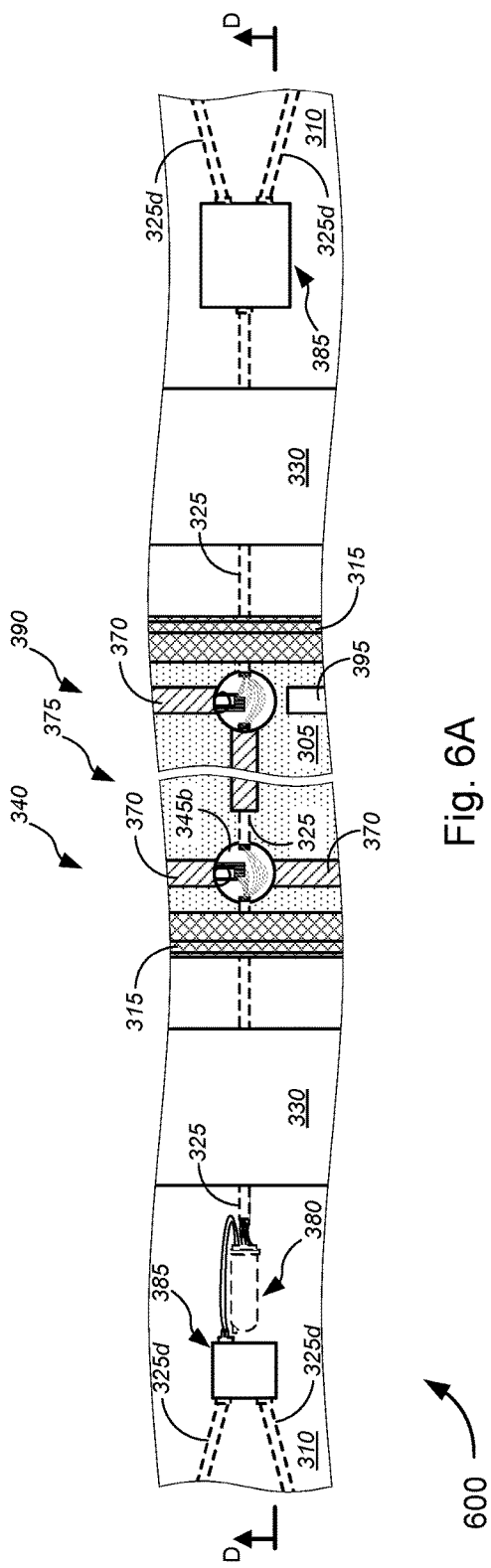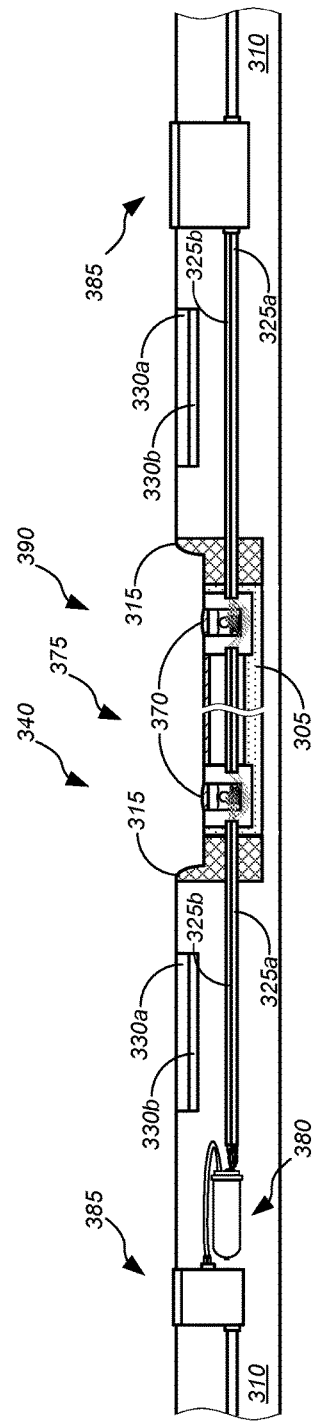

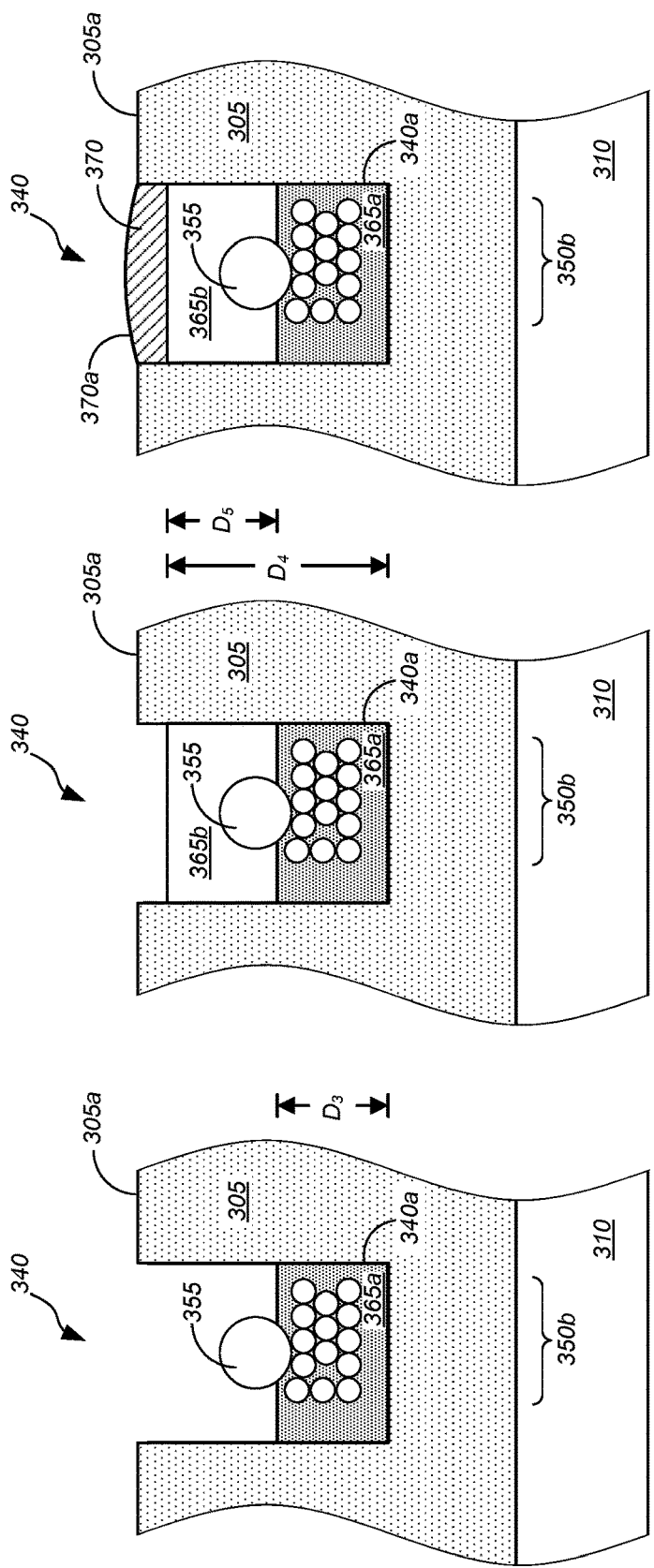

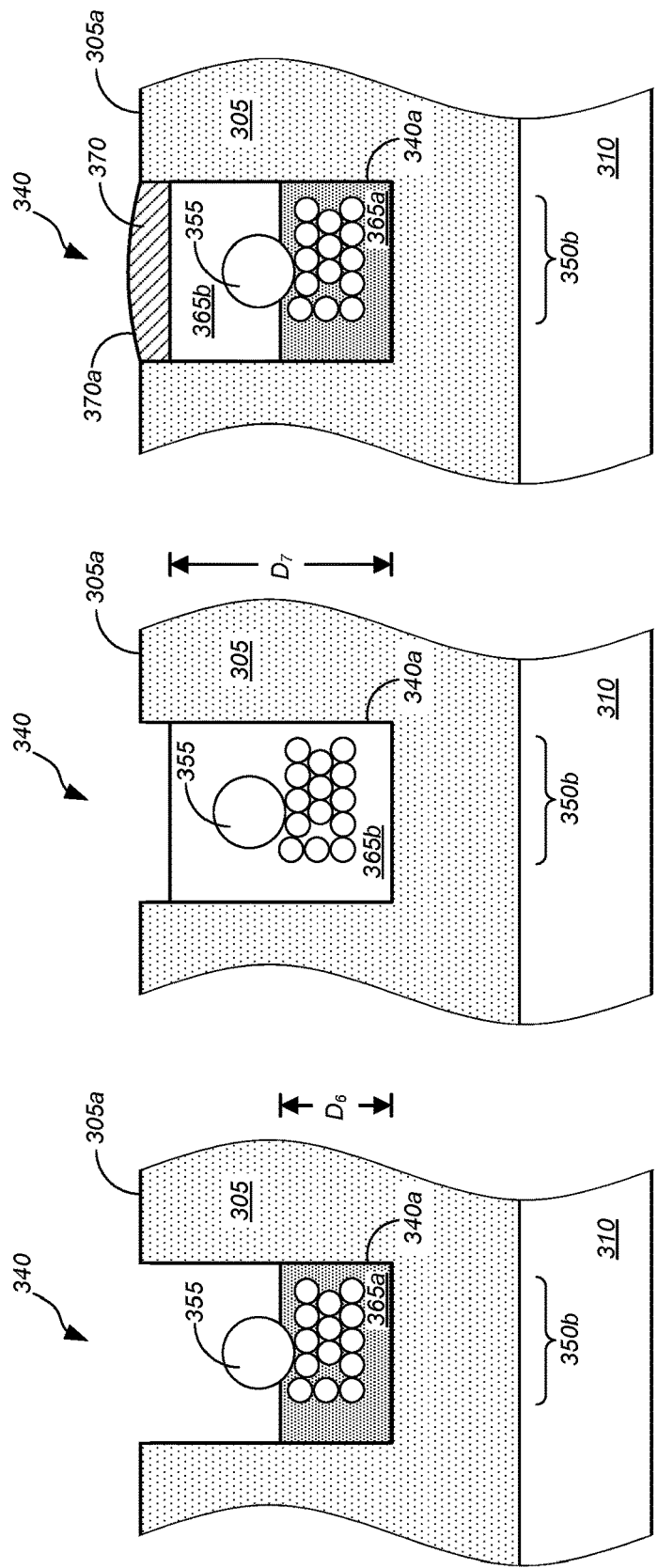

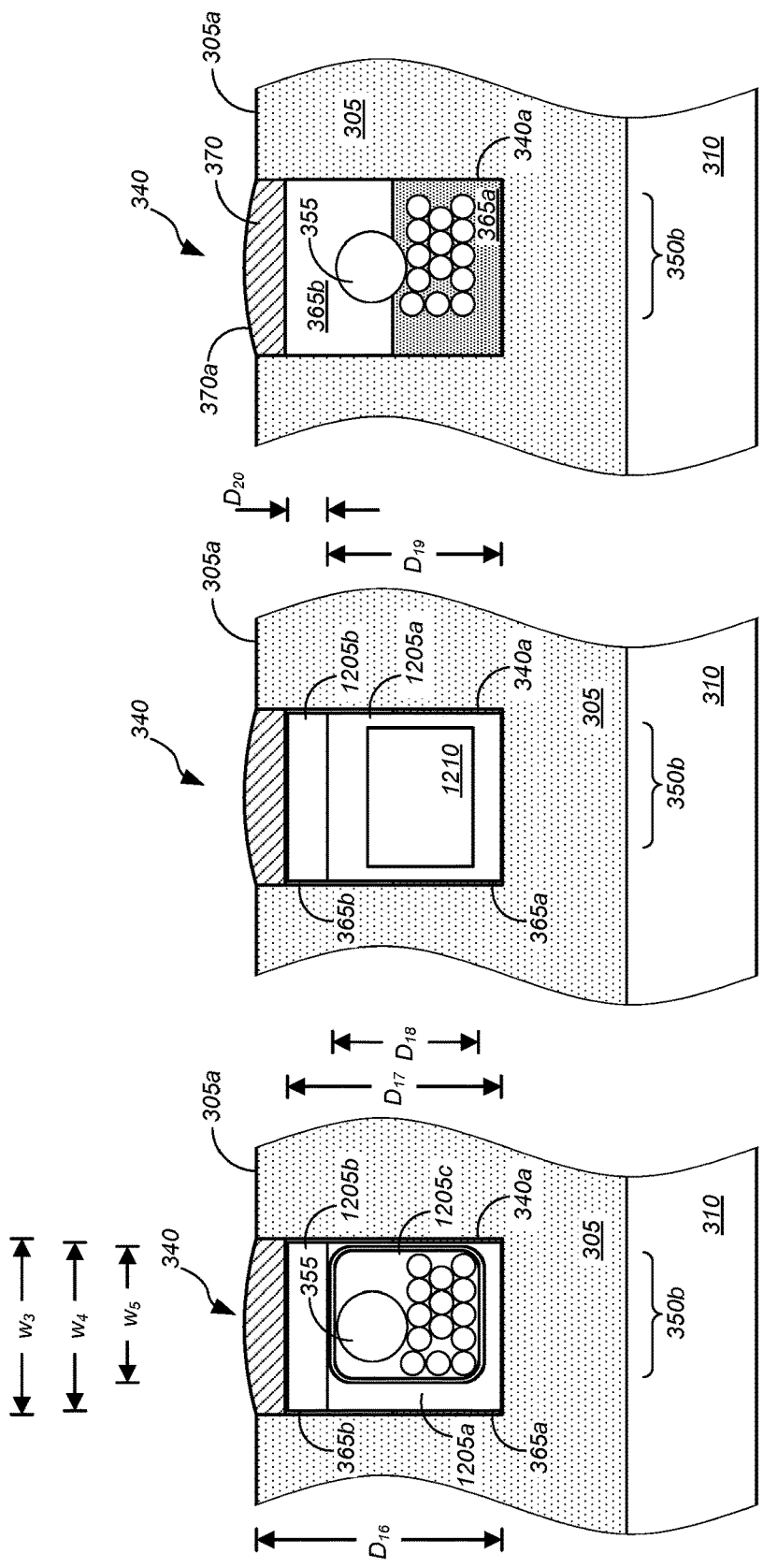

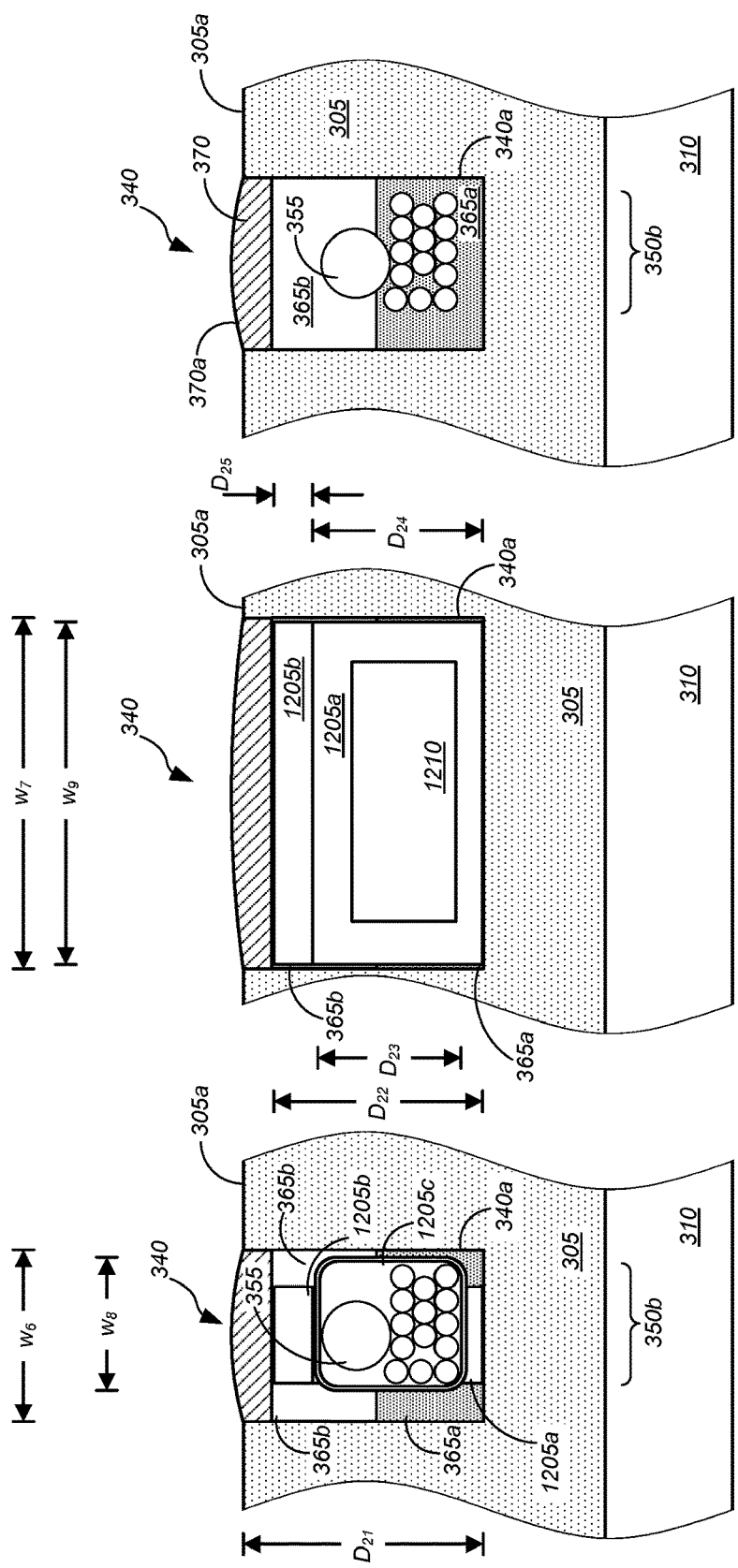

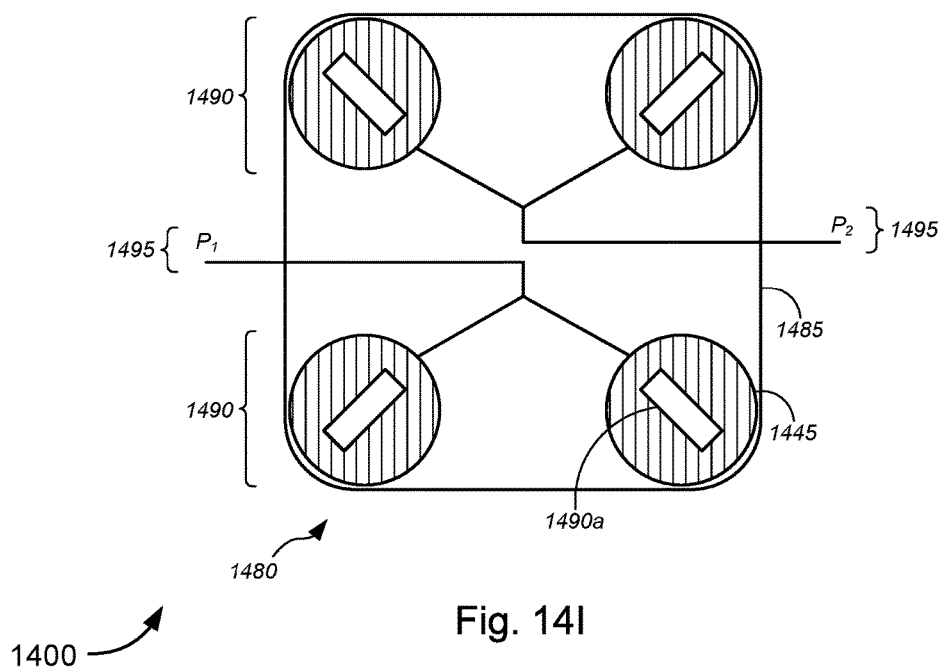
Fig. 14I
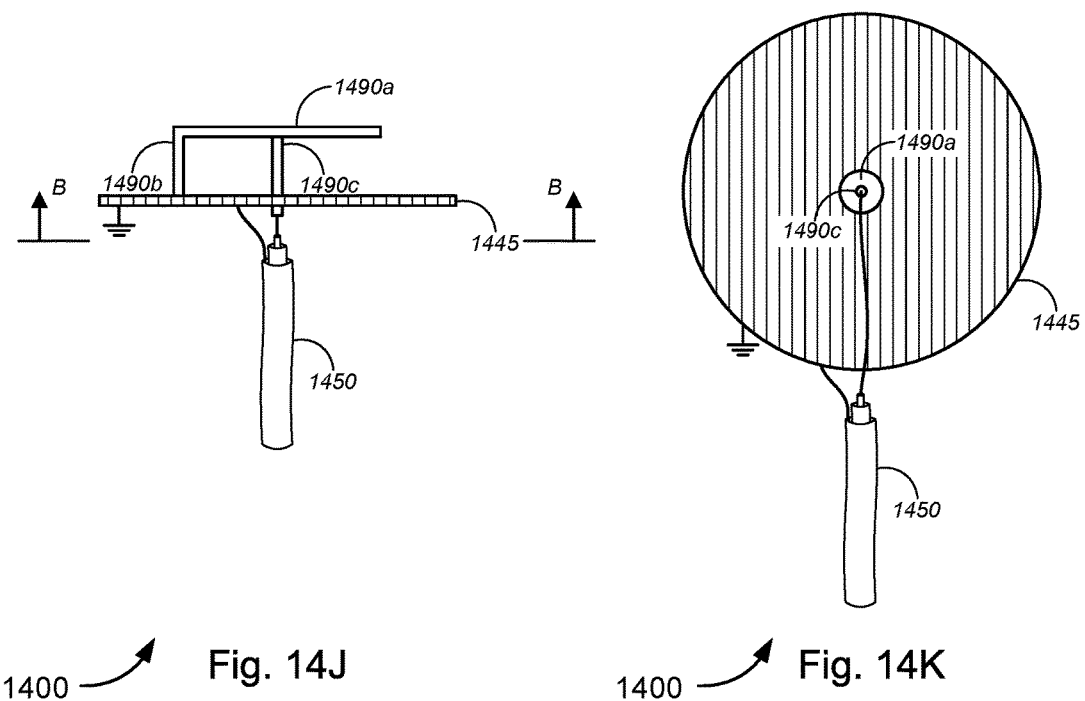
Fig. 14J
Fig. 14K

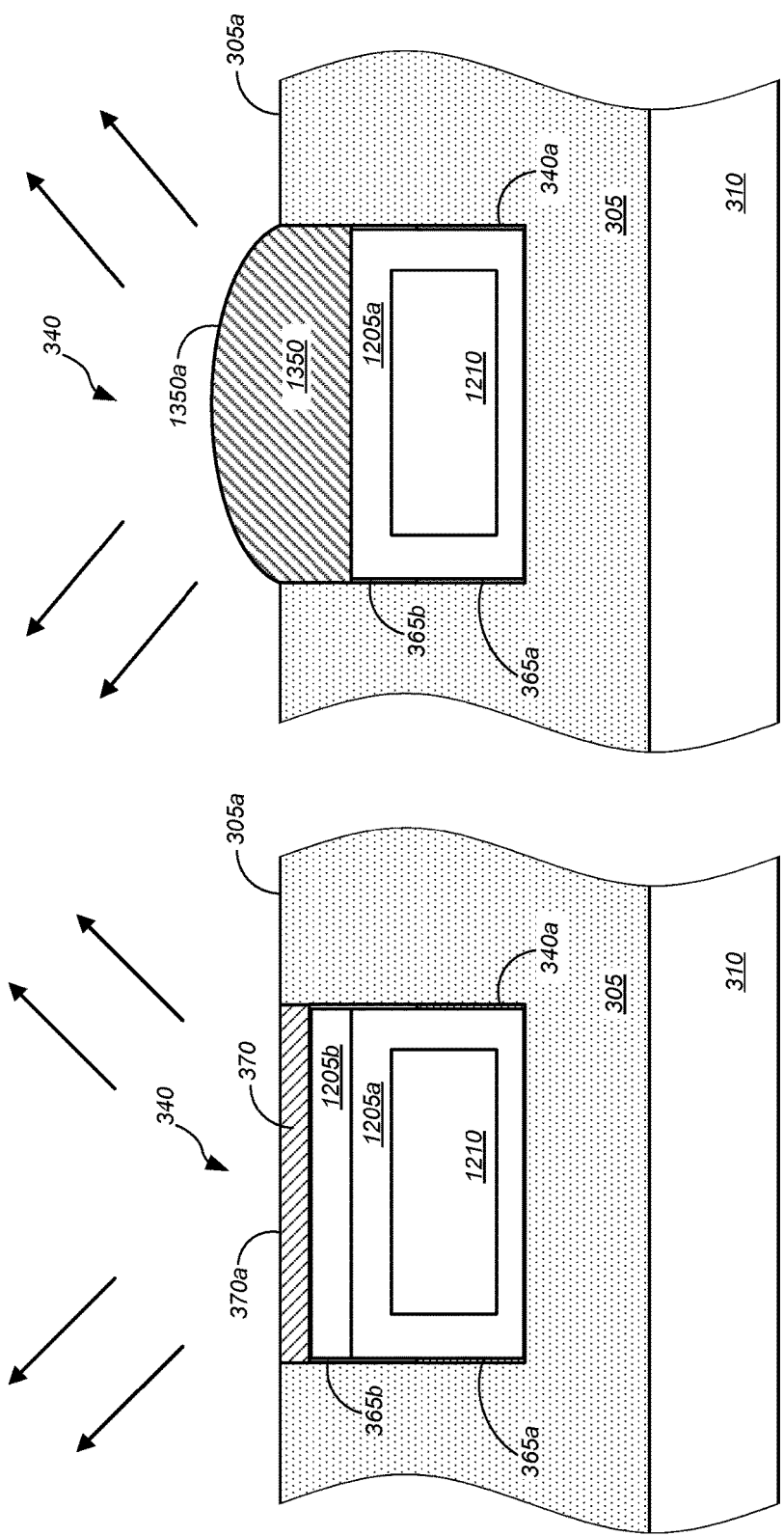

APICAL RADIATOR

CROSS-REFERENCES TO RELATED APPLICATIONS

This application claims priority to U.S. patent application Ser. No. 62/127,701 (the "'701 application"), filed Mar. 3, 2015 by Thomas Schwengler et al., entitled, "Apical Radiator" and U.S. patent application Ser. No. 62/188,100 (the "'100 application"), filed Jul. 2, 2015 by Thomas Schwengler et al., entitled, "Apical Radiator."

This application is a continuation-in-part application of U.S. patent application Ser. No. 14/517,574 (the "'574 application"), filed on Oct. 17, 2014 by Michael L. Elford et al., entitled, "Fiber-to-the-Premises (FTTP) Methods and Systems," which claims priority to U.S. patent application Ser. No. 61/893,034 (the "'034 application"), filed Oct. 18, 2013 by Michael L. Elford et al., entitled, "Fiber-to-the-Home (FTTH) Methods and Systems." This application is also a continuation-in-part application of U.S. patent application Ser. No. 14/578,851 (the "'851 application"), filed Dec. 22, 2014 by Michael L. Elford et al., entitled, "Point-to-Point Fiber Insertion," which claims priority to U.S. patent application Ser. No. 61/939,109 (the "'109 application"), filed Feb. 12, 2014 by Michael L. Elford et al., entitled, "Point-to-Point Fiber Insertion." This application is also a continuation-in-part application of U.S. patent application Ser. No. 14/316,676 (the "'676 application"), filed on Jun. 26, 2014 by Thomas Schwengler et al., entitled, "Wireless Distribution Using Cabinets, Pedestals, and Hand Holes," which claims priority to U.S. patent application Ser. No. 61/874,691 (the "'691 application"), filed Sep. 6, 2013 by Thomas Schwengler et al., entitled, "Wireless Distribution Using Cabinets, Pedestals, and Hand Holes."

This application may be related to U.S. patent application Ser. No. 61/861,216 (the "'216 application"), filed Aug. 1, 2013 by Thomas Schwengler et al. entitled, "Wireless Access Point in Pedestal or Hand Hole"; and U.S. patent application Ser. No. 14/316,665 (the "'665 application"), filed on Jun. 26, 2014 by Thomas Schwengler et al., entitled, "Wireless Access Point in Pedestal or Hand Hole," which claims priority to the '216 application. This application may also be related to U.S. patent application Ser. No. 61/793,514 (the "'514 application"), filed Mar. 15, 2013 by Erez N. Allouche et al. entitled, "Cast-in-Place Fiber Technology"; U.S. patent application Ser. No. 14/209,754 (the "'754 application"), filed Mar. 13, 2014 by Erez N. Allouche et al., entitled, "Cast-in-Place Fiber Technology," which claims priority to the '514 application; U.S. patent application Ser. No. 61/604,020 (the "'020 application"), filed Feb. 28, 2012 by Michael L. Elford et al. entitled, "Apical Conduit and Methods of Using Same," U.S. patent application Ser. No. 61/636,227 (the "'227 application"), filed Apr. 20, 2012 by Michael L. Elford et al., entitled, "Apical Conduit and Methods of Using Same"; and U.S. patent application Ser. No. 13/779,488 (the "'488 application"), filed Feb. 27, 2013 by Michael L. Elford et al., entitled, "Apical Conduit and Methods of Using Same," which claims priority to the '020 and '227 applications.

This application may also be related to U.S. patent application Ser. No. 14/973,470 (the "'470 application"), filed Dec. 17, 2015 by Michael L. Elford et al. et al., entitled, "Apical Filler Layers," which claims priority to U.S. patent application Ser. No. 62/188,110 (the "'110 application"), filed Jul. 2, 2015 by Michael L. Elford et al., entitled, "Apical Filler Layers"; U.S. patent application Ser. No. 14/973,458 (the "'458 application"), filed Dec. 17, 2015 by Thomas C. Barnett, Jr. et al., "Touchless Fiber Network," which claims priority to U.S. patent application Ser. No. 62/127,699 (the "'699 application"), filed Mar. 3, 2015 by Thomas C. Barnett, Jr. et al., entitled, "Touchless Fiber Network"; and U.S. patent application Ser. No. 14/971,243 (the "'243 application"), filed Dec. 16, 2015 by Michael L. Elford et al., entitled, "MediaLink Interconnection Box," which claims priority to U.S. patent application Ser. No. 62/109,757 (the "'757 application"), filed Jan. 30, 2015 by Michael L. Elford et al., entitled, "MediaLink Interconnection Box (MIB)."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing telecommunications signal relays, and, more particularly, to methods, systems, and apparatuses for implementing FTTx, which might include Fiber-to-the-Home ("FTTH"), Fiber-to-the-Building ("FTTB"), Fiber-to-the-Premises ("FTTP"), Fiber-to-the-Node ("FTTN"), Fiber-to-the-Curb ("FTTC"), and/or the like, and more specifically to methods, systems, and apparatuses for establishing wireless access points within a channel of an apical conduit system for implementing FTTx.

BACKGROUND

While pedestals and hand holes have been used in the telecommunications field, Fiber to the Premises ("FTTP") has not (to the knowledge of the inventors and as of the filing of the Related Applications) been implemented from a central office ("CO") or digital subscriber line multiple access ("DSLAM") to customer premises via apical conduit systems that are at least in part set within roadway surfaces. Further, such pedestal and hand hole systems have not been implemented from the CO or DSLAM to a fiber distribution hub ("FDH") in a block or neighborhood of customer premises, and subsequently distributed to network interface devices ("NIDs") or optical network terminals ("ONTs") via network access points ("NAPs"), hand holes, ground-based conduits, and/or the like, using the aforementioned apical conduit systems.

Rather, currently available systems for broadband voice, data, and/or video access within customer premises (whether through wired or wireless connection) typically require a physical cable connection (either via optical fiber connection or copper cable connection, or the like) directly to network access devices or optical network terminals located at (and in most cases, mounted on an exterior wall of) the customer premises, or require satellite transmission of voice, data, and/or video signals to a corresponding dish mounted on the customer premises. Many of these broadband access architectures rely on aerial or buried techniques that do not utilize the potential (both in terms of cost, efficiency, flexibility, system strength and reliability, minimal ecological impact, visual unobstructiveness, and/or the like) of micro-trenching or similar techniques applicable to apical conduit systems. Thus, such systems are costly, difficult to implement, and difficult to repair when damaged.

Further, very little currently exists in terms of antennas in road structures (or in the ground in general). The importance of road milling and re-pavement with respect to antennas in road structures is non-existence.

Hence, there is a need for more robust and scalable solutions for implementing FTTx, including FTTH, FTTB, FTTP, FTTN, FTTC, and/or the like.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 2A-2M are general schematic diagrams illustrating various ground-based signal distribution devices that may be used in implementing FTTP and/or point-to-point fiber insertion within a PON communications system, in accordance with various embodiments.

FIGS. 4A and 4B are general schematic diagrams illustrating various views of a system for communicatively coupling lines within an apical conduit system and lines within a direct bury network access point ("NAP") for implementing FTTP and/or point-to-point fiber insertion within a PON communications system, in accordance with various embodiments.

FIGS. 5A and 5B are general schematic diagrams illustrating various views of a system for communicatively coupling lines within an apical conduit system and lines within a hand hole for implementing FTTP and/or point-to-point fiber insertion within a PON communications system, in accordance with various embodiments.

FIGS. 6A and 6B are general schematic diagrams illustrating various views of a system for communicatively coupling lines within an apical conduit system and lines within a hand hole routed from a NAP through a cross-slot in a road surface for implementing FTTP and/or point-to-point fiber insertion within a PON communications system, in accordance with various embodiments.

FIGS. 7A-7J are general schematic diagrams illustrating various views of application of a tack coat layer(s) for an apical conduit system that is used to implement FTTP and/or point-to-point fiber insertion within a PON communications system, in accordance with various embodiments.

FIGS. 14A-14K are general schematic diagrams illustrating various antennas or antenna designs used in the various ground-based signal distribution devices, in accordance with various embodiments.

FIGS. 16A and 16B are general schematic diagrams illustrating various systems for implementing wireless transmission of signals from a wireless access point within or above a ground-based signal distribution device, in accordance with various embodiments.

DETAILED DESCRIPTION OF CERTAIN EMBODIMENTS

Overview

Figure 1A:
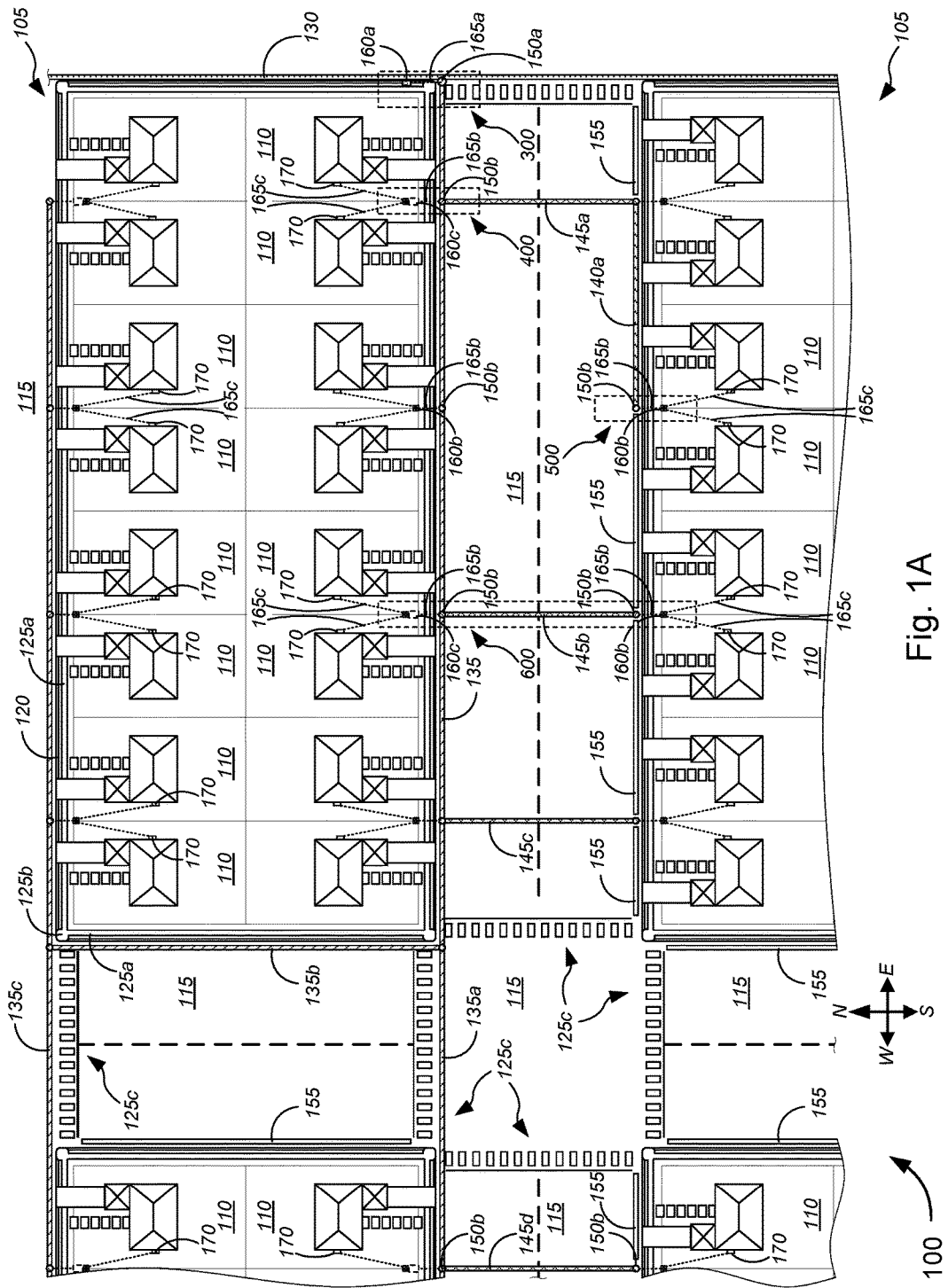
FIGS. 1A and 1B are general schematic diagrams illustrating systems for implementing Fiber-to-the-Premises ("FTTP") and/or point-to-point fiber insertion within a passive optical network ("PON") communications system, in accordance with various embodiments.

Various embodiments provide tools and techniques for implementing telecommunications signal relays, and, in some embodiments, for implementing FTTx, which might include Fiber-to-the-Home ("FTTH"), Fiber-to-the-Building ("FTTB"), Fiber-to-the-Premises ("FTTP"), Fiber-to-the-Node ("FTTN"), Fiber-to-the-Curb ("FTTC"), and/or the like.

In some embodiments, a method might include routing an F1 line(s) from one of a central office ("CO"), a digital subscriber line access multiplexer ("DSLAM"), and/or near/within a block or neighborhood of customer premises (collectively, "source"), to a fiber distribution hub ("FDH") located within the block or neighborhood of customer premises, via at least an apical conduit source slot. From the FDH, an F2 line(s) might be routed, via any combination of apical conduit main slot(s), cross slot(s), far-side slot(s), missile bore(s), bore hole(s), and/or conduit(s) (collectively, "Apical Conduit Components"), to a network access point ("NAP") servicing one or more customer premises. An F3 line(s) might be distributed, at the NAP and from the F2 line(s), to a network interface device ("NID") or optical network terminal ("ONT") at each customer premises, via any combination of the Apical Conduit Components, which might include channels in at least portions of roadways. Each of the F1, F2, and F3 lines might provide single direction communication or bi-directional communication.

In some embodiments, the F1, F2, and F3 lines might each include at least one optical fiber line. In some cases, the F1, F2, and F3 lines might each further include, without limitation, one or more of at least one conductive signal line, at least one power line, and/or the like. The at least one conductive signal line might include, but are not limited to, copper data lines, copper video lines, copper voice lines, or any suitable (non-optical fiber) data cables, (non-optical fiber) video cables, or (non-optical fiber) voice cables, and/or the like.

In various embodiments, at least one wireless access point device is disposed within a channel of an apical conduit system. Each of the at least one wireless access point device might comprise an enclosure or container that is disposed in the channel (e.g., at a bottom portion of the channel) and a lid that is removably affixed to a top portion of the container. An access point ("AP") may be placed within the enclosure or container of each of the at least one wireless access point device, while one or more antennas might be disposed in the lid. In this manner, although the AP is disposed below the ground surface, all possible antenna elements, passive or active, can be brought close to the surface, in order to propagate better above ground.

According to some embodiments, the lid of the wireless access device may be configured or designed to be ripped and replaced when the road is milled. In such embodiments, remnants of the lid might serve to protect the AP within the container from the process of milling, to be ripped out after the road milling process has been completed. Alternatively, these lids may be salvaged before the road is milled, so as to be reused after re-paving of the road. In such cases, a sacrificial cap might take the place of the lid, so as to protect the AP within the container from the process of milling, to be removed (and replaced with the original lids) after road milling process has been completed or after re-pavement of the road.

Various different ways may be implemented to communicatively couple the AP (in the container) with the antennas (in the lid), including, but not limited to, conducting pegs, magnets, and/or any type of snap-on connectors, or the like. According to some embodiments, all active elements might be disposed in the container, while only passive elements are disposed in the lid. Alternatively, the lid might contain all or most of the active and passive elements of the antenna. The coupling between the AP in container and the antenna(s) in the lid can be achieved, in some instances, using co-axial lines, direct contacts, or the like, while coupling, in other cases, might be achieved without use of co-axial lines or direct contacts, but by use of dielectric material for coupling (not shown), in which case the lid might only have passive elements.

The various embodiments of the enclosure or container and the lid achieve a combination of goals, including, without limitation, a sealed enclosure for connectors and/or electronics, a re-enterable enclosure, a layered lid for millable road surfaces, and (optionally) antennas in the lid.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a method might comprise placing at least one wireless access point device in a channel in a ground surface, placing one or more lines in the channel, and communicatively coupling the one or more lines with the at least one wireless access point device. The method might further comprise placing one or more first layers of filler material in at least a portion of the channel over the one or more lines and placing one or more additional layers of filler material in at least a portion of the channel around the at least one wireless access point device and over the one or more first layers of filler material, after the one or more first layers of filler material have set. The one or more lines might have floated on, adhered to, or been at least partially surrounded by the first layer of filler material prior to the first layer of filler material setting.

In some embodiments, at least one of the one or more lines might comprise at least one of one or more telecommunications lines, one or more power lines, one or more cables, one or more optical fiber cables, or one or more conduits, and/or the like. In some cases, at least one of the one or more first layers of filler material might prevent the one or more lines from floating into any of the one or more additional layers of filler material.

According to some embodiments, at least one of one or more first layers of filler material might comprise a soft material that can be cut or otherwise opened to expose the one or more lines without harm to the one or more lines. In some instances, at least one of the one or more additional layers of filler material is a hard material that cannot easily be cut or otherwise opened to expose the one or more lines without harm to the one or more lines. In some embodiments, at least one of the one or more first layers of filler material might comprise polyurea. In some cases, at least one of the one or more additional layers of filler material might comprise polyurea.

In some embodiments, each of the at least one wireless access point device might comprise a device container, a device lid, an access point device disposed in the device container, and an antenna disposed in the device lid. The access point device might be communicatively coupled to at least one of the one or more lines via one or more pass-throughs in at least one wall of the device container, while the antenna might be communicatively coupled to the access point device. In some cases, a top surface of the device lid is below a surface of the ground, and the method might further comprise placing a capping material in at least a portion of the channel over the device lid of the at least one wireless access point device and over the one or more additional layers of filler material. The capping material, in some instances, might comprise a shearable top coat that can be sheared without harming any of the one or more lines. Alternatively, a top surface of the device lid extends above a surface of the ground, and the method might further comprise placing a capping material in at least a portion of the channel over the one or more additional layers of filler material (without being placed over the lid of the at least one wireless access point device).

Merely by way of example, in some instances, the antenna might transmit and receive wireless broadband signals according to a set of protocols selected from a group consisting of IEEE 802.11a, IEEE 802.11b, IEEE 802.11g, IEEE 802.11n, IEEE 802.11ac, IEEE 802.11ad, and IEEE 802.11af. Alternatively or additionally, the antenna might transmit and receive wireless broadband signals according to a set of protocols selected from a group consisting of Universal Mobile Telecommunications System ("UMTS"), Code Division Multiple Access ("CDMA"), Long Term Evolution ("LTE"), Personal Communications Service ("PCS"), Advanced Wireless Services ("AWS"), Emergency Alert System ("EAS"), and Broadband Radio Service ("BRS"). In some embodiments, the antenna might comprise at least one of a plurality of lateral patch antennas, a plurality of arrays of patch antennas, a two-dimensional ("2D") leaky waveguide antenna, or a three-dimensional ("3D") array of antennas elements, and/or the like. Alternatively or additionally, the antenna might comprise at least one active antenna element.

In some cases, the method might further comprise removing the device lid, accessing one or more of the antenna disposed in the device lid or the access point device disposed in the device container, and performing service on the one or more of the antenna disposed in the device lid or the access point device disposed in the device container. According to some embodiments, the service might include, without limitation, at least one of repairing, testing, trouble-shooting, upgrading, updating, or replacing at least one component of the one or more of the antenna disposed in the device lid or the access point device disposed in the device container.

In another aspect, a system might comprise at least one wireless access point device disposed in a channel in a ground surface, one or more lines disposed in the channel, one or more first layers of filler material disposed in at least a portion of the channel over the one or more lines, and one or more additional layers of filler material disposed in at least a portion of the channel around the at least one wireless access point device and over the one or more first layers of filler material. The one or more lines might communicatively couple with the at least one wireless access point device.

In some embodiments, at least one of the one or more lines might comprise at least one of one or more telecommunications lines, one or more power lines, one or more cables, one or more optical fiber cables, or one or more conduits, and/or the like. In some cases, at least one of the one or more first layers of filler material might prevent the one or more lines from floating into any of the one or more additional layers of filler material.

According to some embodiments, at least one of one or more first layers of filler material might comprise a soft material that can be cut or otherwise opened to expose the one or more lines without harm to the one or more lines. In some instances, at least one of the one or more additional layers of filler material is a hard material that cannot easily be cut or otherwise opened to expose the one or more lines without harm to the one or more lines. In some embodiments, at least one of the one or more first layers of filler material might comprise polyurea. In some cases, at least one of the one or more additional layers of filler material might comprise polyurea.

In some embodiments, each of the at least one wireless access point device might comprise a device container, a device lid, an access point device disposed in the device container, and an antenna disposed in the device lid. The access point device might be communicatively coupled to at least one of the one or more lines via one or more pass-throughs in at least one wall of the device container, while the antenna might be communicatively coupled to the access point device. In some cases, a top surface of the device lid is below a surface of the ground, and a capping material might be disposed in at least a portion of the channel over the device lid of the at least one wireless access point device and over the one or more additional layers of filler material. The capping material, in some instances, might comprise a shearable top coat that can be sheared without harming any of the one or more lines. Alternatively, a top surface of the device lid extends above a surface of the ground, and a capping material is disposed in at least a portion of the channel over the one or more additional layers of filler material (without being disposed over the lid of the at least one wireless access point device).

Merely by way of example, in some instances, the antenna might transmit and receive wireless broadband signals according to a set of protocols selected from a group consisting of IEEE 802.11a, IEEE 802.11b, IEEE 802.11g, IEEE 802.11n, IEEE 802.11ac, IEEE 802.11ad, and IEEE 802.11af. Alternatively or additionally, the antenna might transmit and receive wireless broadband signals according to a set of protocols selected from a group consisting of Universal Mobile Telecommunications System ("UMTS"), Code Division Multiple Access ("CDMA"), Long Term Evolution ("LTE"), Personal Communications Service ("PCS"), Advanced Wireless Services ("AWS"), Emergency Alert System ("EAS"), and Broadband Radio Service ("BRS"). In some embodiments, the antenna might comprise at least one of a plurality of lateral patch antennas, a plurality of arrays of patch antennas, a two-dimensional ("2D") leaky waveguide antenna, or a three-dimensional ("3D") array of antennas elements, and/or the like. Alternatively or additionally, the antenna might comprise at least one active antenna element. In some cases, the ground surface might be a roadway surface.

In yet another aspect, a wireless access point device might comprise a device container disposed in a channel in a ground surface, a device lid removably affixed to a top portion of the device container, an access point device disposed in the device container, and an antenna disposed in the device lid. The access point device might be communicatively coupled, via one or more pass-throughs in at least one wall of the device container, to at least one of one or more lines that are disposed in the channel. The antenna might be communicatively coupled to the access point device.

In some instances, the antenna might transmit and receive wireless broadband signals according to a set of protocols selected from a group consisting of IEEE 802.11a, IEEE 802.11b, IEEE 802.11g, IEEE 802.11n, IEEE 802.11ac, IEEE 802.11ad, and IEEE 802.11af. Alternatively or additionally, the antenna might transmit and receive wireless broadband signals according to a set of protocols selected from a group consisting of Universal Mobile Telecommunications System ("UMTS"), Code Division Multiple Access ("CDMA"), Long Term Evolution ("LTE"), Personal Communications Service ("PCS"), Advanced Wireless Services ("AWS"), Emergency Alert System ("EAS"), and Broadband Radio Service ("BRS"). In some embodiments, the antenna might comprise at least one of a plurality of lateral patch antennas, a plurality of arrays of patch antennas, a two-dimensional ("2D") leaky waveguide antenna, or a three-dimensional ("3D") array of antennas elements, and/or the like. Alternatively or additionally, the antenna might comprise at least one active antenna element.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Merely by way of example, in some embodiments, antenna structures might be implemented to optimize transmission and reception of wireless signals from ground-based signal distribution devices, which include, but are not limited to, FDH, hand holes, and/or NAPs. In some cases, antenna structures might also be implemented within devices (e.g., wireless access point devices) that are imbedded or located within apical conduit channels, as described in detail in the '574 application. Wireless applications with such devices and systems might include, without limitation, wireless signal transmission and reception in accordance with IEEE 802.11a/b/g/n/ac/ad/af standards, UMTS, CDMA, LTE, PCS, AWS, EAS, BRS, and/or the like. In some embodiments, an antenna might be provided within a signal distribution device, which might include a container disposed in a ground surface. A top portion of the container might be substantially level with a top portion of the ground surface. The antenna might be communicatively coupled to one or more of at least one conduit, at least one optical fiber line, at least one conductive signal line, or at least one power line via the container and via an apical conduit system(s) installed in a roadway.

According to some embodiments, the methods, apparatuses, and systems might be applied to 2.4 GHz and 5 GHz wireless broadband signal distribution as used with today's IEEE 802.11a/b/g/n/ac lines of products. Given the low profile devices, such methods, apparatuses, and systems may also be applicable to upcoming TV white spaces applications (and the corresponding IEEE 802.11af standard). In addition, small cells at 600 MHz and 700 MHz may be well-suited for use with these devices. In some embodiments, higher frequencies can be used such as 60 GHz and the corresponding standard IEEE 802.11ad. The '574, '216, and '665 applications, which have been incorporated herein by reference in their entirety, describe in further detail embodiments utilizing wireless access points based on IEEE 802.11ad and a system of ground-based signal distribution devices having these 60 GHz wireless access points disposed therein that are in line of sight of the customer premises. Methods for placing, powering, and backhauling radio access units using a combination of existing copper lines, cabinets, pedestals, hand holes, new power lines, new optical fiber connections to the customer premises, placement of radio equipment in pedestals or hand holes, and/or the like, via use of apical conduit systems are described in detail in the '034, '574, '691, '676, '216, and '665 applications, which are already incorporated herein by reference in their entirety.

According to some embodiments, a method may be provided for repairing any damage to any of the lines within apical conduit systems. Such a method might include locating the damage in the lines, removing the capping material over a predetermined length (e.g., 30 ft) approximately centered about the damage in the line, removing the filler material encapsulating the damaged line(s) and/or microduct(s) to expose first ends and second ends of the damaged line(s) and/or microduct(s), and lifting the first ends and the second ends of the damaged line(s) and/or microduct(s) from the channel of the source/main/cross/far-side slot of the apical conduit system. The method might further include, without limitation, splicing the first ends and the second ends of the damaged line(s) and/or microduct(s) with splices (and in some cases, service loops), placing the spliced damaged line(s) and/or microduct(s) in the channel (in some instances, within a splice box that has been placed in the channel, e.g., during the repair process), placing the filler material in the channel, and placing the capping material in the channel over the filler material. Such repair techniques are described in detail in the '574 application.

Some advantages of the systems described herein include, without limitation, relatively low cost, efficiency, flexibility, system strength and reliability, minimal ecological impact, visual unobstructiveness, and/or the like, especially in conjunction with the use of surface trenching techniques as applied to apical conduit systems and the use of ground-based signal distribution systems. Herein, surface trenching refers to a technique that is not unlike conventional micro-trenching techniques, except that trenching is within the top layer (e.g., asphalt layer or concrete layer, etc.) and not below the top layer. In conventional micro-trenching techniques, trenches might extend 12 to 18 inches below the surface of the top layer, and in some cases deeper (reaching below the top layer into or beyond a sub-base layer). In contrast, for surface trenching, trenches might extend a few inches (e.g., 2 to 6 inches), while remaining within the top layer (and not deeper than the top layer). Because surface trenching for apical conduit systems require smaller profile channels or trenches compared to other buried solutions, labor costs and/or equipment costs may be kept low. Surface trenching also allows for flexibility in terms of routing and laying channels and surface trenches, relatively high system strength due to the use of polyurea and/or other thermosetting materials that have been proven in lab tests to have similar (and sometimes better) strength characteristics compared to asphalt (in which the channels or surface trenches are laid) thus leading to reliability, minimal ecological impact due to similar impact compared to asphalt and the like, efficiency in terms of implementing FTTP using apical conduit system techniques and in terms of line repair (as described above).

Surface trenching also has an important advantage of better preserving the structural integrity of the road compared with micro-trenching, as it leaves intact the lower layers that are important for long term integrity of the road. Further, visual unobstructiveness may be achieved by the use of the apical conduit system laid in roadway and other ground surfaces, in conjunction with ground-based signal distribution devices, including a FDH (which includes a pedestal-based FDH with only its pedestal extending above ground surface or a non-pedestal FDH whose lid is substantially level with a ground surface), a NAP(s) (which may be a direct buried NAP that is completely underground), hand holes (whose lids may be substantially level with a ground surface), and/or the like.

Telecommunications companies have precious assets in the ground, and deploy more. The various embodiments herein utilize these assets (and, in some cases, minimal radio infrastructure costs to overlay a fiber or copper plant or network with wireless broadband) to overlay one or more networks distributed within one or more apical conduit systems. In so doing, a cost effective fiber and cable network, with a network for backhaul, may be provided.

In some embodiments, the various embodiments described herein may be applicable to brownfield copper plants, to greenfield fiber roll-outs, and/or the like. Herein, "brownfield" might refer to land on which industrial or commercial facilities are converted (and in some cases decontaminated or otherwise remediated) into residential buildings (or other commercial facilities; e.g., commercial offices, etc.), while "greenfield" might refer to undeveloped land in a city or rural area that is used for agriculture, used for landscape design, or left to naturally evolve. In the telecommunications context, "brownfield" might also refer to land on which a telecommunications company might have some existing facilities and/or inventory (e.g., copper, etc.) and may not require converting the land and/or repurposing commercial facilities, while "greenfield" might also refer to land (which may have existing buildings) on which the telecommunications company might not already have some existing facilities, inventory, and/or services and might require converting the land and/or repurposing commercial or other facilities.

Specific Exemplary Embodiments

We now turn to the embodiments as illustrated by the drawings. FIGS. 1-17 illustrate some of the features of the method, system, and apparatus for implementing telecommunications signal relays, and, in some embodiments, for implementing point-to-point fiber insertion within a passive optical network ("PON") communications system, as referred to above. The methods, systems, and apparatuses illustrated by FIGS. 1-17 refer to examples of different embodiments that include various components and steps, which can be considered alternatives or which can be used in conjunction with one another in the various embodiments. The description of the illustrated methods, systems, and apparatuses shown in FIGS. 1-17 is provided for purposes of illustration and should not be considered to limit the scope of the different embodiments.

Throughout these embodiments, wireless access points—such as ones operating under any of the IEEE 802.11a/b/g/n/ac/ad/af standards discussed above, and described in detail in the '034, '574, '691, '676, '216, and '665 applications, which are already incorporated herein by reference in their entirety—may be implemented in any of the ground-based signal distribution devices (including, without limitation, the FDH, the NAPs, the handholes, the NIDs, the ONTs, and/or the like). In some embodiments, wireless access points may be disposed within compact devices that are disposed within apical conduit channels, at the top of apical conduit channels, or near the top of apical conduit channels, as described in detail in the '574 application. In some cases, some or all of these wireless access points may be powered by power lines that are disposed along with the signal lines or fiber lines within the apical conduit system, and such powering of wireless access points is described in detail in the '691 and '676 applications, already incorporated herein by reference in their entirety. The wireless access points may be part of small cells, micro cells, femto cells, pico cells, and/or the like, as appropriate or desired.

Figure 1B:
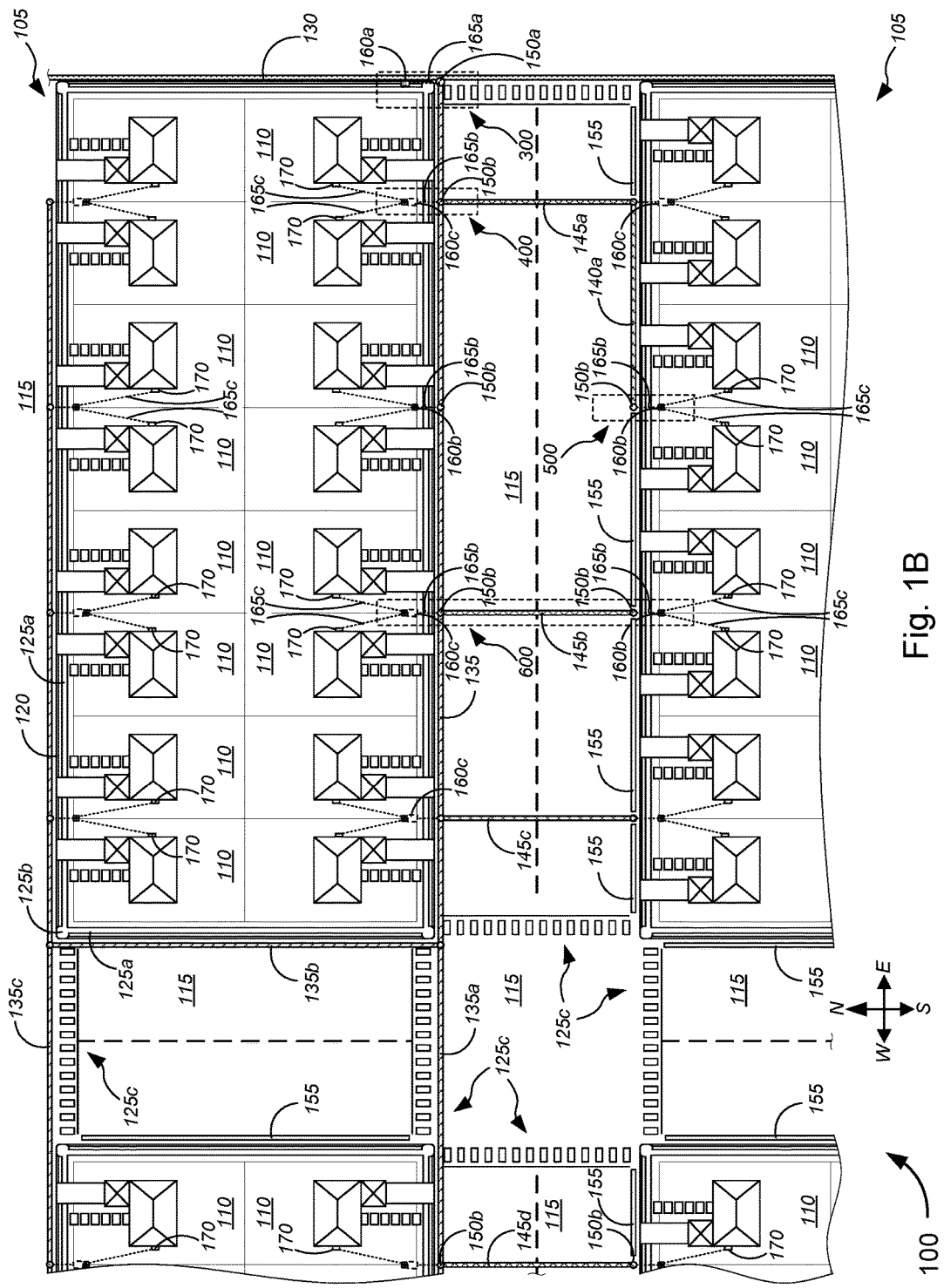

With reference to the figures, FIGS. 1A and 1B (collectively, "FIG. 1") are general schematic diagrams illustrating systems 100 for implementing Fiber-to-the-Premises ("FTTP") and/or point-to-point fiber insertion within a passive optical network ("PON") communications system, in accordance with various embodiments. For simplifying the illustration, the customer premises 110 are shown to be in a grid-like block pattern, and are shown to be of similar design and build. The grid-like block of customer premises is also shown to be oriented along particular cardinal directions (i.e., north, south, east, and west), as indicated in FIG. 1. However, the various embodiments are not so limited, and any arrangement of customer premises (of any variety of sizes and builds) may be applicable, in any arrangement or orientation with respect to the cardinal directions, as appropriate or desired. Moreover, the tools and techniques described herein may be implemented for established neighborhoods/blocks of customer premises or newly constructed ones.

Further, the various embodiments allow for any layout and arrangement of the apical conduit system and components (including, without limitation, source slot, main slot(s), cross-slots, far-side slots, bore holes, missile bores, and/or the like), not necessarily as shown in FIG. 1; the particular layout and arrangement of the apical conduit system and components in FIG. 1 represents only one particular set of embodiments. Although FIG. 1 shows a plurality of customer premises that are single-family home residences within a neighborhood setting, the various embodiments are not so limited, and the various systems and methods described with respect to FIG. 1 may be applicable to any arrangement and type of customer premises (including, without limitation, customer residences, multi-dwelling units ("MDUs"), commercial customer premises, industrial customer premises, and/or the like) within one or more blocks of customer premises (e.g., residential neighborhoods, university/college campuses, office blocks, industrial parks, mixed-use zoning areas, and/or the like), in which roadways and/or pathways might be adjacent to each of the customer premises.

With reference to the different embodiments shown in FIGS. 1A and 1B, FIG. 1A depicts an embodiment in which each network access point ("NAP") 160c is configured to serve more customer premises (i.e., 8 houses in the example of FIG. 1), and thus fewer NAPs 160c need be deployed. FIG. 1B depicts an embodiment in which each NAP 160c is configured to serve relatively fewer customer premises (i.e., 4 houses in the example of FIG. 1), and thus more NAPs 160c are deployed. In some embodiments, the use of simplex or duplex fiber optic lines might determine how many ports each NAP might have, and thus how many customer premises can be served by each NAP; of course, the use of duplex lines allows for double the capacity, and thus can serve more customer premises compared with simplex lines. According to some embodiments, FIG. 1A might represent a system that incorporates a PON communications system, which utilizes single (duplex) fiber connections to the customer premises 110, and thus may require only 1 single (duplex) fiber line to be routed from the NAP 160c to each customer premises 110 (i.e., to the NID or ONT of the customer premises 110). In some cases, a second single (duplex) fiber line might be routed along with the first single (duplex) fiber line to serve as a backup or to allow for other services that require simplex connections. In some embodiments, FIG. 1B might represent either a PON communications system having 2 single (duplex) fiber lines (one of which serves as a backup) or a service that requires simplex fiber connections (including, but not limited to Ethernet fiber connections, which requires separate simplex fiber connections for uploading and downloading data). The embodiments of FIGS. 1A and 1B would otherwise be similar, if not identical, in terms of functionality, operation, and deployment. The various embodiments, however, are not limited to either embodiments shown in FIGS. 1A and 1B, and the NAPs 160c can each be configured to serve any suitable number of customer premises.

In the non-limiting examples of FIG. 1, blocks 105 might each have located thereon one or more customer premises 110 (which are depicted as single-family homes in FIG. 1, for the sake of illustration). Some of the one or more customer premises 110 might include an attached or detached garage and a driveway, which connects the garage to a roadway 115. Herein, "roadway" might refer to any type of path on which people, vehicles, and the like might travel, and might include asphalt roads, concrete roads, and/or the like. Each block 105 might include a curb 120 along at least portions of the perimeter of the block 105, as well as pathways 125 (which might include, without limitation, sidewalks 125a, street-corner sidewalks 125b, and crosswalks 125c, and/or the like). According to some embodiments, pathways 125 might be made of materials including, but not limited to, asphalt, concrete, pavers, tiles, stone, and/or the like. In some cases, the areas bordered and defined by curb 120, sidewalks 125a, and street-corner sidewalks 125b might include grassy areas, mulch-filled areas, and/or gravel-filled areas (in some cases, with one or more trees, one or more shrubs, and/or one or more hedges, or the like). In some instances, sidewalks 125a might extend toward, and might be positioned immediately adjacent to, curb 120.

System 100, as shown in FIG. 1, might include, on roadway 115, apical conduit source slot 130, one or more apical conduit main slots 135, one or more apical conduit far-side slots 140, one or more apical conduit cross slots 145, road bores 150, road lines 155, and/or the like. Herein, "apical conduit" might refer to any type of conduit, groove, or channel disposed in a ground surface (particularly, a roadway or pathway surface), in which one or more lines are disposed. The one or more lines might include, without limitation, at least one of one or more conduits, one or more optical fiber cables, one or more conductive signal lines, one or more power lines, and/or the like. The conduit, groove, or channel may be covered with a filler material, including, but not limited to, a thermosetting material (which might include polyurea or the like). In some cases, a capping material might be placed on top of the filler material of the apical conduit, and the capping material might be set to have particular colors, so as to additionally serve as road lines on a roadway surface. In some embodiments, there might be a gap between road lines 155 and any of the apical conduit slots 130-145, while, in some instances, road lines 155 might be extended to abut adjacent apical conduit slots 130-145. According to some embodiments, colored capping material might be used to fill at least a portion of the channel, as well as to extend further along the surface of the roadway to serve as a continuous road line.

Road bores 150 provide vertical access, from a top surface of roadway 115, to the one or more lines disposed within (typically at or near the bottom of) the groove or channel of the apical conduit slots, and can be filled with the filler and/or capping material similar to any of the apical conduit slots 130-145. In some embodiments, road bores 150 might have diameters ranging from ~0.5 inches (~1.3 cm) to ~6 inches (~15.2 cm), preferably ~6 inches (~15.2 cm) for road bores 150 near FDHs, cabinets, and/or the like, and preferably ~2 inches (~5.1 cm) for most other road bores 150.

In the example of FIG. 1, the source slot 130 might extend from a central office ("CO"), a digital subscriber line access multiplexer ("DSLAM"), and/or near/within a block or neighborhood of customer premises (collectively, "source"), extending along, under, or beside portions of a curb (e.g., curb 120). The source slot 130 might carry (or might otherwise have placed in a channel therein) at least one line from the source, including, without limitation, one or more F-1 fiber cables, and/or the like. In some embodiments, the at least one line might further comprise, but is not limited to, at least one of one or more conductive signal lines, one or more power lines, and/or the like.

Further, in the embodiment of FIG. 1, the main slot 135 might extend along a significant length of roadway 115, disposed close to one of the curbs 120 of one of the blocks 105, while far-side slot 140 extends along a shorter length of roadway 115 on the side of the roadway 115 opposite to the side along which the main slot 135 is disposed. Cross slots 145 connect main slot 135 with far-side slot 140, and thus are disposed across an approximate width of the roadway 115. Although main slot 135 and far-side slot 140 are shown in FIG. 1 to be parallel to each other, they may be at any suitable angle with respect to each other, so long as they are at appropriate positions along the roadway 115 and/or beside curb 120 (e.g., in some cases, to serve as road lines, or the like, which in some cases might mean that one of the main slot 135 or the far-side slot 140 is positioned in the middle of the roadway 115 to serve as a middle road line). Although cross slots 145 are shown in FIG. 1 as being perpendicular to at least one of main slot 135 and far-side slot 140, cross slots 145 may be at any suitable angle relative to one or both of main slot 135 and far-side slot 140, so long as cross slots 145 connect main slot 135 with far-side slot 140, such that the one or more lines may be appropriately routed through these slots 130-145.

In some embodiments, one or more ground-based distribution devices 160 might be provided to service one or more customer premises 110. The one or more lines disposed in the apical conduit slots 130-145 might be routed underground, via conduits, missile bores, or the like (collectively, "conduits 165"), to containers of each of the one or more ground-based distribution devices 160, in a manner as described in detail with respect to FIGS. 1-4 as described in detail in the '676 application, which has already been incorporated herein by reference in its entirety. In some embodiments, conduits 165c might be provided below ground between a container of a ground-based distribution device 160 to a position below and near a NID or ONT 170 that is mounted on an exterior wall of a customer premises. In some cases, conduits 165c might extend from the position below and near the NID or ONT 170 to communicatively couple with the appropriate wiring connections (i.e., with the optical fiber connections, conductive signal connections, and/or the like) within the NID or ONT 170. Although shown in FIG. 1 as being a direct route between the position near the NID or ONT 170 and the container of the ground-based distribution device 160, conduit 165c may be at right-angles, may be curved, and/or might follow other routes. In some embodiments, the ground-based distribution device 160 might include, without limitation, a FDH platform 160a, a hand hole 160b, a NAP 160c (which might be an above-surface platform NAP, a sub-surface NAP (which might extend from above the surface to below the surface), or a direct-bury NAP, or the like), and/or the like. Although the FDH platform 160a is shown communicatively coupled to the apical conduit system through the main slot 135, in some embodiments, the FDH platform 160a may be coupled to the apical conduit system through the source slot 130. In some instances, the FDH platform 160a might link two or more apical conduit systems (either through the main slots and/or source slots of these systems).

In some embodiments, the combination of main slot 135, far-side slot 140, and/or cross slots 145 might form particular configurations including, without limitation, an "h" configuration (i.e., as shown in the combination of main slot 135, far-side slot 140a, and cross slot 145a in FIG. 1), a "c" configuration (i.e., as shown in the combination of main slot 135 and cross slots 145b and 145c in FIG. 1), and/or the like. The "h" and "c" configurations each provide ways of routing lines from NAP 160c to hand holes 160b on the opposite side of roadway 115 to service NIDs and ONTs 170 across the road 115. Any other suitable configuration may be implemented, however.

Figure 2B:
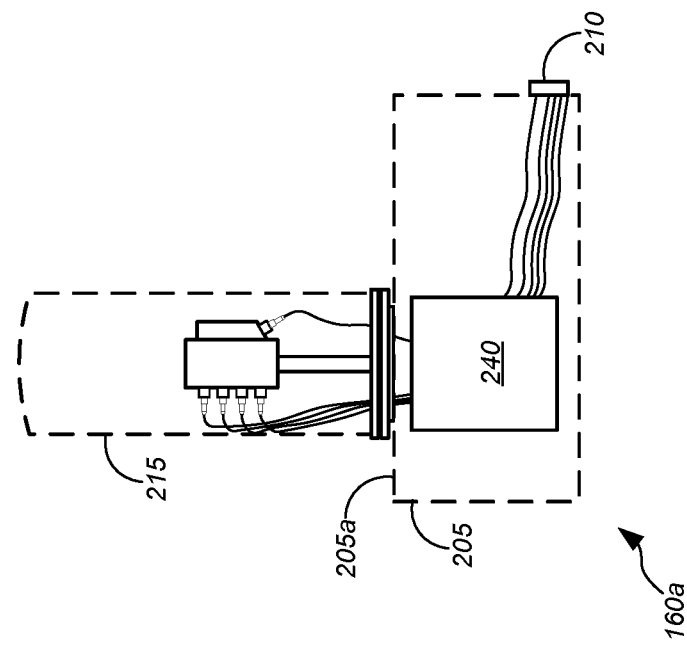

We now turn to FIGS. 2A-2M (collectively, "FIG. 2"), which are general schematic diagrams illustrating various ground-based signal distribution devices that may be used in implementing FTTP and/or point-to-point fiber insertion within a PON communications system, in accordance with various embodiments. In FIG. 2, dash-lined boxes, covers, or containers depict outlines of said boxes, covers, or containers in order to illustrate examples of contents disposed therein. Although particular configurations and components are shown in FIG. 2, the various embodiments are not necessarily limited to those configurations and components shown, but may include any suitable configurations and/or components, as appropriate or as desired. FIGS. 2A-2D depict various example embodiments of FDHs 160a, while FIGS. 2E-2H depict various example embodiments of handholes 160b, and FIGS. 2I-2J depict example embodiments of NAPs 160c. FIG. 2K depicts an example schematic diagram of a wireless access point device that is configured to be disposed within a channel of the apical conduit system, in accordance with various embodiments. FIGS. 2L and 2M are example schematic diagrams of wireless access point devices that are configured to be disposed within, at the top of, or near the top of a channel of the apical conduit system, in accordance with various embodiments.

Figure 2A:
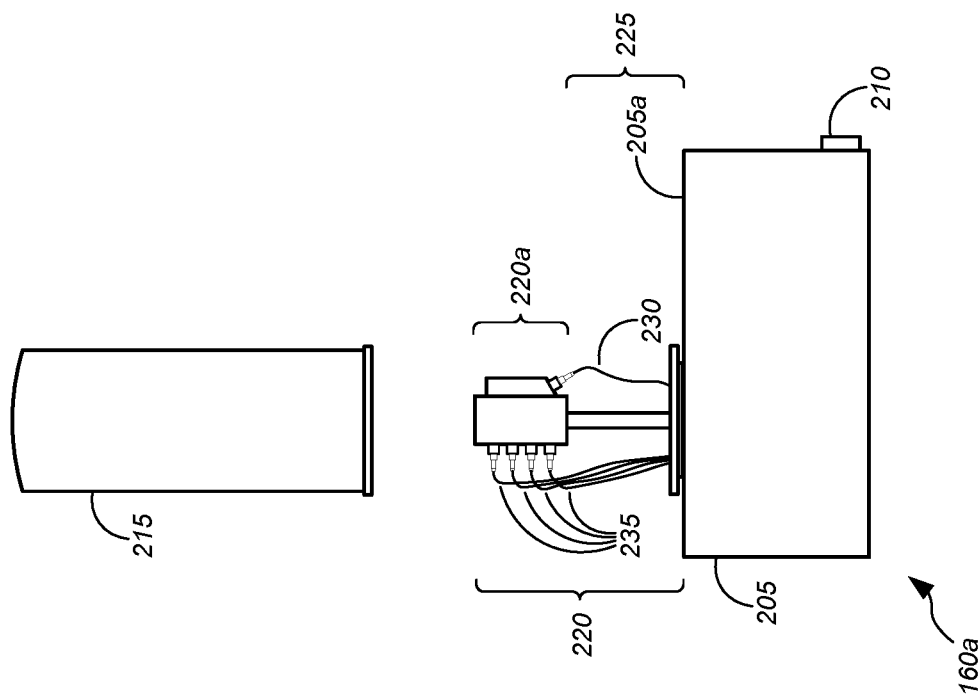

In FIGS. 2A-2B, a pedestal-based FDH 160a is shown, which comprises, without limitation, a container 205, at least one conduit port 210, a cover or lid 215, and a cable distribution system 220. The container 205 might include a square or rectangular box that is made of a material that can durably and resiliently protect contents thereof while being disposed or buried in the ground surface (i.e., disposed or buried under the ground surface), and especially against damage caused by shifting ground conditions (such as by expansive soils, tremors, etc.). The container 205 is ideally constructed to be waterproof to protect electronics components disposed therein from getting wet; such a waterproof container can also protect against entry of dust, dirt, debris, and the like, which might affect or damage optical cables and/or optical cable connections. In some embodiments, cable distribution system 220—which is at least in part disposed in the pedestal portion that is above container 205 (and covered by or disposed within lid 215 during operation)—might include, but is not limited to, a signal distribution/splitting/splicing system 220a, a support structure 225, one or more first cables 230, and one or more second cables 235. In some cases, FDH 160a might further comprise an optional cable routing system 240, which is a system disposed in container 205 to route the one or more first and second cables 230 and 235 between the cable distribution system 220 and the at least one conduit port 210. In some embodiments, the optional cable routing system 240 might be disposed in the pedestal portion along with the cable distribution system 220 (not shown). In other embodiments, both the optional cable routing system 240 and the cable distribution system 220 might be disposed in the container 205 (also not shown). Embodiments of the optional cable routing system are described in greater detail with respect to FIGS. 8-10 in the '851 application.

According to some embodiments, the one or more first cables 230 might include, without limitation, F-1 or F1 optical fiber cables routed from a CO, a DSLAM, and/or near/within a block or neighborhood of customer premises (collectively, "source") to the FDH 160a, while the one or more second cables 235 might include, but are not limited to, F-2 or F2 optical fiber cables routed between the FDH 160a and one or more NAPs 160c.

Figure 2D:
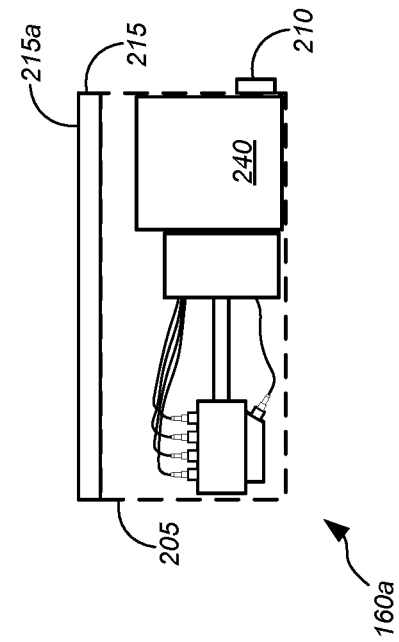
Figure 2C:
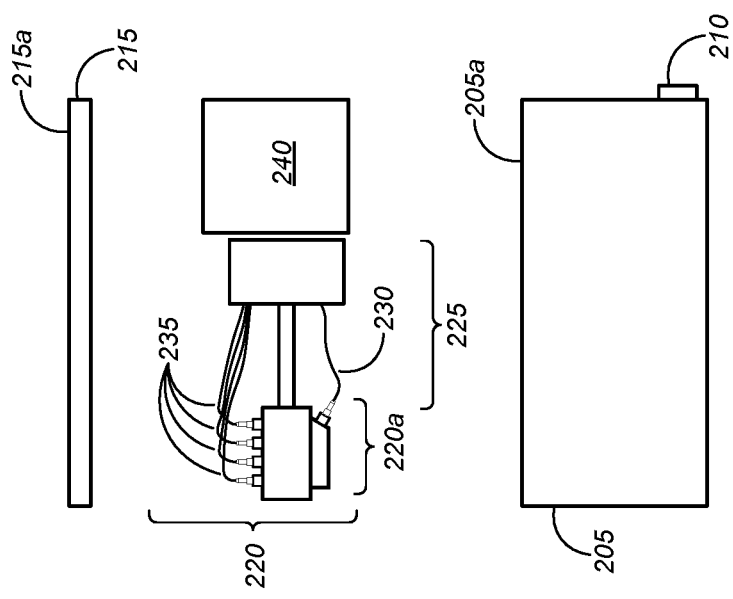

The embodiments of FIGS. 2C-2D are similar, if not identical, to those of FIGS. 2A-2B, except that the FDH 160a of FIGS. 2C-2D are substantially disposed within the ground surface, with either top surface 205a (of container 205) or top surface 215a (of lid 215) being substantially level with a top surface of the ground surface, and without a pedestal portion. In these embodiments of FDH 160a, the signal distribution/splitting/splicing system 220a, the support structure 225, the one or more first cables 230, the one or more second cables 235, and the (optional) cable routing system 240 are all disposed within the container, and all covered by substantially flat lid 215. Because of the similarity of the components therein, the description of FDH 160a in FIGS. 2A-2B is applicable to the FDH 160a of FIGS. 2C-2D.

Figure 2E:
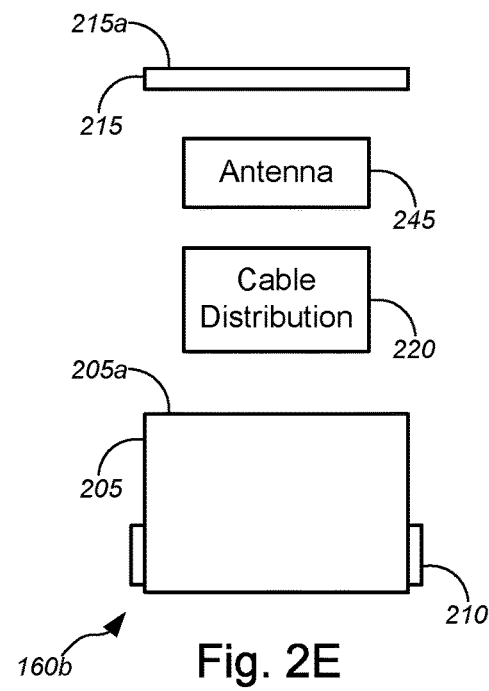

The hand holes 160b of FIGS. 2E-2H are similar, if not identical, to the hand holes described in detail in the '676 application, which is already incorporated by reference herein in its entirety. With reference to FIGS. 2E-2H, an embodiment of hand hole 160b is shown in FIG. 2E, which hand hole 160b comprises a container 205, at least one conduit port 210, a lid 215, a cable distribution system 220, and an (optional) antenna 245. The container 205 might be similar, if not identical, to the container 205 described in detail with respect to FIGS. 2A-2D; accordingly, the descriptions above apply similarly to container 205 in FIGS. 2E-2H. The (optional) antenna 245 is configured to be disposed or mounted within the interior of the container 205, and can include any suitable antenna, antenna array, or arrays of antennas, as described in detail with respect to FIG. 3 of the '676 application, or any other suitable antenna, antenna array, or arrays of antennas. The lid 215 is ideally made of a material that provides predetermined omnidirectional azimuthal rf gain.

The at least one conduit port 210 (with two conduit ports shown in FIG. 2, or three conduit ports shown in FIGS. 4-6) is configured to sealingly connect with the one or more conduits 165b or 165c (in some cases, in a manner that seals against or otherwise prevents water, dirt, soil, or other foreign substances from entering the container 205). In this manner, at least one optical fiber line, at least one conductive signal line (including, but not limited to, copper data lines, copper voice lines, copper video lines, or any suitable (non-optical fiber) data cables, (non-optical fiber) video cables, or (non-optical fiber) voice cables, and/or the like), and/or the like that are provided in the one or more conduits 165b might be routed through the at least one conduit port 210 and into the interior of the container 205, to be correspondingly communicatively coupled to the antenna 245 or to the NIDs/ONTs 170 via cable distribution system 220. Cable distribution system 220 may also be configured to route (via container 205) the at least one power line that is provided in the one or more conduits 105 to appropriate power receptacles, cabinets, or power relay systems that are located above the ground surface.

Figure 2F:
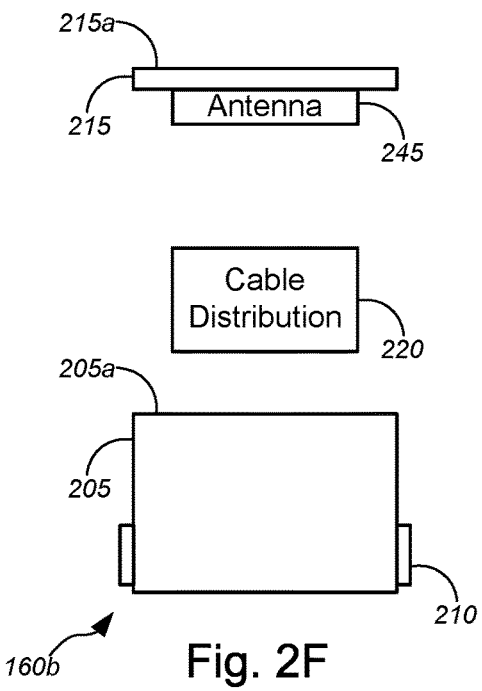

FIG. 2F shows another embodiment of hand hole 160b. In FIG. 2F, the hand hole 160b comprises (optional) antenna 245, which is part of lid 215, either disposed completely within the lid 215, disposed below (but mounted to) the lid 215, or disposed partially within the lid 215 and partially extending below the lid 215. Hand hole 115 in FIG. 2F is otherwise similar, or identical to, and has similar, or identical, functionalities as hand hole 115 shown in, and described with respect to, FIG. 2E. Accordingly, the descriptions of the hand hole 115 of FIG. 2E are applicable to the hand hole 115 of FIG. 2F.

Figure 2G:
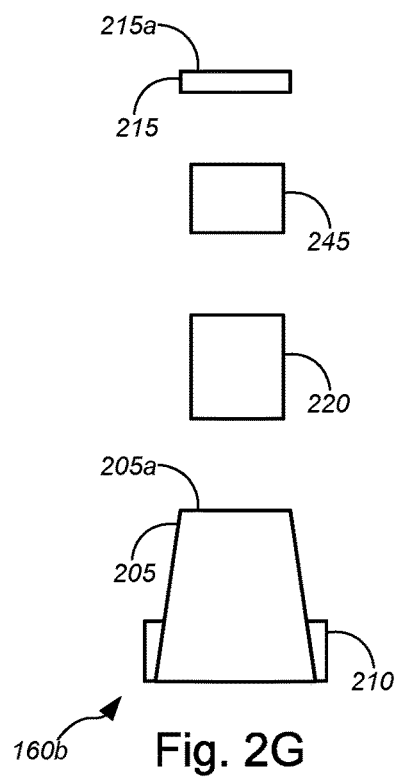
Figure 2H:
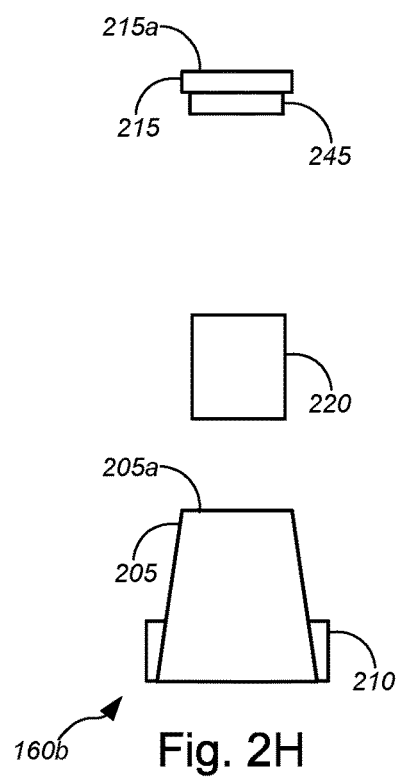
Figure 2J:
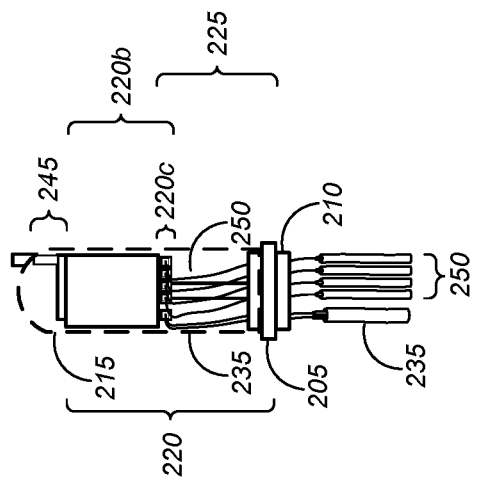
Figure 2I:
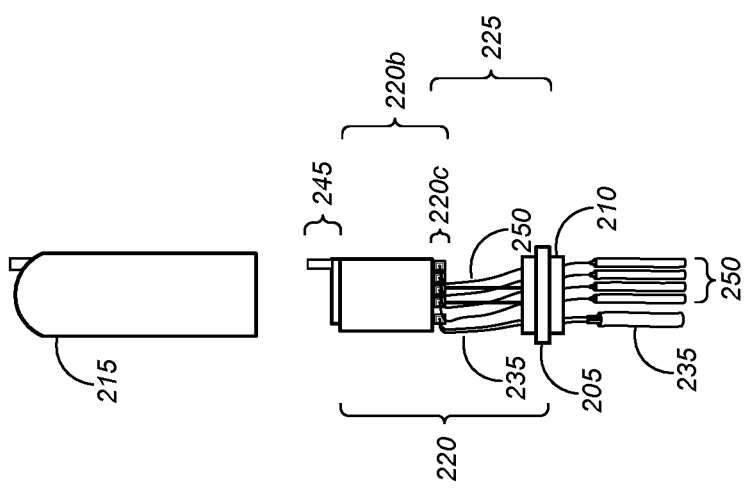

FIGS. 2G and 2H show two embodiments of flowerpot hand holes 160b. The differences between the hand holes 160b of FIGS. 2E and 2F and the flowerpot hand holes 160b of FIGS. 2G and 2H include a more compact structure (and a correspondingly compact set of (optional) antenna(s) 245 and cable distribution systems 220), a container 205 having a generally cylindrical or (truncated) conical shape (not unlike a flower pot for planting flowers), a lid 215 having a generally circular shape to fit the generally cylindrical or conical container 205, and the like. The flowerpot hand holes 120 are otherwise similar, or identical to, and have similar, or identical, functionalities as hand holes 160b of FIGS. 2E and 2F, respectively. Accordingly, the descriptions of hand holes 160b of FIGS. 2E and 2F are respectively applicable to the flowerpot hand holes 160b of FIGS. 2G and 2H.

According to some embodiments, a wide range of hand holes (some including the hand holes 160b above) may be used, with polymer concrete lids of various shapes and sizes. In some cases, all splitting and/or splicing can be performed below the ground surface and no pedestal is added. In some instances, some splitting and/or splicing (e.g., using cable distribution system 220, or the like) can be performed above the ground surface, such as in pedestal type FDH 160a (shown in FIGS. 2A-2B) or other platforms, including, without limitation, pedestal platforms, NAP platforms, FDH platforms, and/or the like shown in FIG. 2 of the '676 application, already incorporated herein by reference in its entirety.

In some embodiments, if the hand hole is not placed in a driveway or sidewalk, or the like, the lid 215 (as shown in FIGS. 2E-2H) may be replaced by a pedestal lid 215 (such as shown in FIGS. 2G-2J), or the like. In other words, a small (i.e., short) radio-only pedestal (or pedestal lid) can be added, with no need for any splitter, any splice tray, or the like, just a simple antenna structure. The result might look like a few-inch high (i.e., a few-centimeter high) pedestal with antenna structures as described in the '676 application. An advantage with this approach is that the radio pedestal can be easily replaced, maintained, or the like, as it contains only the radio element.

Merely by way of example, in some instances, polymer concrete lids (such as used with typical hand holes) may be built with antenna elements in the lids. In particular, a ground plane can be placed below the lid, and the polymer concrete can be considered a low dielectric constant (i.e., as it has a dielectric constant or relative permittivity $\varepsilon_r$ similar to that of air—namely, $\varepsilon_r$ of about 1.0). In some cases, patch elements and/or directors may be included within the lid, subject to manufacturing processes.

Alternatively, planar antennas (such as described in detail in the '676 application) may be placed below the lid, with the concrete surface having negligible impact on radio frequency propagation. A low elevation (i.e., below street level) setting of the radio typically limits the distance of propagation of rf signals. However, architectures having hand holes placed every few customer premises (e.g., homes) in a particular area (i.e., neighborhood or block of customer premises) may sufficiently compensate for the limited distance of rf signal propagation. Some embodiments include hand holes 160b without any antennas 245.

In FIGS. 2I-2J, a NAP 160c is shown, which includes, without limitation, a base 205, a conduit port 210, a cover 215, and a cable distribution system 220. In some embodiments, cable distribution system 220 might include, but is not limited to, a signal distribution/splitting/splicing system 220b, a plurality of ports 220c, a support structure 225, one or more second cables 235, an (optional) antenna 245, and one or more third cables 250. In some cases, NAP 160c might be an above-surface NAP, a direct bury NAP, or a NAP disposed in the ground surface and extending above the ground surface. In some embodiments, the one or more second cables 235 might include, but are not limited to, F-2 or F2 optical fiber cables routed between the FDH 160a and one or more NAPs 160c, while the one or more third cables 250 might include, without limitation, F-3 or F3 optical fiber cables routed between a NAP 160c and one or more NIDs/ONTs 170 (in some cases, via one or more hand holes 160b). In some embodiments, NAP 160c might further comprise an optional cable routing system 240 (not shown), not unlike the optional cable routing system 240, as shown and described in detail above with respect to FIGS. 2A-2D.

With reference to FIG. 2K, a wireless access point device 255 is shown, which includes, but is not limited to, a container 255a and a wireless access point 260 disposed in the container 255a. The wireless access point 260 might include one or more input ports 265a, one or more output ports 265b, and a power supply port 270. The input/output ports 265 might be data ports, optical cable ports, non-optical cable ports, etc. In one set of embodiments, the one or more input ports 265a might communicatively couple with the one or more second cables 235, while the one or more output ports might communicatively couple with the one or more third cables 250. In another set of embodiments, the one or more second cables 235 (i.e., F-2 or F2 optical fiber cables routed between the FDH 160a and one or more NAPs 160c) might communicatively couple to each of the one or more input ports 265a or the one or more output ports 265b. In such cases, between the FDH 160a and the one or more NAPs 160c, the wireless access point device 255 can provide wireless connectivity (in some cases, from the roadway location). In yet another set of embodiments, the one or more third cables 235 (i.e., F-3 or F3 optical fiber cables routed between a NAP 160c and one or more NIDs/ONTs 170) might communicatively couple to each of the one or more input ports 265a or the one or more output ports 265b. In such cases, between the NAP 160c and the one or more NIDs/ONTs 170, the wireless access point device 255 can provide wireless connectivity (in some cases, from the roadway location). In some embodiments, the container 255a is configured to be small (i.e., small enough to fit within a channel of the apical conduit system (i.e., with width in some cases less than 1 inch and height in some cases less than 1 or 2 inches; the length may be less constrained, and in some cases may be a few inches long), heat resistant (to survive application of thermosetting material within the channel of the apical conduit system), heat insulative (to protect the wireless access point 260 and other components contained therein during application of thermosetting material within the channel of the apical conduit system), and water-tight (to prevent liquids (e.g., the thermosetting material, water, etc.) from entering the container 255a). To provide power to the wireless access point 260, a power cable 275 might be communicatively coupled to the power supply port 270. To maintain the water-tightness feature, the cable connections might be fed through a grommet-type pass-through or other type of cable pass-through in a wall of the container 255a. According to some embodiments, the wireless access point 260 might further include, without limitation, a cable distribution device 220 and/or an antenna 245, both of which have been described in detail above. FIGS. 11A-11E, 12A-12R, 13A-13P, and 16A-16B depict various embodiments of wireless access point devices that are (or may be) positioned within at least a portion of a channel of the apical conduit system (and, in some cases, in-line with the lines or cables/conduits that are disposed in the channel, with input cables entering at one end of the device and with output cables exiting at the other end of the device, or the like; while in other cases, disposed on a depression or groove straddling a channel (e.g., at or near a top portion of the channel), with input and output cables disposed on a lower surface of the device 255), particularly in relation to other elements of the apical conduit system. In some cases, the container 255a might comprise a lid structure to allow ease of access to the wireless access point 260 and other components contained within the container 255a, when the container 255a is not encapsulated by filler material in the channel of the apical conduit system. FIGS. 14A-14K, 15A, and 15B depict various embodiments of antennas, antenna arrays, or antenna systems that may be implemented in the wireless access point devices.

In FIGS. 2L and 2M, an alternative set of embodiments of the wireless access point device 255 is shown. In this set of embodiments, the wireless access point device 255 might be placed above the lines, cables, and/or conduits that are disposed in the channel of the apical conduit system. In some cases, the wireless access point device 255 might float on (or near) the surface of the filler material (which might include, without limitation, the second application of the filler material, after the tack coat layer, as described below with respect to FIG. 3D or the one application of the filler material, when a conduit/cable capture device or the like is used). In some instances, the pass-throughs, power supply port 270, and input/output ports 265 might be disposed on the bottom portion of the container 255a and/or the access point device 260 (as shown, e.g., in FIG. 2L). According to some embodiments, such as shown in FIGS. 11C and 11D, a depression or cut may be made in the road surface near the top of the channel to provide a groove, ledge, or the like upon which the wireless access point device 255 may be placed. In some cases, as shown in FIGS. 2M, 11C, and 11D, the wireless access point device 255 might have a circular shape (i.e., a cylindrical body or housing). In some instances, the cylindrical wireless access point device 255 might have a diameter of about 1-3 inches and a height of about 1 inch. In other cases (not shown), the wireless access point device 255 might have any suitable shape, including, but not limited to, square prism, rectangular prism, triangular prism, trapezoidal prism, or any other polygonal prism or irregular-shaped 3D structure, rhombohedrons, trigonal trapezohedrons, octahedrons, icosahedrons, dodecahedrons, any polygonal antiprism or any polyhedron, or the like.

FIGS. 3A-6B illustrate embodiments of FTTP implementation (such as in a PON communications system implementation, in an Ethernet fiber communications system implementation, in an EPON, NGPON, or NGPON2 communications system implementation, and/or the like) and/or point-to-point fiber insertion implementation within the PON communications system (or alternatively, within an Ethernet fiber communications system implementation, within an EPON, NGPON, or NGPON2 communications system implementation, and/or the like), in some cases, depicting zoomed-in views of features shown in FIG. 1, and in other cases depicting several alternative embodiments of specific features. FIGS. 7A-12B of the '851 application and FIGS. 11A-16B of the '024700US application (which have already been incorporated herein by reference in their entirety) illustrate embodiments of point-to-point fiber insertion implementation within a PON communications system (or alternatively, within an Ethernet fiber communications system implementation, within an EPON, NGPON, or NGPON2 communications system implementation, and/or the like).

Figure 3A:
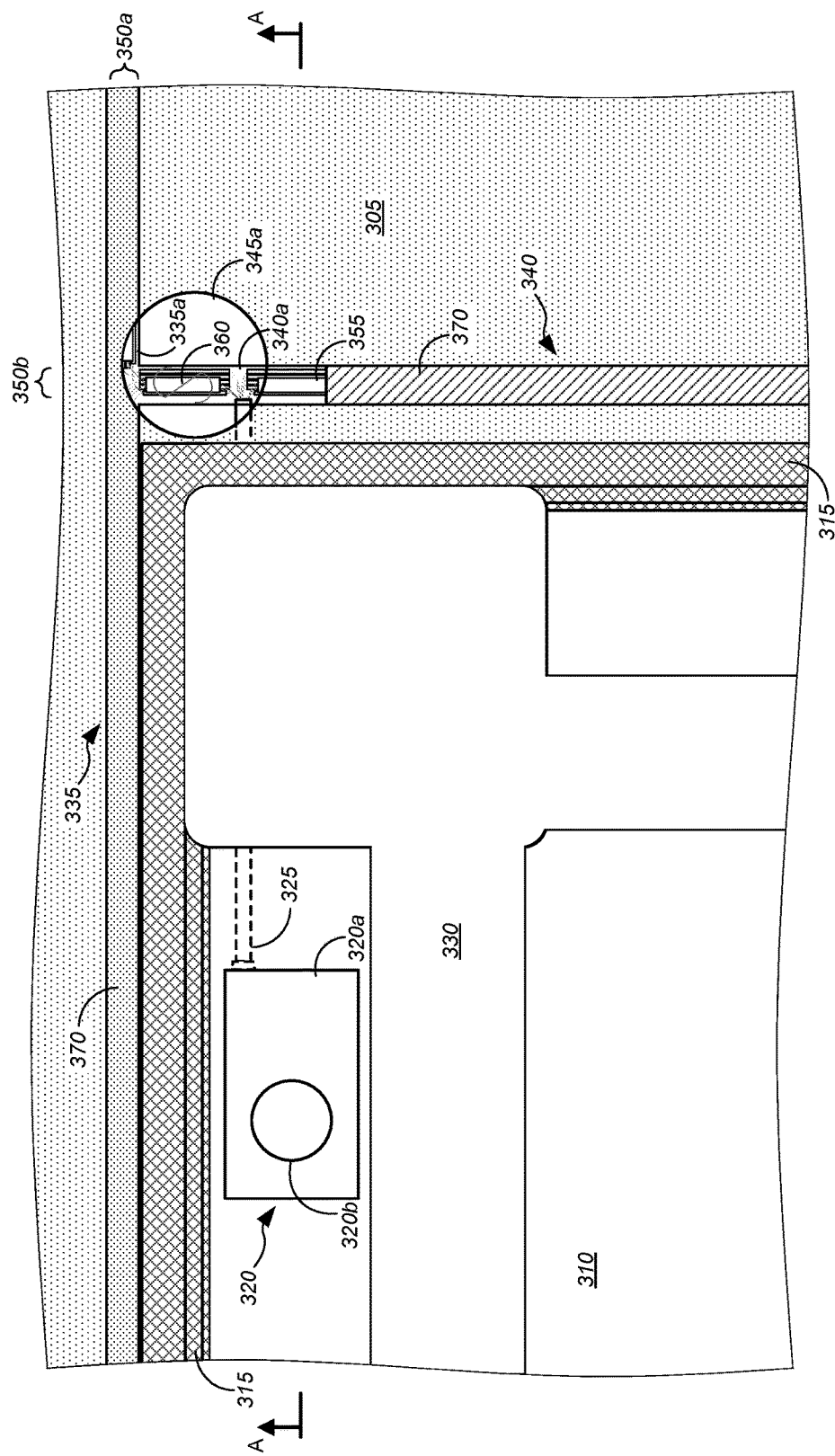
FIGS. 3A-3D are general schematic diagrams illustrating various views of a system for communicatively coupling lines within an apical conduit system and lines within a fiber distribution hub ("FDH") for implementing FTTP and/or point-to-point fiber insertion within a PON communications system, in accordance with various embodiments.
Figure 3B:
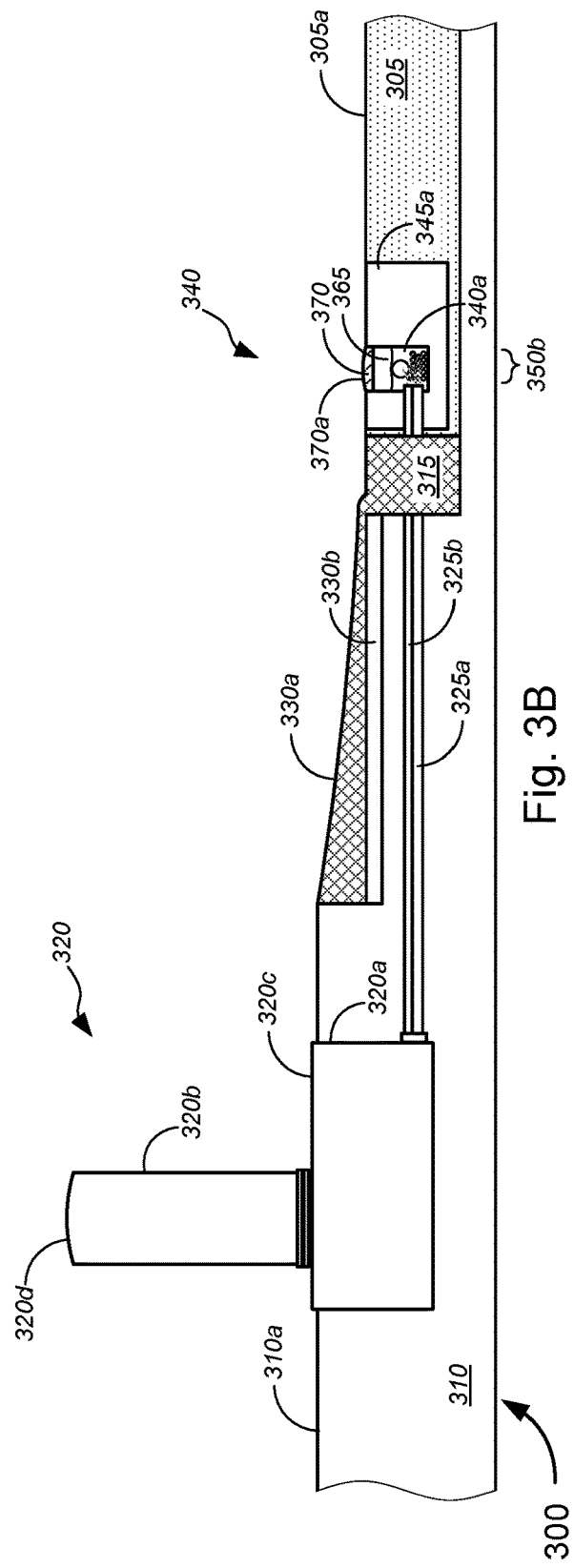
Figure 3C:
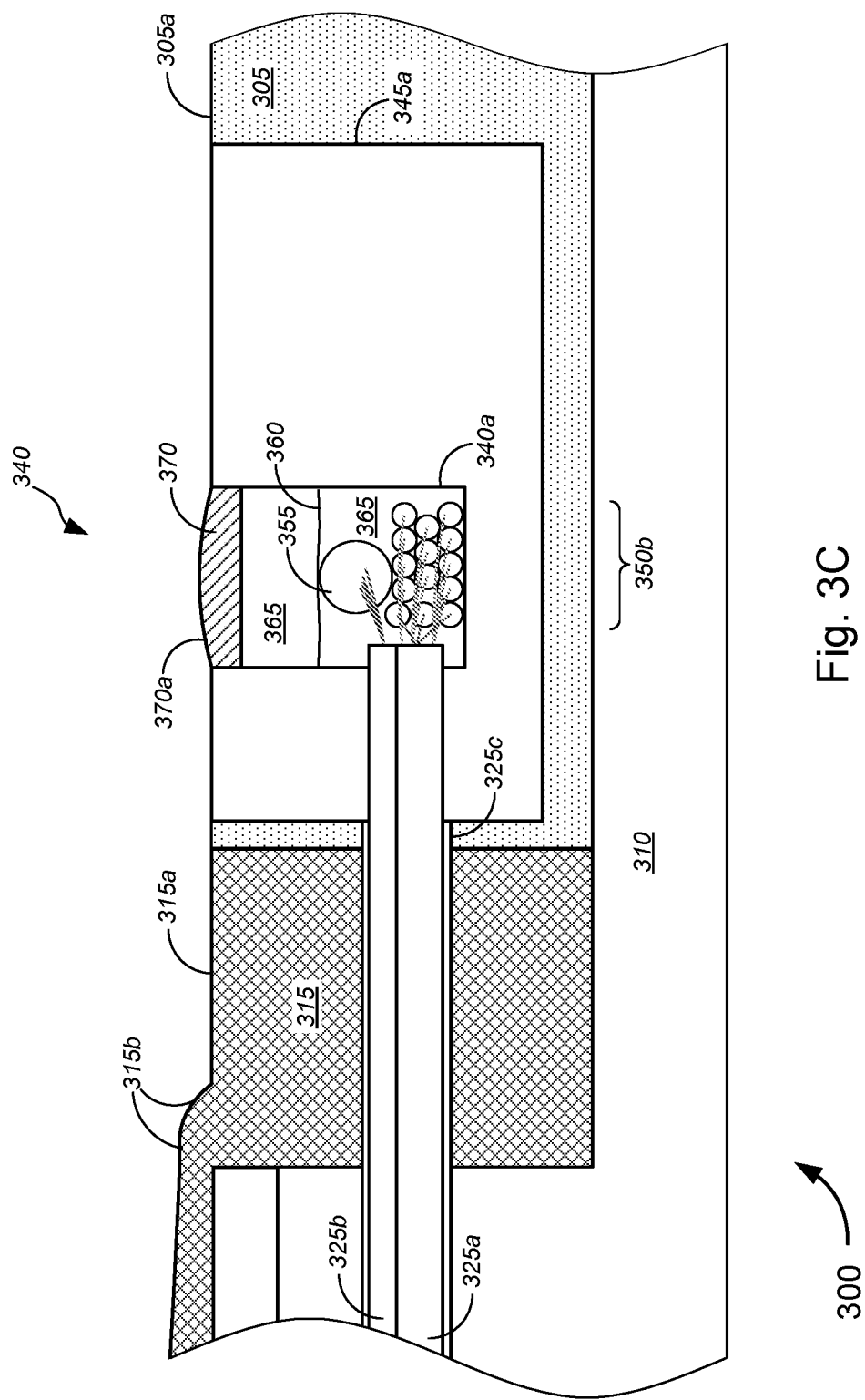
Figure 3D:
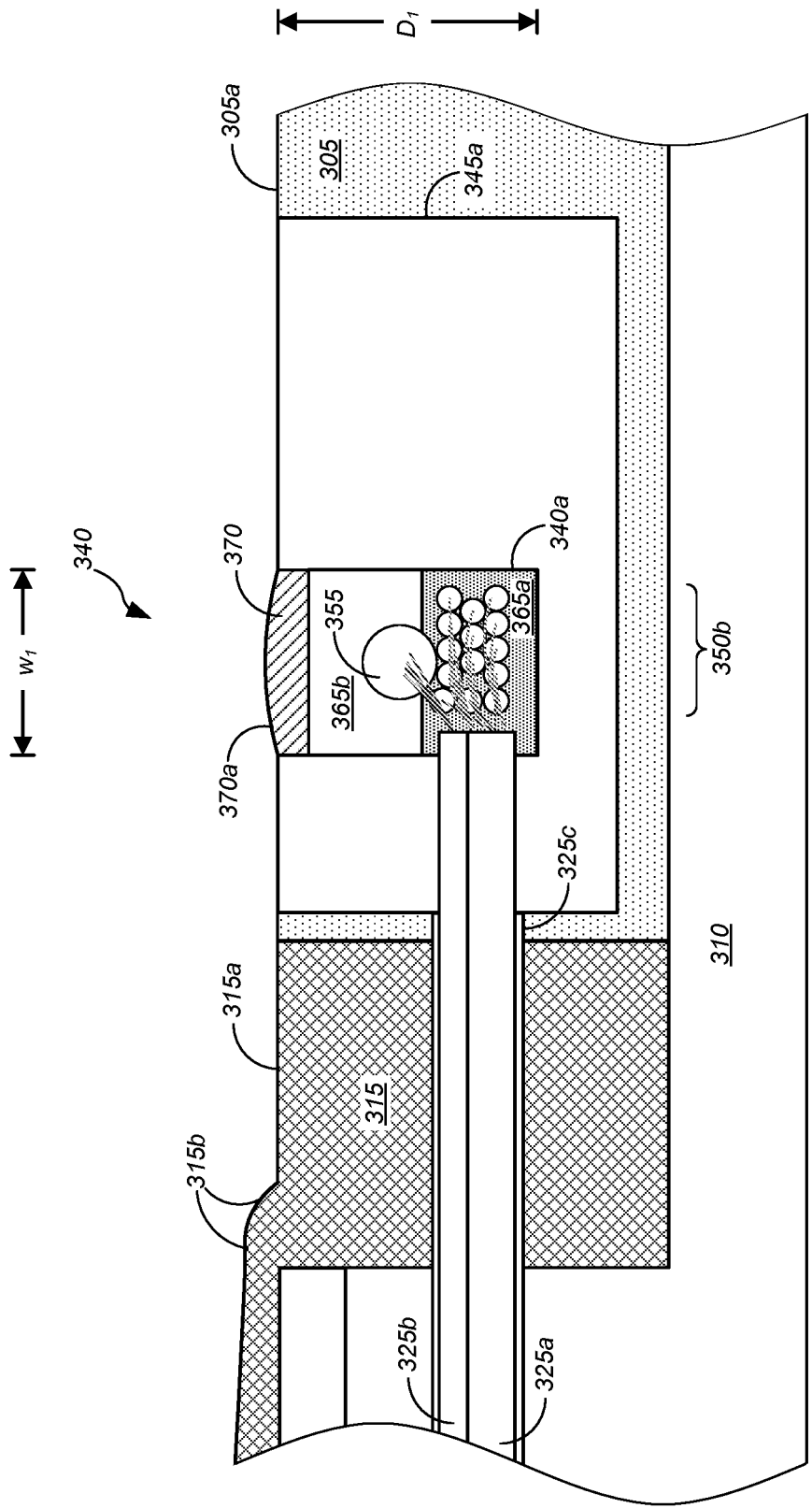

In particular, FIGS. 3A-3D (collectively, "FIG. 3") are general schematic diagrams illustrating various views of a system 300 for communicatively coupling lines within an apical conduit system and lines within a fiber distribution hub ("FDH") for implementing FTTP and/or point-to-point fiber insertion within a PON communications system (or alternatively, within an Ethernet fiber communications system implementation, within an EPON, NGPON, or NGPON2 communications system implementation, and/or the like), in accordance with various embodiments. FIG. 3A shows a top view of a section of ground in which components of a ground-based distribution device and components of an apical conduit system are disposed. FIG. 3B shows a partial sectional view of the system 300 of FIG. 3A, as shown along the A-A direction indicated in FIG. 3A. FIG. 3C shows an enlarged partial view of the portion of system 300 shown in FIG. 3B. FIG. 3D shows an alternative embodiment to FIG. 3C in which the microduct/cable capture device 360 is replaced with a tack coat to hold the microduct/cables in place within the channel (i.e., source slot 335, main slot 340, cross slot 375, or far-side slot 390, etc.). System 300 in FIG. 3 generally corresponds to a section of ground as, for example, indicated by (but not necessarily precisely depicting) dash-lined rectangle 300 shown in FIG. 1.

FIGS. 4A-4B (collectively, "FIG. 4") are general schematic diagrams illustrating various views of a system 400 for communicatively coupling lines within an apical conduit system and lines within a direct bury network access point ("NAP") for implementing FTTP and/or point-to-point fiber insertion within a PON communications system (or alternatively, within an Ethernet fiber communications system implementation, within an EPON, NGPON, or NGPON2 communications system implementation, and/or the like), in accordance with various embodiments. FIG. 4A shows a top view of a section of ground in which components of a ground-based distribution device and components of an apical conduit system are disposed. FIG. 4B shows a partial sectional view of the system 400 of FIG. 4A, as shown along the B-B direction indicated in FIG. 4A. System 400 in FIG. 4 generally corresponds to a section of ground as, for example, indicated by (but not necessarily precisely depicting) dash-lined rectangle 400 shown in FIG. 1.

FIGS. 5A-5B (collectively, "FIG. 5") are general schematic diagrams illustrating various views of a system 500 for communicatively coupling lines within an apical conduit system and lines within a hand hole for implementing FTTP and/or point-to-point fiber insertion within a PON communications system (or alternatively, within an Ethernet fiber communications system implementation, within an EPON, NGPON, or NGPON2 communications system implementation, and/or the like), in accordance with various embodiments. FIG. 5A shows a top view of a section of ground in which components of a ground-based distribution device and components of an apical conduit system are disposed. FIG. 5B shows a partial sectional view of the system 500 of FIG. 5A, as shown along the C-C direction indicated in FIG. 5A. System 500 in FIG. 5 generally corresponds to a section of ground as, for example, indicated by (but not necessarily precisely depicting) dash-lined rectangle 500 shown in FIG. 1.

FIGS. 6A-6B (collectively, "FIG. 6") are general schematic diagrams illustrating various views of a system 600 for communicatively coupling lines within an apical conduit system and lines within a hand hole routed from a NAP through a cross-slot in a road surface for implementing FTTP and/or point-to-point fiber insertion within a PON communications system (or alternatively, within an Ethernet fiber communications system implementation, within an EPON, NGPON, or NGPON2 communications system implementation, and/or the like), in accordance with various embodiments. FIG. 6A shows a top view of a section of ground in which components of a ground-based distribution device and components of an apical conduit system are disposed. FIG. 6B shows a partial sectional view of the system 600 of FIG. 6A, as shown along the D-D direction indicated in FIG. 6A. System 600 in FIG. 6 generally corresponds to a section of ground as, for example, indicated by (but not necessarily precisely depicting) dash-lined rectangle 600 shown in FIG. 1.

In FIGS. 3-6, systems 300-600 might comprise one or more of roadway 305, ground 310, curb 315, FDH 320, conduits 325, pathway 330, source slot 335, main slot 340, bore holes 345, lines 350, conduit/microduct 355, microduct/cable capture device 360, filler material 365, capping material 370, cross slot 375, NAP 380, hand hole 385, far-side slot 390, and/or road lines 395, or the like. In some instances, roadway 305 might be made of asphalt, concrete, and/or any combination thereof, or the like. Ground 310 might comprise soil (in some cases, compacted soil), mud, clay, rock, and/or any combination thereof, or the like. Curb 315 might be made of concrete or the like. A sub-base layer (not shown) might be disposed between the roadway 305 and ground 310. In some cases, curb 315 might comprise a portion of a roadway surface 315*a* and a portion of a non-roadway surface 315*b*.

According to some embodiments, conduits 325 might include, without limitation, conduits 325*a*-325*b*, missile bores 325*c*, conduit 325*d*, conduits 325*e*-325*f*, missile bore 325*g*, and/or the like. Conduits 325*a*-325*b* might extend, within missile bore 325*c*, between one of FDH 320, NAP 380, or hand hole 385 and one of bore hole 345, source slot 335, main slot 340, cross slot 375, or far-side slot 390. Conduit 325*d* might extend between one of NAP 380 or hand hole 385 and each of a NID or ONT (e.g., NID or ONT 170) disposed on an exterior wall or exterior surface of a customer premises (e.g., customer premises 110). Conduits 325*e*-325*f* might extend, within missile bore 325*g*, between one of bore hole 345, main slot 340, or far-side slot 390 and another of bore hole 345, main slot 340, or far-side slot 390; conduits 325*e*-325*f*, within missile bore 325*g*, might, in some cases lie within a channel of cross slot 375 (or might be a missile bore otherwise set or disposed under surface 305*a* of roadway 305, either before or after roadway 305 is laid).

Each bore hole 345 provides simultaneous access to two or more slots (including, without limitation, source slot 335, main slot 340, cross slot 375, and/or far-side slot 390, or the like), to enable cross-connection or cross-placement of lines in one of the two or more slots with lines in the other one(s) of the two or more slots, and vice versa. In some cases, bore holes 345 might comprise a first bore hole 345*a* and one or more second bore holes 345*b*. The first bore hole 345*a* might be larger in diameter and/or depth compared with the one or more second bore holes 345*b*. While the first bore hole 345*a* might be used to cross-connect lines within the source slot 335, the main slot 340, and/or the conduit 325 to the FDH 320, the one or more second bore holes 345*b* might cross-connect lines within the conduit 325 to NAP 380 and/or hand hole 385 with lines in the main slot 340, the cross slot 375, and/or the far-side slot 390. Although bore holes 345 shown in FIGS. 3-6 are depicted as extending below channels of the corresponding apical conduit slots, the bore holes, according to the various embodiments, may be set to have any suitable depth relative to the depth of the channel (i.e., deeper, less deep, or substantially as deep).

The plurality of lines 350, the microduct/conduit 355, and the microduct/cable capture device 360 are disposed or placed in a channel of one or more slots (e.g., channel 335*a* of the source slot 335, channel(s) 340*a* of the main slot(s) 340, channel(s) 375*a* of the cross slot(s) 375, channel(s) 390*a* of the far-side slot(s) 390, and so on). In some embodiments, the plurality of lines 350 might include, without limitation, at least one of one or more conduits, one or more optical fiber cables, one or more conductive signal lines, one or more power lines, and/or the like. The one or more conductive signal lines might include, but are not limited to, copper data lines, copper video lines, copper voice lines, or any suitable (non-optical fiber) data cables, (non-optical fiber) video cables, or (non-optical fiber) voice cables, and/or the like. In some embodiments, at least one of the conductive signal lines can be used for carrying multiple signals simultaneously (e.g., data and video signal, first data and second data, first video signal and second data signal, or the like), by carrying the different signals as multiplexed signals or by carrying the different signals simultaneously on separate wavelengths, or the like. In one non-limiting example, GPON data might be combined with an additional analog video signal that is sent on the same signal line over a different wavelength. In some cases, some lines 350 might be routed via conduit/microduct 355, while other lines 350 might be routed substantially parallel with conduit/microduct 355 within groove or channels.

According to some embodiments, the plurality of lines 350 might include, but is not limited to, F1 cables, F2 cables, F3A cables, F3B cables, multiple-fiber push-on/push-off ("MPO") cables, twisted-copper pair cables, and/or the like. In some embodiments, the F1 cables might include, but are not limited to, F1 optical fiber cables 350a, which might communicatively couple a central office of a telecommunications service provider with the FDH 320 (which might comprise a container 320a and a pedestal portion 320b), as shown, e.g., in the embodiment of FIG. 3. In some instances, the F2 cables might include, without limitation, F2 optical fiber cables 350b, which might communicatively couple the FDH 320 with a NAP 380, as shown, e.g., in the embodiments of FIGS. 3 and 4 as described above. According to some aspects, the F3A cables and F3B cables (collectively, "F3 cables") might include, without limitation, F3 optical cables 350c, which might communicatively couple the NAP 380 to a NID or ONT (e.g., NID/ONT 170 in FIG. 1) that is mounted on an exterior wall of a customer premises (e.g., building of customer premises 110). In some cases, the F3 cables might run through the missile bore 325c between the NAP and the main slot 340, through the cross slot 375, through the far-side slot 390, through the missile bore 325c between the cross-slot 375 or far-side slot 390 and the hand hole 385, through conduits 325d, and/or any combination of these routes, in order to communicatively couple lines from the NAP 380 with lines leading into the NID/ONT of customer premises located across (or on the other side of) roadway 305 with respect to the NAP 380. Although the examples above refer to F1, F2, and F3 optical fiber cables, the F1, F2, and F3 cables may each include, without limitation, non-optical video/voice/data cables (e.g., conductive signal lines, as described above, or the like), power cables, and/or the like.

The conduit/microduct 355 might include any type of conduit that allows routing to any of the plurality of lines 350 described above. In some cases, the microduct 355 might have a range of diameters between 7.5 mm and 12 mm, while in other cases, conduit/microduct 355 might have any suitable diameter, so long as it fits within the channels (which is as described above).

In some embodiments, the microduct/cable capture device 360 might comprise a plurality of capture devices placed at suitable (possibly varying or, sometimes, random) intervals within the channels. According to some embodiments, each of one or more capture devices 360 might include at least one hooked end to hook under one or more lines or one or more conduits in order to facilitate lifting of the one or more lines or the one or more conduits, for maintenance, repair, replacement, etc. In some instances, some or all of the capture devices 360 might anchor to the sidewall(s) of the channels; in such cases, the capture devices 360 might further serve to secure the one or more lines or the one or more conduits at or near the bottom of the channels (e.g., to prevent lifting, such as during application/installation of the filler material). In some cases, some or all of the capture devices 360 might simply be placed on top of the one or more lines or the one or more conduits within the channels (i.e., without anchoring to the sidewalls of the channel). Although FIG. 3 shows an S-shaped capture device 360, the various embodiments are not so limited, and the capture device 360 may have any suitable shape to serve the function of lifting lines/conduits, the function of securing/keeping the lines/conduits at or near the bottom of the channels, or both.

The filler material 365 might include a thermosetting material, which in some cases might include, without limitation, polyurea or the like. The capping material 370 might include a thermosetting material (such as polyurea or the like), safety grout, asphalt sealer, concrete sealer, and/or the like. In some cases, the capping material 370 might comprise a sealer cap forming a mastic seal over the filler material. According to some embodiments, the capping material 370 might be colored and used to fill at least a portion of the channel, as well as to extend further along the surface of the roadway to serve as a continuous road line. In some instances, the filler material 365 and the capping material 370 might be the same material. In some embodiments, the filler material might be filled to a height within channels of between about 2.5 inches (~6.4 cm) and about 3 inches (~7.6 cm), while the capping material might be about 0.5 inches (~1.3 cm) to about 0.75 inches (~1.9 cm) deep.

In some embodiments, roadway 305, curb 315, FDH 320, missile bores 325c, conduits 325d, pathway 330, source slot 335, main slot 340, bore holes 345, cross slot 375, NAP 380, hand hole 385, far-side slot 390, and road lines 395 of FIGS. 3-6 might correspond to roadway 115, curb 120, FDH 160a, missile bores 165a-165b, conduits 165c, pathway 125, source slot 130, main slot 135, bore holes 150a-150b, cross slot 145, NAP 160c, hand hole 160b, far-side slot 140, and road lines 155 of FIG. 1, respectively. As such, the descriptions of roadway 115, curb 120, FDH 160a, missile bores 165a-165b, conduits 165c, pathway 125, source slot 130, main slot 135, bore holes 150a-150b, cross slot 145, NAP 160c, hand hole 160b, far-side slot 140, and road lines 155 of FIG. 1 are applicable to roadway 305, curb 315, FDH 320, missile bores 325c, conduits 325d, pathway 330, source slot 335, main slot 340, bore holes 345, cross slot 375, NAP 380, hand hole 385, far-side slot 390, and road lines 395 of FIGS. 3-6.

With respect to the embodiments of FIGS. 1 and 3-6, the various apical conduit system components may be designed or configured in accordance with one or more of the following non-limiting implementations. In some embodiments, the channels of any or all of the source slot, main slot(s), far-side slot(s), and cross slot(s) (i.e., channel 335a, channel(s) 340a, channel(s) 375a, channel(s) 390a, and/or the like) can be created by milling (or otherwise cutting into) the roadway or other ground surface. In various aspects, the channels might have a variety of widths. Merely by way of example, in some cases, the channels might have a width of between about 0.5 inches (~1.3 cm) and about 12 inches (~30.5 cm), while in other cases, the channels might have a width of between about 1 inch (~2.5 cm) and about 6 inches (~15.2 cm). In other cases, the channels might have a width between about 1.5 inches (~3.8 cm) and about 2.5 inches (~6.4 cm), or a width of about 2 inches (~5.1 cm). FIG. 3D, for example, depicts channel 340 having a channel width of $w_1$, which may be width within these ranges of channel width. The depth of the channels can vary as well, so long as the channel does not compromise the structural integrity of the ground surface (e.g., roadway, etc.) in which it is created. Merely by way of example, the channels might have a depth of no greater than about 3 inches (~7.6 cm), a depth of no greater than about 1 inch (~2.5 cm), or a depth of no greater than about 0.5 inches (~1.3 cm). In some embodiments, the depth of the channels might be about 3 inches (~7.6 cm), while the width of the channels might be either about 0.5 inches (~1.3 cm) or about 1 inch (~2.5 cm). In other embodiments, the depth of the channels might be about 4 or 5 inches (~10.2 or 12.7 cm), or any depth that is appropriate in light of the circumstances, including the structural features of the roadway (depth, strength, etc.), the characteristics of the communication lines to be installed in the channels, etc. FIG. 3D, for example, depicts channel 340 having a channel depth of $D_1$, which may be depth within these ranges of channel depth.

In one aspect, certain embodiments can allow a provider or vendor to lay fiber lines and/or other lines on top of the road surface by creating a shallow groove or channel (e.g., 2" (~5.1 cm) wide, 0.5" (~1.3 cm) deep; 0.5" (~1.3 cm) wide, 3" (~7.6 cm) deep; or 1" (~2.5 cm) wide, 3" (~7.6 cm) deep; and/or the like) in the pavement along the edge of the pavement. In some embodiments, the source slot or the main slot (e.g., source slot 130 or main slot 135 shown in FIG. 1) might each have a 0.75" (~1.9 cm) wide, 3" (~7.6 cm) deep channel, while the far-side slot (e.g., far-side slot 140 shown in FIG. 1) might have a 0.5" (~1.3 cm) wide, 2" (~5.1 cm) deep channel, and the cross slot (e.g., cross slot 145) might have a 0.5" (~1.3 cm) wide, 3" (~7.6 cm) deep channel.

In a single operation, a conduit (e.g., conduit 355 or the like) could be placed in the groove or channel, while cast-in-place polyurea cap is extruded over it, encapsulating the conduit and bonding it with the road surface. In this embodiment, the conduit provides the thoroughfare for the fiber optic or other lines while the polyurea provides bonding to the concrete or asphalt surface, mechanical protection against traffic and impact loads (including vandalism, etc.), and water tightness. Such embodiments can minimize costs associated with construction and tie-ins, providing a tailored technical solution that is optimized for the physical characteristics of the challenge at hand. The apical conduit system (otherwise referred to as "cast-in-place" technology or "cast-in-place fiber technology") is described in greater detail in the '034, '574, '691, '216, '020, '227, '488, '514, '754, and '109 applications and in the '665 and '676 applications, which have already been incorporated herein by reference in their entirety for all purposes.

Turning to the embodiment of FIG. 3, the example of FIG. 3A shows the relative configurations, positions, and arrangement of one embodiment of the system for implementing FTTP, in which the lines 350a within the source slot 335 are communicatively coupled with lines 350b within the main slot 340 through FDH 320, via the first bore hole 345a. As shown in FIG. 3A, the source slot 335 runs along a first roadway 305, while the main slot 340 runs along a second roadway 305 (which is substantially perpendicular to the first roadway 305, although the various embodiments allow for any relative orientation at any suitable angles between the adjacent roadways, as appropriate). In the example as shown in FIG. 3A, the first bore hole 345a is positioned so as to serve as an intersection amongst the source slot 335, the main slot 340, and the conduit 325 (leading to the FDH 320). In some cases, the position of the conduit 325 might be chosen to facilitate interconnection with each of the source slot 335 and the main slot 340. Further, the various embodiments allow for any configuration of the pathway 330, curb 315, FDH 320, source slot 335, main slot 340, and bore hole 345a, relative to roadway 305 and ground 310, other than as shown in FIG. 3.

In the embodiment of FIG. 3B, a top surface 320c of container 320a of the FDH 320 is shown as being substantially level with a top portion 310a of ground surface 310. The only portions of the FDH that are substantially above the ground surface 310a is the pedestal portion 320b and applicable connection components for connection with the container 320c. The components of the pedestal FDH 330 are described in detail above with respect to FIGS. 2A-2B.

The top portion 320d of the pedestal 320b may be one of flat with relatively sharp circular edge(s) connecting to the side of the cylindrical pedestal 320b, flat with rounded circular edge(s) connecting to the side of the cylindrical pedestal 320b, curved with sharp circular edge(s) connecting to the side of the cylindrical pedestal 320b, curved with rounded circular edge(s) connecting to the side of the cylindrical pedestal 320b, domed with sharp circular edge(s) connecting to the side of the cylindrical pedestal 320b, domed with rounded circular edge(s) connecting to the side of the cylindrical pedestal 320b, and/or the like.

Pathway 330, as shown in FIGS. 3-6, might include, without limitation, an upper portion 330a on which people may walk, run, or bike, and a base portion 330b that provides sufficient support and/or adhesion to surrounding ground 310. As shown in FIG. 3B, the upper portion 330a might comprise a sloped segment, and in some cases might join or merge with curb 315, particularly where the pathway 330 is a street-corner sidewalk (such as street-corner sidewalk 125b in FIG. 1). According to some embodiments, conduit 325—disposed between (and communicatively coupling) the FDH 320 and one or more of source slot 335, main slot 340, and/or bore hole 345—might comprise a first conduit 325a and a second conduit 325b, as shown in FIG. 3B. In some cases, the second conduit 325b might communicatively couple lines therein with lines in conduit 355. In some instances, the first conduit might communicatively couple lines therein with lines 350 (such as F1 cables, F2 cables, or both).

In some embodiments, F1 or F2 cables might be routed substantially parallel with the second conduit, without themselves being routed through any conduit; in such cases, the F1 cables might run through the channels of the source and/or main slots, might run through a missile bore 325c between the bore hole 345 and the FDH 320 to the FDH 320, might be spliced and distributed by the FDH as F2 cables, and the F2 cables might run through the missile bore 325c to the main slot (and might further run through channels in the main slot(s), cross slot(s), and/or far-side slot(s)). The F1 and F2 cables might represent individual unidirectional lines that function as separate feed and return lines, might represent individual bi-directional lines that each function as both feed and return lines, or might represent a combination of unidirectional and bi-directional lines for carrying signals from the CO to the FDH, from the FDH to a NAP, from the NAP to the FDH, from the FDH to the CO, and/or the like.

With reference to FIG. 3C, a top surface 370a of capping material 370 is shown substantially level with a top portion of ground surface 305a of roadway 305. Also shown in FIG. 3C, the filler material 365 substantially fills at least the bottom portion of groove or channels 340a, up to the capping material 370, thereby submerging, and filling interstitial spaces between components of, the plurality of lines 350 and the conduit/microduct 355. In some cases, the filler material 365 and the capping material 370 might be the same material.

In some embodiments, the roadway surface 305a in which the source slot is disposed might correspond to a first ground surface, the roadway surface 305a in which the main slot is disposed might correspond to a second ground surface, and ground surface 310 in which the container of the FDH is disposed might correspond to a third ground surface. As shown in FIG. 3, the second ground surface might be a roadway surface, while the third ground surface might be a non-roadway surface. In some cases, curb surface 315a might represent a portion of a roadway surface, while curb surface 315b might represent a portion of a non-roadway surface. In some embodiments, the third ground surface might extend from the container 320a to the channels of the apical conduit system, and thus might comprise a combination of roadway 305, ground 310, and curb 315.

Turning to FIG. 3D, rather than using a microduct/cable capture device 360 to hold the microduct/cables in place within the channel 340a, a tacking technique may be implemented. In some embodiments, an initial application of the filler material 365 may be implemented, resulting in a first filler material 365a being disposed in the channel 340a. Upon application of the first filler material 365a, at least some of the lines 350 and/or the conduit/microduct might float to a surface portion of the first filler material 365a. Within a certain period (e.g., about 5 minutes, about 15 minutes, about 60 minutes, or longer, or any period between about 5-60 minutes), the first filler material 365a might begin to set, thereby acting as a tack coating to hold the microduct/cables in place within the channel 340a. A further application of the filler material 365 may be implemented after the tack coating has been applied, resulting in a second filler material 365b (which may, in some cases be the same material or same type of material as the first filler material 365a) being disposed in the channel 340a above the first filler material 365a.

In some embodiments, the first filler material 365a and the second filler material 365b might be different materials. In such cases, the first filler material 365a might comprise a material that, when set, may be more easily cut with a knife or other sharp-edged tool (by hand, for example), while the second filler material 365b might comprise thermosetting material including, without limitation, polyurea or other materials, which are more resilient. Further, in such cases, after the tack coat layer with the first filler material 365a, a second layer of the first filler material 365a might be applied on top of the tack coat layer in order to completely cover all microducts and/or cables (which may have floated to a surface of the first filler material 365a upon initial application of the tack coat layer). Once all the microducts and/or cables are completely submerged or encapsulated within the first filler material 365a, and the first filler material 365a has had time to set, then the second filler material may be applied. In this manner, if repairs have to be made to any broken fiber lines or other cables or conduits (as described with respect to FIGS. 9 and 10 of the '574 application, which has already been incorporated herein by reference in its entirety), it will be easier to access the broken fiber lines or other cables or conduits within the first filler material 365a, as compared with accessing the broken fiber lines or other cables or conduits when they are embedded within polyurea or other similar materials (which are extremely resilient to most cutting implements).

FIG. 4 shows the relative configurations, positions, and arrangement of one embodiment of the system for implementing FTTP, in which the lines from the NAP 380 are communicatively coupled with lines 350b within the main slot 340 and with lines 350c within the cross slot 375, via the second bore hole 345b. Some of lines 350c might communicatively couple with lines within conduits 325d leading to individual NIDs/ONTs (e.g., NID or ONT 170 in FIG. 1). In some embodiments, the cross slot 375 might be positioned to align with conduit 325 (or missile bore 325c); this allows a single bore hole 345a to serve as an intersection amongst the main slot 340, the cross slot 375, and the conduit 325 (or missile bore 325c) leading to the NAP 380. In alternative embodiments, the cross slot 375 may be positioned relative to the main slot 340 without regard to the position of conduit 325 (or missile bore 325c); in such embodiments, however, additional bore holes 345b may be necessary at intersections of two of the main slot 340, the cross slot 375, and the conduit 325 (or missile bore 325c) leading to the NAP 380.

In the embodiment of FIG. 4, the NAP 380 comprises a direct bury NAP 380. However, any suitable type of NAP may be implemented. Further, although hand hole 385 is shown in conjunction with NAP 380, the hand hole 385 is merely optional (and may be omitted); in such cases, the NAP 380 might communicatively couple lines 350c through conduits 325d directly to corresponding ones of the NIDs/ONTs (e.g., NID or ONT 170 in FIG. 1). Further, the various embodiments allow for any configuration of the pathway 330, curb 315, NAP 380, hand hole 385, main slot 340, cross slot 375, and bore hole 345b, relative to roadway 305 and ground 310, other than as shown in FIG. 4.

FIG. 5 shows the relative configurations, positions, and arrangement of one embodiment of the system for implementing FTTP, in which the lines 350c from a far-side slot 390 (which are routed through cross slot 375 from the NAP 380) are communicatively coupled with lines within conduit 325 leading to hand hole 385. Lines 350c from hand hole 385 might communicatively couple with lines within conduits 325d leading to individual NIDs/ONTs (e.g., NID or ONT 170 in FIG. 1).

Although hand hole 385 is shown connecting with two (or more) conduits 325d, the hand hole 385 is merely optional (and may be omitted); in such cases, the conduit 325 might communicatively couple lines 350c through conduits 325d directly (e.g., via splitting, "de-bundling," forking, or manifold connectors, or the like) to corresponding ones of the NIDs/ONTs (e.g., NID or ONT 170 in FIG. 1). Further, the various embodiments allow for any configuration of the pathway 330, curb 315, hand hole 385, far-side slot 390, road lines 395, and bore hole 345b, relative to roadway 305 and ground 310, other than as shown in FIG. 5.

FIG. 6 shows the relative configurations, positions, and arrangement of one embodiment of the system for implementing FTTP, in which the lines from the NAP 380 are communicatively coupled with lines 350b within the main slot 340 and with lines 350c within the cross slot 375, via one second bore hole 345b, and in which lines 350c within cross slot 375 are communicatively coupled with lines 350c in far-side slot 390 and lines 350c in conduit 325 leading to hand hole 385. Some of lines 350c might communicatively couple with lines within conduits 325d leading to individual NIDs/ONTs (e.g., NID or ONT 170 in FIG. 1), either directing from the NAP 380, from the NAP 380 through hand hole 385, from the NAP 380 through cross slot 375, through conduit 325, and through hand hole 385, or from the NAP 380 through cross slot 375, through far-side slot 390, through conduit 325, and through hand hole 385, or the like. In some embodiments, the cross slot 375 might be positioned to align with conduit 325 (or missile bore 325c); this allows a single bore hole 345a to serve as an intersection amongst any combination of the main slot 340, the cross slot 375, far-side slot 390, and/or the conduit 325 (or missile bore 325c) leading to the NAP 380. In alternative embodiments, the cross slot 375 may be positioned relative to the main slot 340 without regard to the position of conduit 325 (or missile bore 325c); in such embodiments, however, additional bore holes 345b may be necessary at intersections of two of the main slot 340, the cross slot 375, far-side slot 390, and the conduit 325 (or missile bore 325c) leading to the NAP 380.

In the embodiment of FIG. 6, the NAP 380 comprises a direct bury NAP 380. However, any suitable type of NAP may be implemented. Further, although hand hole 385 is shown in conjunction with NAP 380, the hand hole 385 is merely optional (and may be omitted); in such cases, the NAP 380 might communicatively couple lines 350c through conduits 325d directly to corresponding ones of the NIDs/ONTs (e.g., NID or ONT 170 in FIG. 1). Further, the various embodiments allow for any configuration of the pathway 330, curb 315, NAP 380, hand hole 385, main slot 340, cross slot 375, far-side slot 390, road lines 395, and bore hole 345b, relative to roadway 305 and ground 310, other than as shown in FIG. 6.

FIGS. 7A-7J (collectively, "FIG. 7") are general schematic diagrams illustrating various views of application of a tack coat layer(s) for an apical conduit system 700 that is used to implement FTTP and/or point-to-point fiber insertion within a PON communications system (or alternatively, within an Ethernet fiber communications system, within an EPON, NGPON, or NGPON2 communications system, and/or the like), in accordance with various embodiments. FIGS. 7A-7E depict various views of continuous application of a tack coat layer along an extended length (in some cases, almost an entire length) of a channel of an apical conduit slot. FIGS. 7F-7J depict various views of non-continuous or spot application of a tack coat layer along a length of a channel of an apical conduit slot.

With reference to FIGS. 7A-7E, FIG. 7A depicts a top view of a section of ground in which an apical conduit slot (in this example, an apical conduit main slot 340) is shown disposed in a ground surface (in this example, roadway 305), with each layer of the apical conduit system application, including (but not limited to) the one or more lines, the first filler material layer 365a, the second filler material layer 365b, and the capping material layer 370, being staggered for purposes of illustration. As shown in the non-limiting example of FIG. 7A, the one or more lines (including, but not limited to, F2 optical fiber cables 350b and conduit/microduct 355, or the like) might be disposed in the channel 340a of main slot 340, having a width $w_2$. In the channel 340a, on top of, or over the one or more lines is disposed the first filler material layer 365a (e.g., a tack coat layer, as described above with respect to FIG. 3D), resulting in tack-coat-covered or tack-coated lines (e.g., tack-coat-covered or tack-coated conduit/microduct 355a, or the like). On top of, or over, the first filler material layer 365a, in the channel 340a, is the second filler material layer 365b, on top of, or over, which is the capping material layer 370. In some embodiments, the capping material might be configured to be, or might include, without limitation, a shearable top coat that can be sheared from the filler material layers, without harming any of the one or more lines (i.e., without pulling up the filler material layers when the capping material is removed or lifted from the channel, or the like).

Figure 7A:
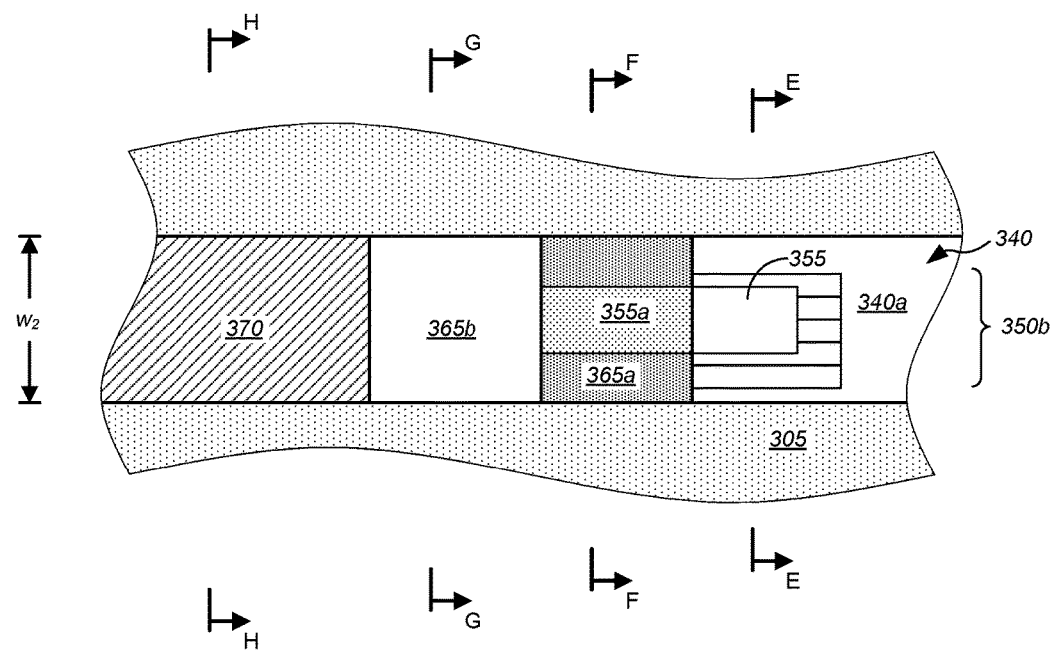
Figure 7B:
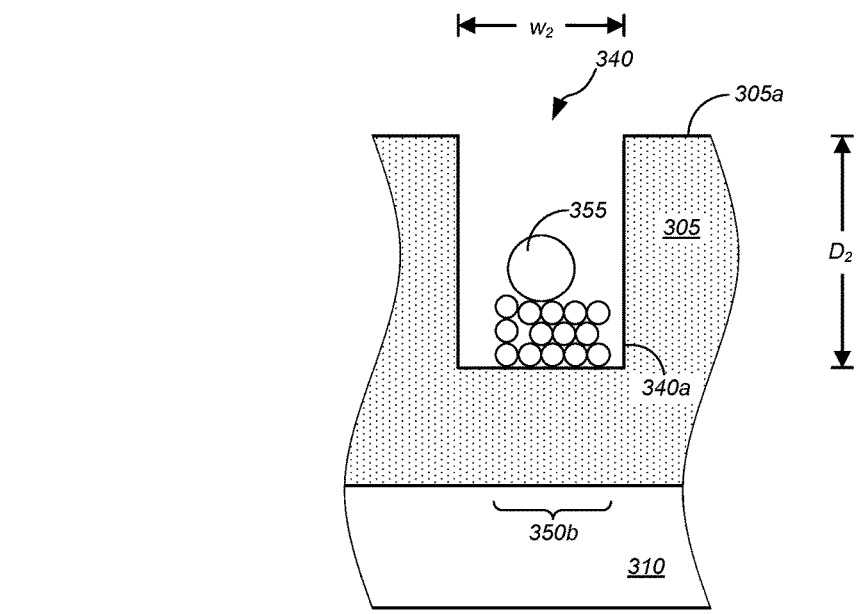

FIG. 7B is a partial sectional view of system 700, as shown along the E-E direction indicated in FIG. 7A, depicting a section of the apical conduit slot (in this case, the main slot 340) that has been cut in ground 305 to a depth of $D_2$ (and having a width of $w_2$); here, $D_2$ and $w_2$ are equivalent to $D_1$ and $w_1$, respectively, as described above with respect to FIG. 3D. As shown in FIG. 7B, one or more lines (including, but not limited to, F2 optical fiber cables 350b and conduit/microduct 355, or the like) might be disposed at the bottom of the channel (in this case, the channel 340a of the main slot 340).

FIG. 7C is a partial sectional view of system 700, as shown along the F-F direction indicated in FIG. 7A, depicting another section of the apical conduit slot (in this case, the main slot 340), in the channel (in this case, channel 340a) of which is disposed a first filler material layer 365a (e.g., a tack coat layer) over or on top of the one or more lines (as shown, e.g., in FIG. 7B). When the first filler material 365a is applied over the one or more lines, the one or more lines tend to float to the top of the first filler material layer 365a, until the first filler material 365a sets or hardens. As shown in FIG. 7C, the first filler material layer 365a has a depth $D_3$ that is less than the depth $D_2$ of the channel 340a; in some cases, the depth $D_3$ is less than one half of the depth $D_2$ (as shown in FIG. 7C), while in other cases, the depth $D_3$ is less than one third of the depth $D_2$ (not shown). In some cases, the depth $D_3$ might be about 0.5 inches.

FIG. 7D is a partial sectional view of system 700, as shown along the G-G direction indicated in FIG. 7A, depicting yet another section of the apical conduit slot (in this case, the main slot 340), in the channel (in this case, channel 340a) of which is disposed a second filler material layer 365b over or on top of the first filler material layer 365a (e.g., a tack coat layer) and the one or more lines (as shown, e.g., in FIG. 7C). As shown in FIG. 7D, the second filler material layer 365b has a depth $D_5$ that is less than the depth $D_2$ of the channel 340a; in some cases, the depth $D_5$ is about half of the depth $D_2$ (as shown in FIG. 7D), while in other cases, the depth $D_5$ is greater than one half of the depth $D_2$ (not shown). The total depth $D_4$ of the first and second filler material layers 365a and 365b is less than the depth $D_2$ of the channel 340a, to allow for application of capping material 370, as shown in FIG. 7E.

FIG. 7E is a partial sectional view of system 700, as shown along the H-H direction indicated in FIG. 7A, depicting a section of the apical conduit slot (in this case, the main slot 340), in the channel (in this case, channel 340a) of which is disposed a capping material layer 370 over or on top of the second filler material layer 365b, the first filler material layer 365a (e.g., a tack coat layer), and the one or more lines (as shown, e.g., in FIG. 7D). In some cases, as shown in FIG. 7E, a surface 370a of the capping layer 370 might bulge a little bit above the surface 305a of roadway 305, while in other cases (not shown), the surface 370a might be substantially flat with respect to surface 305a.

Figure 7F:
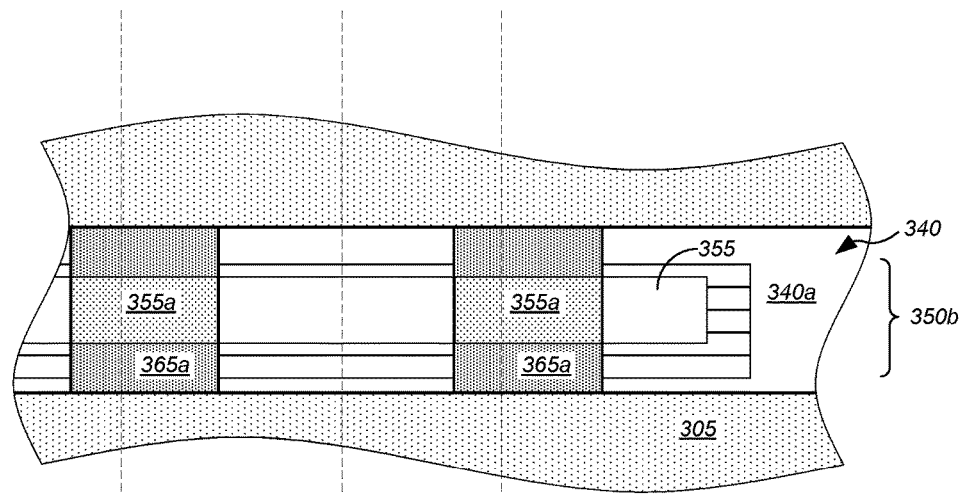

Turning to FIG. 7F, a top view is shown of a section of ground in which an apical conduit slot (in this example, an apical conduit main slot 340) is shown disposed in a ground surface (in this example, roadway 305). As shown in the non-limiting example of FIG. 7F, the one or more lines (including, but not limited to, F2 optical fiber cables 350b and conduit/microduct 355, or the like) might be disposed in the channel 340a of main slot 340, with non-continuous or spot application of the first filler layer 365a (e.g., a tack coat layer, as described above with respect to FIG. 3D) over a plurality of small segments of the one or more lines along the length of the channel 340a of main slot 340.

Figure 7G:
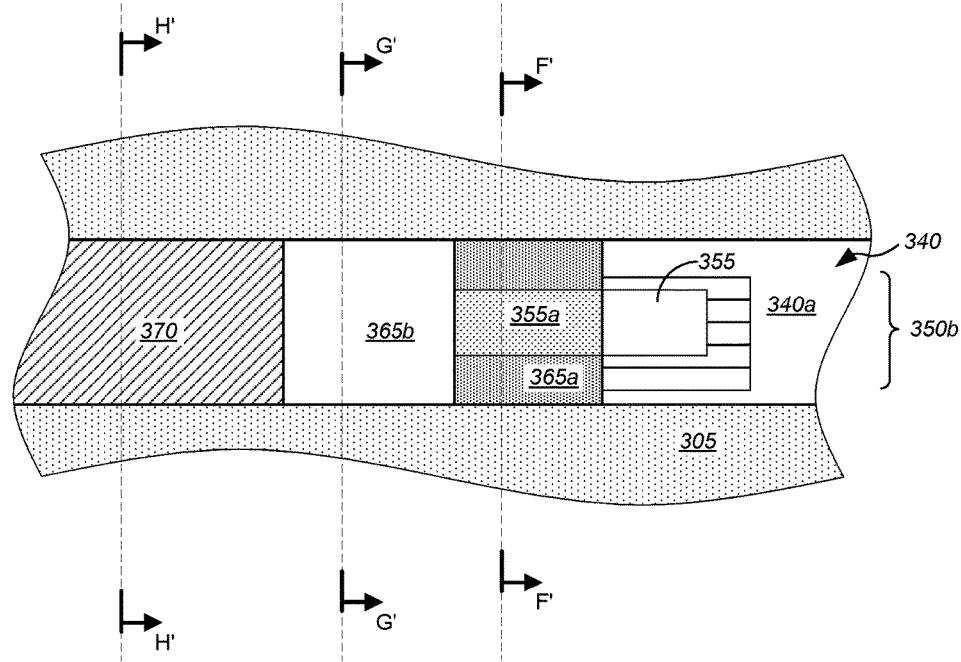

FIG. 7G depicts a top view of the same (or equivalent) section of ground as shown in FIG. 7F, except that the second filler material layer 365b and the capping material layer 370 have been applied over the one or more lines and the non-continuous or spot application of the first filler material layer 365a in channel 340a of main slot 340. Dashed lines through FIGS. 7F and 7G show the corresponding same (or equivalent) sections of ground between the two figures.

FIG. 7H is a partial sectional view of system 700, as shown along the F'-F' direction indicated in FIG. 7G, depicting a section of the apical conduit slot (in this case, the main slot 340), in the channel (in this case, channel 340a) of which is disposed a first filler material layer 365a (e.g., a tack coat layer) over or on top of the one or more lines (as shown, e.g., in FIG. 7B). As described above with respect to FIG. 7C, when the first filler material 365a is applied over the one or more lines, the one or more lines tend to float to the top of the first filler material layer 365a, until the first filler material 365a sets or hardens. As shown in FIG. 7H, the first filler material layer 365a has a depth $D_6$ that is similar to depth $D_3$ of the first filler material layer 365a in FIG. 7C.

FIG. 7I is a partial sectional view of system 700, as shown along the G'-G' direction indicated in FIG. 7G, depicting a section of the apical conduit slot (in this case, the main slot 340), in the channel (in this case, channel 340a) of which is disposed a second filler material layer 365b directly over or on top of the one or more lines (as shown, e.g., in FIG. 7B), without any intervening first filler material (e.g., tack coat layer) between the second filler material 365b and the one or more lines. Similar to the application of the first filler material 365a as described above with respect to FIGS. 7C and 7H, when the second filler material 365b is applied over the one or more lines, the one or more lines tend to float to the top of the second filler material layer 365a, until the second filler material 365a sets or hardens, except that in this case, the first filler material 365a is applied to segments of the one or more lines at least the locations shown in FIGS. 7H and 7J corresponding to the F'-F' and H'-H' line locations of FIGS. 7F and 7G. As shown in FIG. 7I, the second filler material layer 365b has a depth $D_7$ that is similar to total depth $D_4$ of the first filler material layer 365a and the second filler material 365b in FIG. 7D.

FIG. 7J is a partial sectional view of system 700, as shown along the H'-H' direction indicated in FIG. 7G, depicting a section of the apical conduit slot (in this case, the main slot 340), in the channel (in this case, channel 340a) of which is disposed a capping material layer 370 over or on top of the second filler material layer 365b, the first filler material layer 365a (e.g., a tack coat layer), and the one or more lines (as shown, e.g., in FIG. 7H). In some cases, as shown in FIG. 7J, a surface 370a of the capping layer 370 might bulge a little bit above the surface 305a of roadway 305, while in other cases (not shown), the surface 370a might be substantially flat with respect to surface 305a. The embodiment of FIG. 7J is similar, if not identical, to the embodiment of FIG. 7E.

FIGS. 8A-8F (collectively, "FIG. 8") are general schematic diagrams illustrating various embodiments 800 of tack coat applicators or molds, and corresponding views of application of a tack coat layer(s) using each embodiment of tack coat applicators or molds. These embodiments are merely illustrative and do not in any way limit the configurations either of the tack coat applicators and molds or of the resultant tack coat (i.e., first filler material) layer to the specific configurations shown in FIG. 8. Rather, any suitable configuration of the tack coat applicators and molds or of the resultant tack coat (i.e., first filler material) layer may be implemented, as necessary or as desired.

Figure 8C:
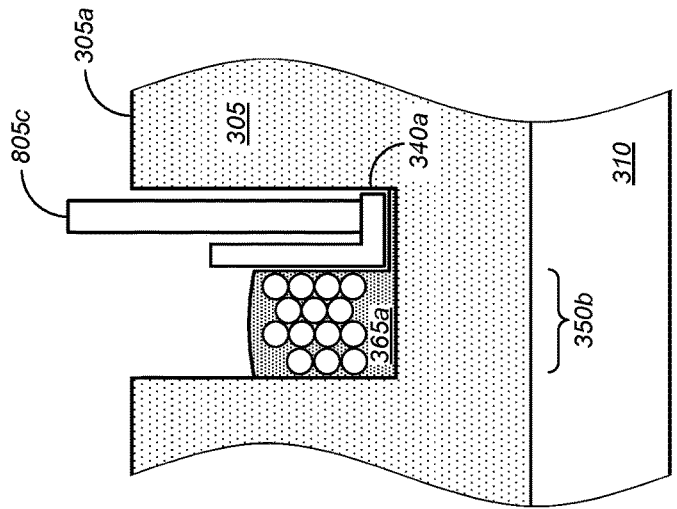
FIGS. 8A-8F are general schematic diagrams illustrating various embodiments of tack coat applicators or molds, and corresponding views of application of a tack coat layer(s) using each embodiment of tack coat applicators or molds.
Figure 8B:
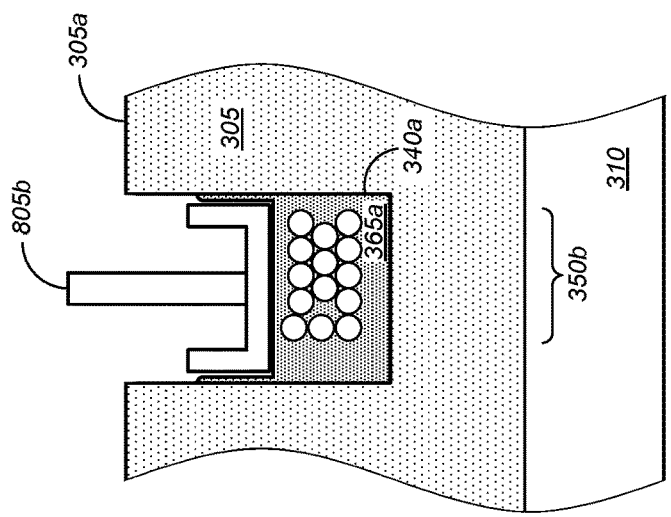
Figure 8A:
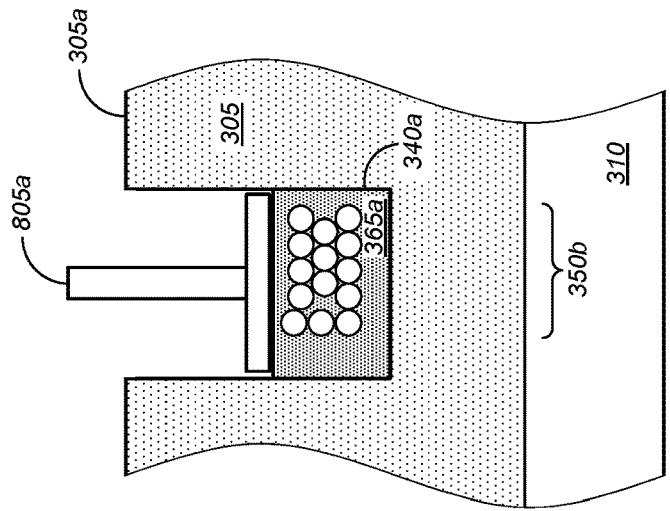

FIG. 8A depicts a first tack coat applicator or mold or top mold 805a, which has a "T-shaped" configuration when viewed from a side (or from the perspective of the channel (e.g., channel 340a)). The first tack coat applicator, mold, or top mold 805a has a relatively flat bottom segment (i.e., top of the upside-down "T") and a handle portion (i.e., bottom of the upside-down "T"). The flat bottom segment spans (or defines) the length of the first tack coat applicator, mold, or top mold 805a, and is configured to keep the tack coat layer 365a flat (prior to the tack coat setting), and also to keep the tack coat 365a from flowing down a slope (if the roadway 305 is sloped along the length of the apical conduit slot (e.g., main slot 340 in this example)). The handle portion may span the length of the first tack coat applicator, mold, or top mold 805a, or may otherwise span a small portion of the length of the first tack coat applicator, mold, or top mold 805a, and is configured to allow a user (or a machine) to move or hold the first tack coat applicator, mold, or top mold 805a in place within the channel after the lines have been disposed in the channel and after the first filler material 365a (i.e., the tack coat layer) has been applied over the lines in the channel. Ideally, a continuous-type tack coat layer (as shown with respect to FIGS. 7A-7E) is applied to the channel one segment at a time, with the segment being shorter in length relative to the length of the first tack coat applicator, mold, or top mold 805a. After a first segment has been molded at its top portion by the first tack coat applicator, mold, or top mold 805a, and after the first segment has set, then the tack coat 365a may be applied over a second segment of the channel, over the lines. For a non-continuous-type or spot-type tack coat (as shown with respect to FIGS. 7F-7J), the FIG. 8B depicts a second tack coat applicator or mold or top mold 805b, which has a general, flat "U-shaped" configuration with a tall straight piece rising from the middle of the flat "U-shaped" configuration, when viewed from a side (or from the perspective of the channel (e.g., channel 340a)). The width of the second tack coat applicator, mold, or top mold 805b (as measured from one end of the bottom portion of the flat "U" shape to the other end thereof) is, in some cases, shorter than the width of the first tack coat applicator, mold, or top mold 805a (as measured from one end of the bottom of the upside-down "T" shape to the other end thereof). The configuration of the second tack coat applicator, mold, or top mold 805b allows some of the tack coat 365a to rise or stick on the walls of the channel above a majority of the tack coat layer 365a, so that, when it is set, the tack coat layer forms a "U-shape" at the bottom of the channel. Because the tack coat layer 365a is easier to cut into compared with the second filler material 365b as described with respect to FIGS. 3D and 7, the thin layer along the walls of the channel allow for easier access from the sides, as well as easier removal of the hardened or set layers of filler material (including first and second filler materials 365) in which contain the lines, particularly during repair of the lines as described in detail with respect to FIGS. 9 and 10 of the '574 application (which has already been incorporated herein by reference in its entirety) and with respect to FIG. 10B below. The configuration and use of the second tack coat applicator, mold, or top mold 805b and the application of the tack coat 365a in the channel of FIG. 8B is otherwise similar to the configuration and use of the first tack coat applicator, mold, or top mold 805a and the application of the tack coat 365a in the channel of FIG. 8A, and similar descriptions apply.

FIG. 8C depicts a third tack coat applicator or mold or top mold 805c, which has a general "L-shaped" configuration with a tall straight piece rising from a portion of the bottom part of "L-shaped" configuration, when viewed from a side (or from the perspective of the channel (e.g., channel 340a)). The width of the third tack coat applicator, mold, or top mold 805c (as measured from one end of the bottom portion of "L" shape to the other end thereof) is, in some cases, much shorter than the width of the first tack coat applicator, mold, or top mold 805a (as measured from one end of the bottom of the upside-down "T" shape to the other end thereof) or the width of the second tack coat applicator, mold, or top mold 805b (as measured from one end of the bottom portion of the flat "U" shape to the other end thereof). The height of the third tack coat applicator, mold, or top mold 805c (as measured from one end of the tall portion of "L" shape to the other end thereof, one end of which is connected to the bottom portion of the "L") is significantly longer than tall portions of the "U" shape of the second tack coat applicator, mold, or top mold 805*b*. The configuration of the third tack coat applicator, mold, or top mold 805*c* allows some of the tack coat 365*a* to be mostly applied to a side or wall of the channel, thus allowing easy access from the side during repairs of the lines. In some cases, the third tack coat applicator, mold, or top mold 805*c* may be placed in the channel with the lines prior to the tack coat layer 365*a* being applied, while in other cases the third tack coat applicator, mold, or top mold 805*c* may be placed in the channel with the lines after the tack coat layer 365*a* has been applied, but before the tack coat layer 365*a* has set. Although FIG. 8C depicts one particular side to which the tack coat 365*a* is applied, the tack coat 365*a* may be applied to either side, as appropriate, necessary, or desired. The configuration and use of the third tack coat applicator, mold, or top mold 805*c* and the application of the tack coat 365*a* in the channel of FIG. 8C is otherwise similar to the configuration and use of the first tack coat applicator, mold, or top mold 805*a* and the application of the tack coat 365*a* in the channel of FIG. 8A or the configuration and use of the second tack coat applicator, mold, or top mold 805*b* and the application of the tack coat 365*a* in the channel of FIG. 8B, and similar descriptions apply.

Figure 8F:
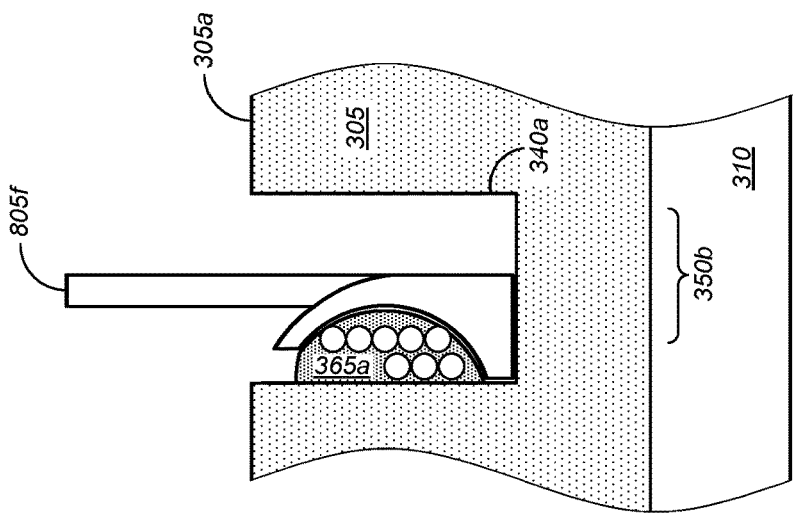
Figure 8E:
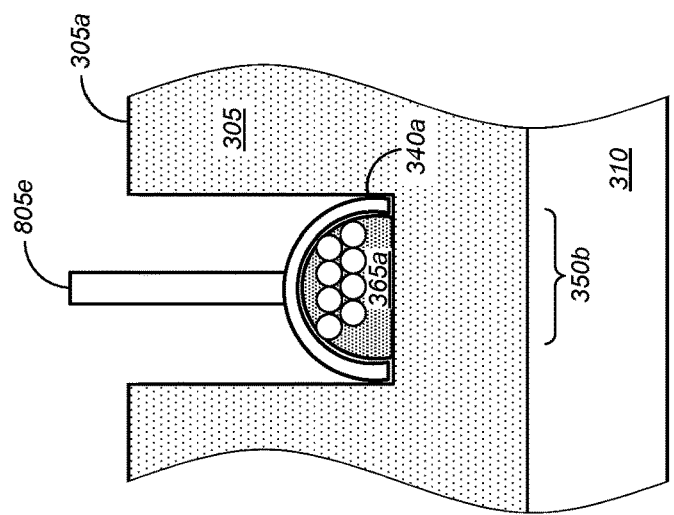
Figure 8D:
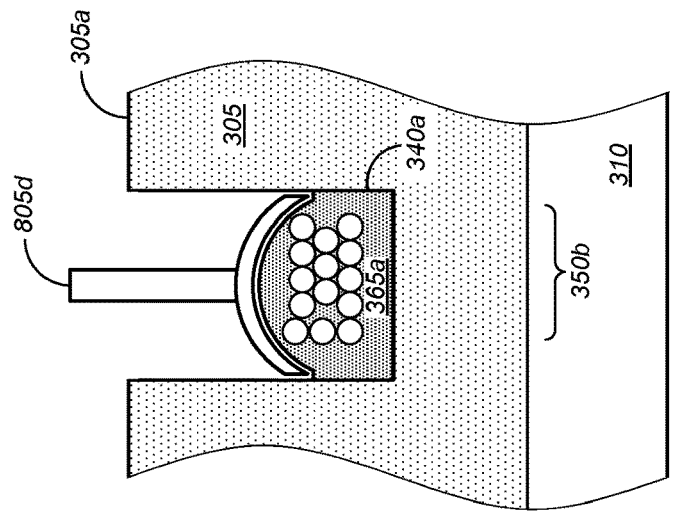

FIG. 8D depicts a fourth tack coat applicator or mold or top mold 805*d*, which has a general down-ward facing concave configuration with a tall straight piece rising from a top part of a middle portion of the concave configuration, when viewed from a side (or from the perspective of the channel (e.g., channel 340*a*)). The configuration of the fourth tack coat applicator, mold, or top mold 805*d* allows the tack coat to cover the lines (and prevent the lines from floating significantly into the second filler material), while allowing a significant portion of the surface area of the walls of the channel to bond with the second filler material, thereby strengthening the overall roadway 305 structure (the second filler material, particularly when using a particular compound or set of compounds of polyurea, being stronger than typical asphalt or concrete) despite the installation of the lines and the application of the tack coat layer. The configuration and use of the fourth tack coat applicator, mold, or top mold 805*d* and the application of the tack coat 365*a* in the channel of FIG. 8D is otherwise similar to the configuration and use of the first tack coat applicator, mold, or top mold 805*a* and the application of the tack coat 365*a* in the channel of FIG. 8A, the configuration and use of the second tack coat applicator, mold, or top mold 805*b* and the application of the tack coat 365*a* in the channel of FIG. 8B, or the configuration and use of the third tack coat applicator, mold, or top mold 805*c* and the application of the tack coat 365*a* in the channel of FIG. 8C, and similar descriptions apply.

FIG. 8E depicts a fifth tack coat applicator or mold or top mold 805*e*, which has a general down-ward facing hemispherical configuration with a tall straight piece rising from a top part of a middle portion of the hemispherical configuration, when viewed from a side (or from the perspective of the channel (e.g., channel 340*a*)). The configuration of the fifth tack coat applicator, mold, or top mold 805*e* allows the tack coat to cover the lines (and prevent the lines from floating significantly into the second filler material), while allowing almost all of the surface area of the walls of the channel to bond with the second filler material, thereby strengthening the overall roadway 305 structure (the second filler material, particularly when using a particular compound or set of compounds of polyurea, being stronger than typical asphalt or concrete) despite the installation of the lines and the application of the tack coat layer. The configuration and use of the fifth tack coat applicator, mold, or top mold 805*e* and the application of the tack coat 365*a* in the channel of FIG. 8E is otherwise similar to the configuration and use of the first tack coat applicator, mold, or top mold 805*a* and the application of the tack coat 365*a* in the channel of FIG. 8A, the configuration and use of the second tack coat applicator, mold, or top mold 805*b* and the application of the tack coat 365*a* in the channel of FIG. 8B, the configuration and use of the third tack coat applicator, mold, or top mold 805*c* and the application of the tack coat 365*a* in the channel of FIG. 8C, or the configuration and use of the fourth tack coat applicator, mold, or top mold 805*d* and the application of the tack coat 365*a* in the channel of FIG. 8D, and similar descriptions apply.

FIG. 8F depicts a sixth tack coat applicator or mold or top mold 805*f*, which has a general side-facing, partial hemispherical configuration with a tall straight piece rising from an opposite side from the side that the partial hemispherical configuration faces, when viewed from a side (or from the perspective of the channel (e.g., channel 340*a*)). The configuration of the sixth tack coat applicator, mold, or top mold 805*f* allows the tack coat 365*a* to be mostly applied to a side or wall of the channel, thus allowing easy access from the side during repairs of the lines, while covering the lines (and prevent the lines from floating significantly into the second filler material), and allowing almost all or a significant portion of the surface area of the bottom of the channel to bond with the second filler material, thereby strengthening the overall roadway 305 structure (the second filler material, particularly when using a particular compound or set of compounds of polyurea, being stronger than typical asphalt or concrete) despite the installation of the lines and the application of the tack coat layer. In some cases, the sixth tack coat applicator, mold, or top mold 805*f* may be placed in the channel with the lines prior to the tack coat layer 365*a* being applied, while in other cases the sixth tack coat applicator, mold, or top mold 805*f* may be placed in the channel with the lines after the tack coat layer 365*a* has been applied, but before the tack coat layer 365*a* has set. Although FIG. 8F depicts one particular side to which the tack coat 365*a* is applied, the tack coat 365*a* may be applied to either side, as appropriate, necessary, or desired. The configuration and use of the sixth tack coat applicator, mold, or top mold 805*f* and the application of the tack coat 365*a* in the channel of FIG. 8F is otherwise similar to the configuration and use of the first tack coat applicator, mold, or top mold 805*a* and the application of the tack coat 365*a* in the channel of FIG. 8A, the configuration and use of the second tack coat applicator, mold, or top mold 805*b* and the application of the tack coat 365*a* in the channel of FIG. 8B, the configuration and use of the third tack coat applicator, mold, or top mold 805*c* and the application of the tack coat 365*a* in the channel of FIG. 8C, the configuration and use of the fourth tack coat applicator, mold, or top mold 805*d* and the application of the tack coat 365*a* in the channel of FIG. 8D, or the configuration and use of the fifth tack coat applicator, mold, or top mold 805*e* and the application of the tack coat 365*a* in the channel of FIG. 8E, and similar descriptions apply.

FIGS. 9A-9J (collectively, "FIG. 9") are general schematic diagrams illustrating various views of application of an expanding filler layer(s) within spaces or voids found or formed in a roadway or subsurface material for an apical conduit system 900 that is used to implement FTTP and/or point-to-point fiber insertion within a PON communications system (or alternatively, within an Ethernet fiber communications system, within an EPON, NGPON, or NGPON2 communications system, and/or the like), in accordance with various embodiments. An advantage or major value of apical conduit systems as described herein or in the Related Applications is that the apical conduit system can encapsulate communications lines (or power lines and the like) within road surfaces, unlike micro-trenching, which places such lines below the road surface (i.e., within the roadway sub-surface or subgrade). Such placement of communications (or other) lines in the sub-surface or subgrade of a roadway has negative implications on the long-term structural integrity of the road. With the apical conduit system, however, the apical void (i.e., groove or channel) remains in the road surface, thereby reducing the amount of filler required during implementation of FTTP and/or point-to-point fiber insertion via use of apical conduit systems in roadway surface.

It can happen that portions of the road surface are uneven because of irregular construction, slightly uneven surfaces, and/or the like. In these cases, the apical void (i.e., groove or channel) can penetrate the road or road surface, into the sub-surface or subgrade, where rocks, dirt, voids, or the like can be encountered. Filling these areas uses a high volume of polyurea-based filler (i.e., first or second filler layers as described above), which can be expensive or cost-prohibitive. Alternatively, in in some areas where the sub-surface or subgrade layers are naturally hard, road surfaces can be shallow, and may simply rely on existing natural stones or structure (which, in some cases, may be composed of, or may include (without limitation), calcium carbonate, limestone, and/or the like).

To fill voids in or between the sub-surface or subgrade layers and the apical void, a less expensive type of filler material may be used. In some embodiments, such a third filler material may include foam-like filler material, which might be composed of material including, but not limited to, polyurea foams, plural compounds, and/or the like. One particular characteristic of such foam-like filler material is that, instead of being a liquid that escapes in every crack below the road or road surface, the foam-like filler material expands and fills the sub-surface spaces, voids, volumes, or cavities. Other spaces, voids, volumes, or cavities to fill might be created during the apical process, especially including digging under curbs, for access to FDH, NAP, etc., or the like. Filling these other spaces, voids, volumes, or cavities can be done by partially backfilling with dirt and/or by using the foam-like filler material.

In some embodiments, at least the second filler material 365b might flow and seep into interstitial spaces in asphalt, concrete, or other materials of roadway 305, thereby forming an interlocking, strengthening bond with the roadway material. This, however, does not require as much volume as trying to fill a void, space, volume, or cavity in the sub-surface layer beneath the roadway 305. The interlocking with the roadway material is desirable, but the expansion into the void, space, volume, or cavity (and beyond through cracks therefrom) is not.

FIGS. 9A-9J depict various views of an apical conduit channel of an apical conduit system that is used to implement of FTTP and/or point-to-point fiber insertion within a PON communications system. FIGS. 9A-9E depict various views showing the presence of a space, void, volume, or cavity 905 that is found or formed below a bottom portion of a segment of the channel (in this example, channel 340a or main slot 340) that has been formed in a road 305. FIGS. 9F-9J depict various views showing the presence of a space, void, volume, or cavity 905 that is found or formed beyond a side wall portion of a segment of the channel (in this example, channel 340a or main slot 340) that has been formed in a road 305.

Figure 9A:
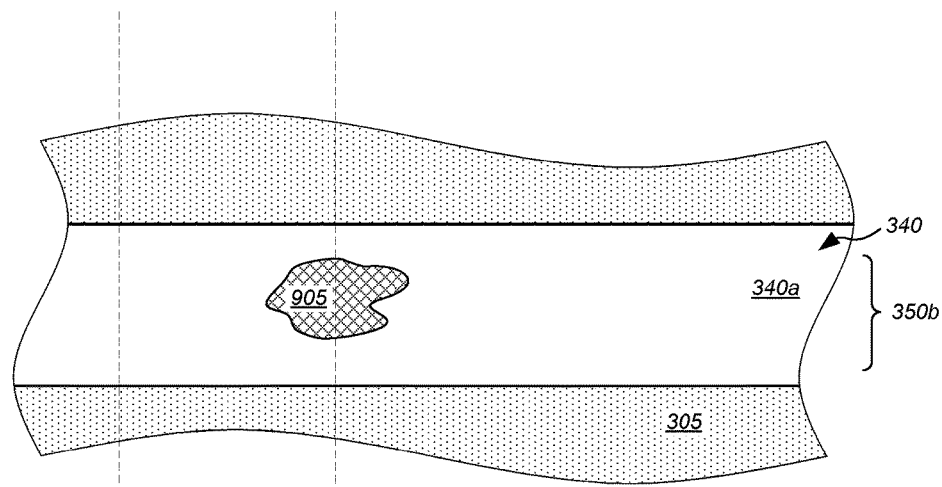
FIGS. 9A-9J are general schematic diagrams illustrating various views of application of an expanding filler layer(s) within spaces or voids found or formed in a roadway or subsurface material for an apical conduit system that is used to implement FTTP and/or point-to-point fiber insertion within a PON communications system, in accordance with various embodiments.

FIG. 9A depicts a top view of a section of ground in which an apical conduit slot (in this example, an apical conduit main slot 340) is shown disposed in a ground surface (in this example, roadway 305). As shown in the non-limiting example of FIG. 9A, a space, void, volume, or cavity 905 might be found or formed below a bottom portion of a segment of the channel (in this example, channel 340a or main slot 340) that has been formed in a road 305.

Figure 9B:
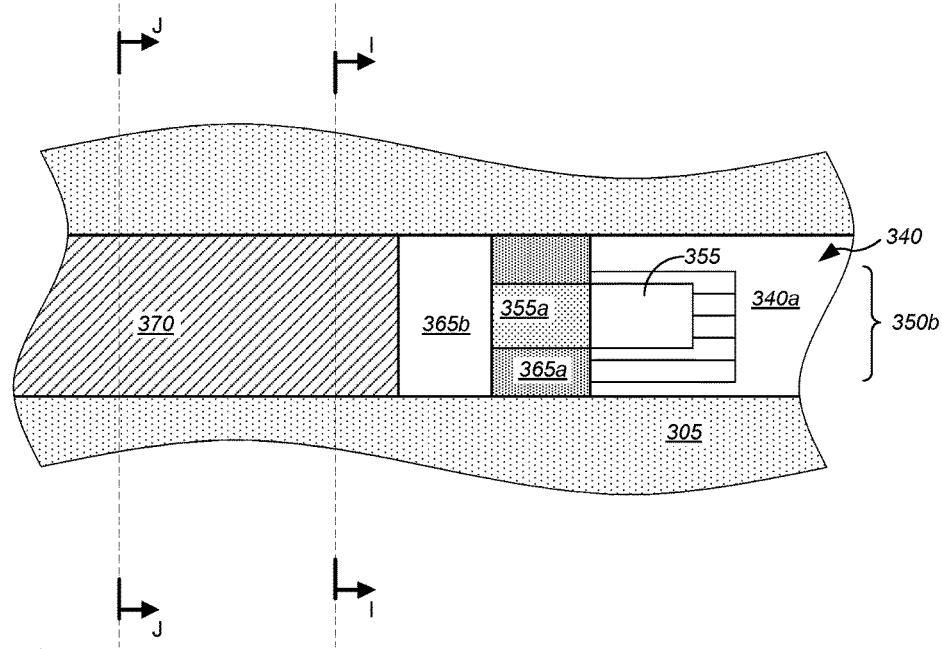

FIG. 9B depicts a top view of the same (or equivalent) section of ground as shown in FIG. 9A, except that one or more lines have been disposed in the channel 340, a first filler material layer 365a has been continuously applied (as in FIGS. 7A-7E) or non-continuously or spot applied (as in FIGS. 7F-7J) over the one or more lines, and a second filler material layer 365b and a capping material layer 370 have been applied over the one or more lines and the first filler material layer 365a in channel 340a of main slot 340. Dashed lines through FIGS. 9A and 9B show the corresponding same (or equivalent) sections of ground between the two figures.

Figure 9E:
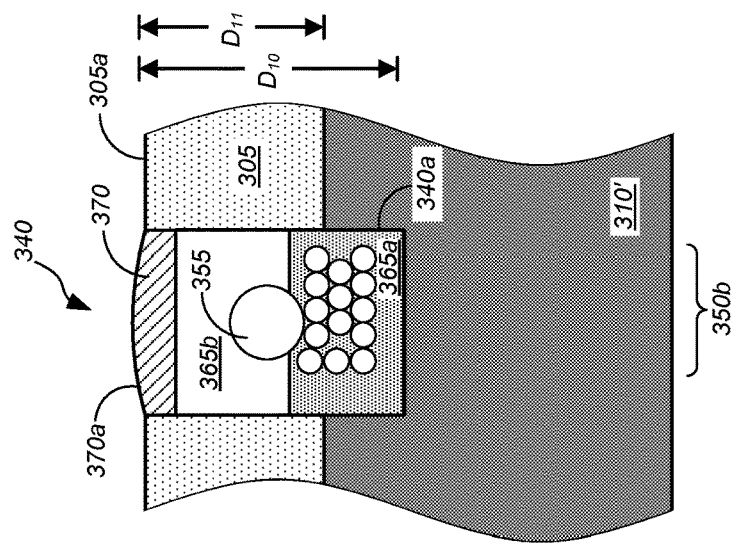
Figure 9D:
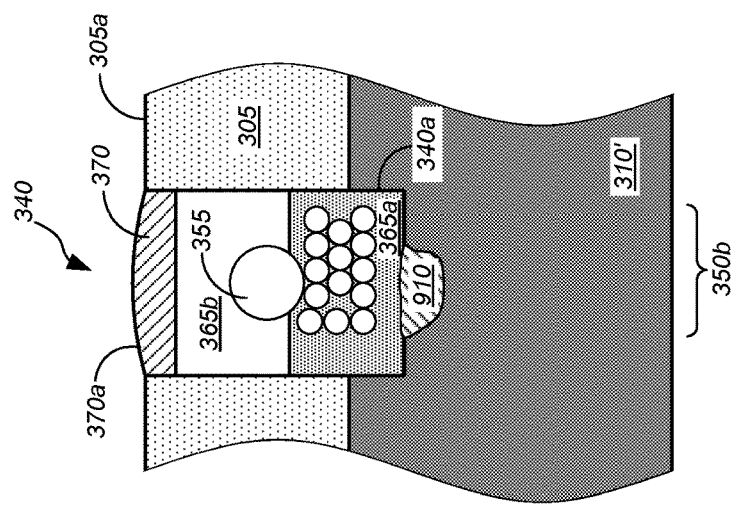
Figure 9C:
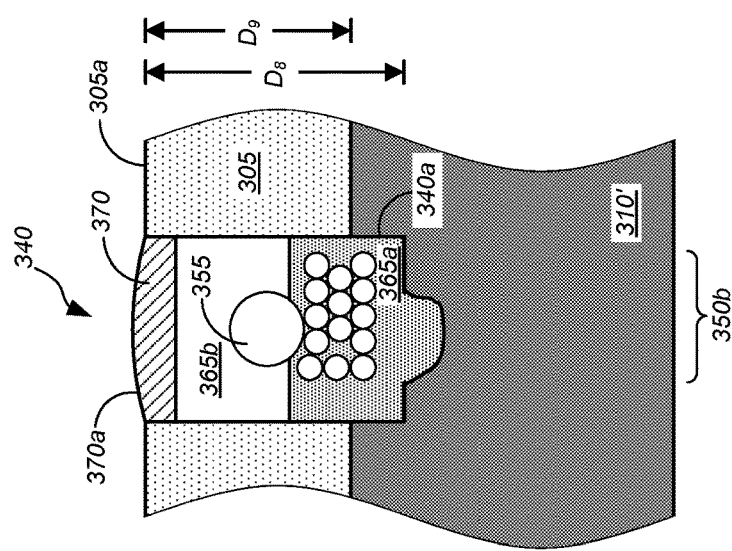

FIGS. 9C and 9D are alternative partial sectional views of system 900, as shown along the I-I direction indicated in FIG. 9B, depicting a section of the apical conduit slot (in this case, the main slot 340), in the channel (in this case, channel 340a) of which is disposed a capping material layer 370 over or on top of the second filler material layer 365b, the first filler material layer 365a (e.g., a tack coat layer), and the one or more lines (as shown, e.g., in FIGS. 7A-7E). In some cases, as shown in FIGS. 9C and 9D, a surface 370a of the capping layer 370 might bulge a little bit above the surface 305a of roadway 305, while in other cases (not shown), the surface 370a might be substantially flat with respect to surface 305a. Unlike the embodiments of FIG. 7, however, the channel 340a might be formed into a sub-surface or subgrade layer 310' of the road (as described above), and the space, void, volume, or cavity 905 might extend below the channel 340a into the sub-surface or subgrade layer 310', as shown in FIGS. 9C and 9D (and as described above with respect to FIG. 9A). As shown in FIG. 9C, the channel might have a depth $D_8$ (which is similar to depth $D_2$ of channel 340a in FIG. 7), while the roadway 305 might have a depth $D_9$ that is less than the depth $D_8$.

In the embodiment of FIG. 9C, the first filler material 365a (in some cases, particularly with non-continuous or spot application of the first filler material 365a, the second filler material 365b) might flow into and fill the space, void, volume, or cavity 905. The use of the first (or second) filler material 365a to fill the space, void, volume, or cavity 905, however, might be expensive or cost-prohibitive due to the cost of the filler material 365 (which might be polyurea based), especially as these filler materials are liquid before they set and may flow through cracks in the sub-surface or subgrade material through the space, void, volume, or cavity 905 (thereby require more of the first or second filler material to be used).

Rather than using either the first or second filler material 365 to fill the space, void, volume, or cavity 905, a third filler material 910, which is a less expensive material and might be foam-based (and can, in some cases, also be based on polyurea, or alternatively a plural compound, or the like), may be used. The foam-like third filler material 910, when applied to the space, void, volume, or cavity 905, tends to expand to fill the space, void, volume, or cavity 905, in some cases bulging into the volume of the channel 340a. Once the foam-like third filler material 910 sets, the one or more lines, the first filler material 365a (i.e., tack coat), the second filler material 365b, and the capping material 370 might be disposed in the channel 340a over or on top of the third filler material 910 and the (unaffected or regular) bottom portion of the channel 340a.

FIG. 9E is a partial sectional view of system 900, as shown along the J-J direction indicated in FIG. 9B, depicting a section of the apical conduit slot (in this case, the main slot 340), in the channel (in this case, channel 340a) of which is disposed a capping material layer 370 over or on top of the second filler material layer 365b, the first filler material layer 365a (e.g., a tack coat layer), and the one or more lines (as shown, e.g., in FIGS. 7A-7E). In some cases, as shown in FIG. 9E, a surface 370a of the capping layer 370 might bulge a little bit above the surface 305a of roadway 305, while in other cases (not shown), the surface 370a might be substantially flat with respect to surface 305a. FIG. 9E depicts a segment of the channel 340a of the roadway 305 of FIG. 9 without a space, void, volume, or cavity 905 below the channel 340a. Merely as an illustration of differing road surface depths (in this case, slightly exaggerated), the channel in FIG. 9E might have a depth $D_{10}$ (which is similar to depth $D_8$ of channel 340a in FIG. 9C), while the roadway 305 might have a depth $D_{11}$ that is less than the depth $D_{10}$ and less than the roadway depth $D_9$ of FIG. 9C, despite the segment of roadway 305 of FIG. 9E being proximal (or at least on the same stretch of road compared) to the segment of roadway 305 of FIG. 9C (as shown in FIG. 9B in the proximity of lines I-I and J-J, for example).

Figure 9F:
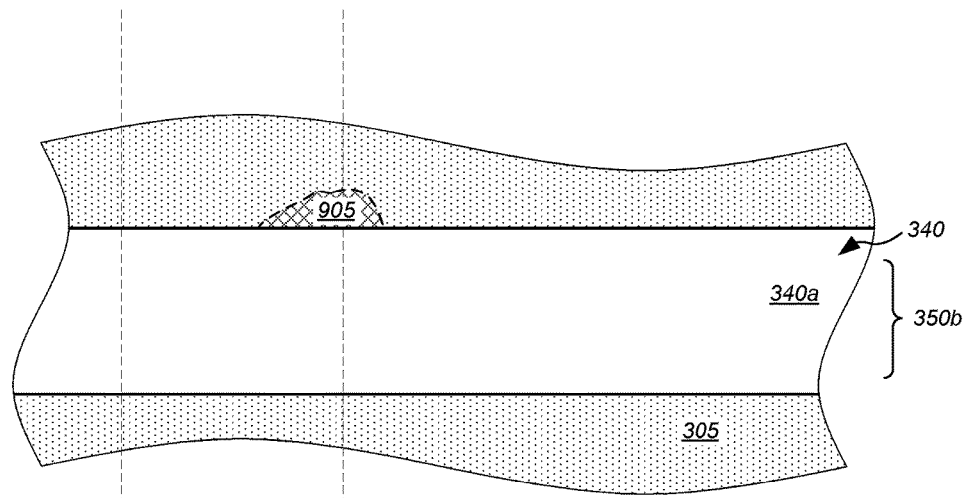

FIG. 9F depicts a top view of a section of ground in which an apical conduit slot (in this example, an apical conduit main slot 340) is shown disposed in a ground surface (in this example, roadway 305). As shown in the non-limiting example of FIG. 9F, a space, void, volume, or cavity 905 (shown in dashed lines to indicate that the space, void, volume, or cavity 905 is below surface 305a of roadway 305) might be found or formed beyond a side wall portion of a segment of the channel (in this example, channel 340a or main slot 340) that has been formed in a road 305.

Figure 9G:
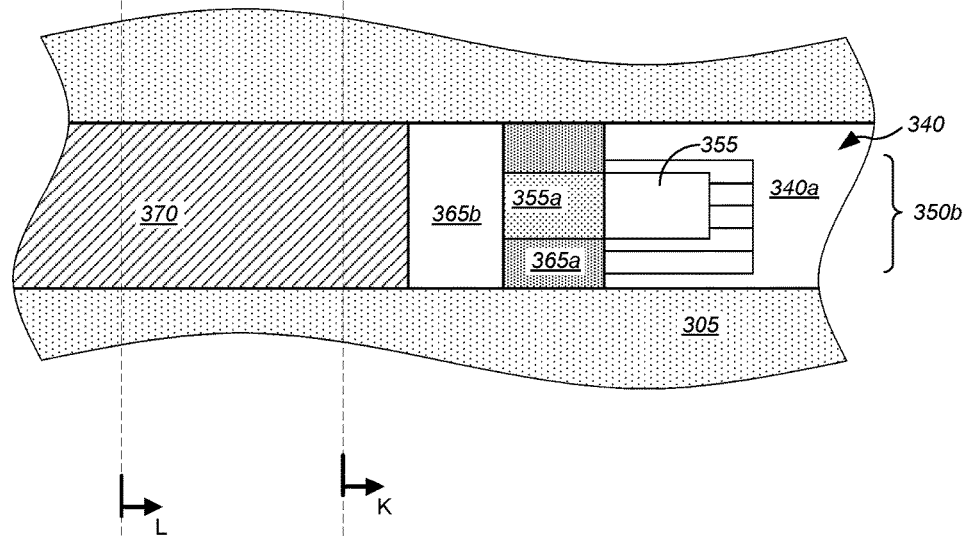

FIG. 9G depicts a top view of the same (or equivalent) section of ground as shown in FIG. 9F, except that one or more lines have been disposed in the channel 340, a first filler material layer 365a has been continuously applied (as in FIGS. 7A-7E) or non-continuously or spot applied (as in FIGS. 7F-7J) over the one or more lines, and a second filler material layer 365b and a capping material layer 370 have been applied over the one or more lines and the first filler material layer 365a in channel 340a of main slot 340. Dashed lines through FIGS. 9F and 9G show the corresponding same (or equivalent) sections of ground between the two figures.

Figure 9J:
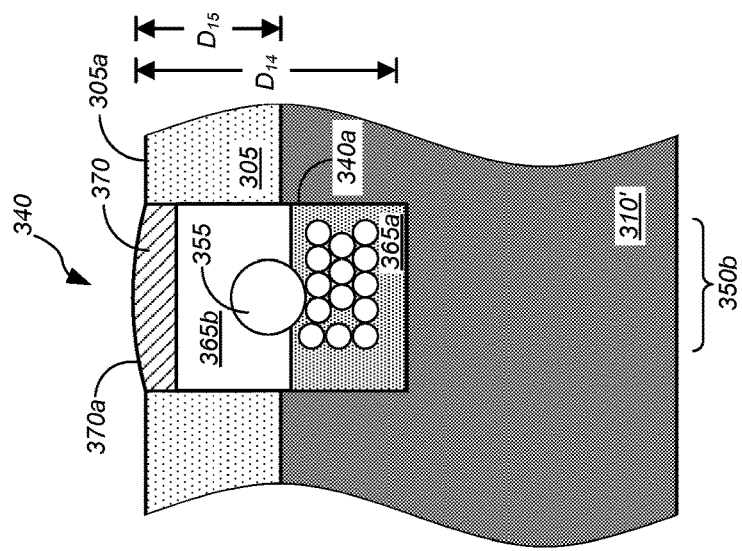
Figure 9I:
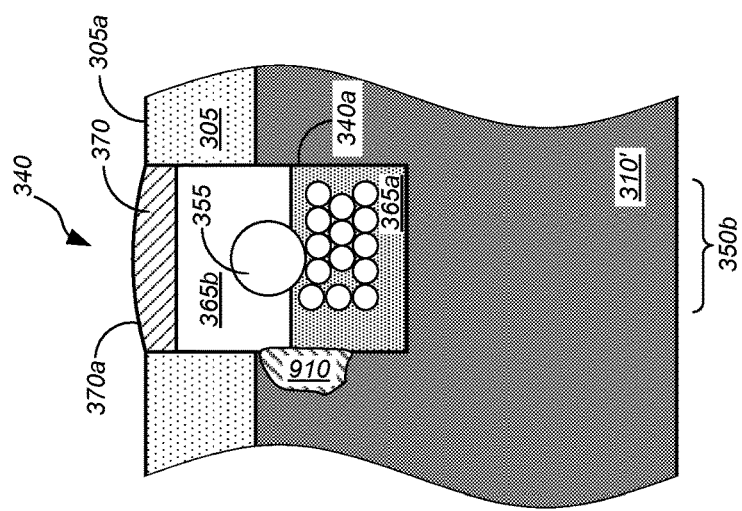
Figure 9H:
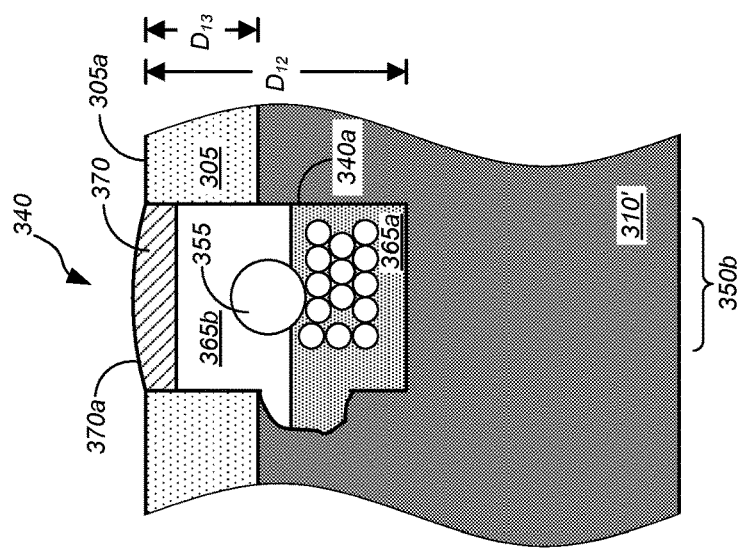

FIGS. 9H and 9I are alternative partial sectional views of system 900, as shown along the K-K direction indicated in FIG. 9G, depicting a section of the apical conduit slot (in this case, the main slot 340), in the channel (in this case, channel 340a) of which is disposed a capping material layer 370 over or on top of the second filler material layer 365b, the first filler material layer 365a (e.g., a tack coat layer), and the one or more lines (as shown, e.g., in FIGS. 7A-7E). In some cases, as shown in FIGS. 9H and 9I, a surface 370a of the capping layer 370 might bulge a little bit above the surface 305a of roadway 305, while in other cases (not shown), the surface 370a might be substantially flat with respect to surface 305a. Unlike the embodiments of FIG. 7, however, the channel 340a might be formed into a sub-surface or subgrade layer 310' of the road (as described above), and the space, void, volume, or cavity 905 might extend beyond a side wall portion of channel 340a into the sub-surface or subgrade layer 310', as shown in FIGS. 9H and 9I (and as described above with respect to FIG. 9F). As shown in FIG. 9H, the channel might have a depth $D_{12}$ (which is similar to depth $D_2$ of channel 340a in FIG. 7 or depth $D_8$ of channel 340a in FIG. 9C), while the roadway 305 might have a depth $D_{13}$ that is less than the depth $D_{12}$.

In the embodiment of FIG. 9H, the first filler material 365a, the second filler material 365b, of a combination of the first and second filler materials might flow into and fill the space, void, volume, or cavity 905. The use of the first and/or second filler material 365 to fill the space, void, volume, or cavity 905, however, might be expensive or cost-prohibitive due to the cost of the filler material 365 (which might be polyurea based), especially as these filler materials are liquid before they set and may flow through cracks in the sub-surface or subgrade material through the space, void, volume, or cavity 905 (thereby require more of the first and/or second filler material to be used).

Rather than using either the first or second filler material 365 to fill the space, void, volume, or cavity 905, as with the embodiment of FIG. 9I, a third filler material 910, which is a less expensive material and might be foam-based (and can, in some cases, also be based on polyurea, or alternatively a plural compound, or the like), may be used. The foam-like third filler material 910, when applied to the space, void, volume, or cavity 905, tends to expand to fill the space, void, volume, or cavity 905, in some cases bulging into the volume of the channel 340a. Once the foam-like third filler material 910 sets, the one or more lines, the first filler material 365a (i.e., tack coat), the second filler material 365b, and the capping material 370 might be disposed in the channel 340a over or on top of the bottom portion of the channel 340a, and in some cases covering a side or distended (or bulging) portion of the third filler material 910.

FIG. 9J is a partial sectional view of system 900, as shown along the L-L direction indicated in FIG. 9G, depicting a section of the apical conduit slot (in this case, the main slot 340), in the channel (in this case, channel 340a) of which is disposed a capping material layer 370 over or on top of the second filler material layer 365b, the first filler material layer 365a (e.g., a tack coat layer), and the one or more lines (as shown, e.g., in FIGS. 7A-7E). In some cases, as shown in FIG. 9J, a surface 370a of the capping layer 370 might bulge a little bit above the surface 305a of roadway 305, while in other cases (not shown), the surface 370a might be substantially flat with respect to surface 305a. FIG. 9J depicts a segment of the channel 340a of the roadway 305 of FIG. 9 without a space, void, volume, or cavity 905 beyond a side wall portion of the channel 340a. Merely as an illustration of differing road surface depths (in this case, slightly exaggerated), the channel in FIG. 9J might have a depth $D_{14}$ (which is similar to depth $D_{12}$ of channel 340a in FIG. 9H), while the roadway 305 might have a depth $D_{15}$ that is greater than the roadway depth $D_{13}$ of FIG. 9H and less than channel depth $D_{14}$, despite the segment of roadway 305 of FIG. 9J being proximal (or at least on the same stretch of road compared) to the segment of roadway 305 of FIG. 9H (as shown in FIG. 9G in the proximity of lines K-K and L-L, for example).

Although FIG. 9 depicts space, void, volume, or cavity 905 being either only below a channel or only beyond a sidewall of the channel of a main slot 340, the various embodiments are not so limited, and the space, void, volume, or cavity 905 may be found or formed in any combination of below a bottom portion or beyond a sidewall portion any apical conduit channel.

Figure 10A:
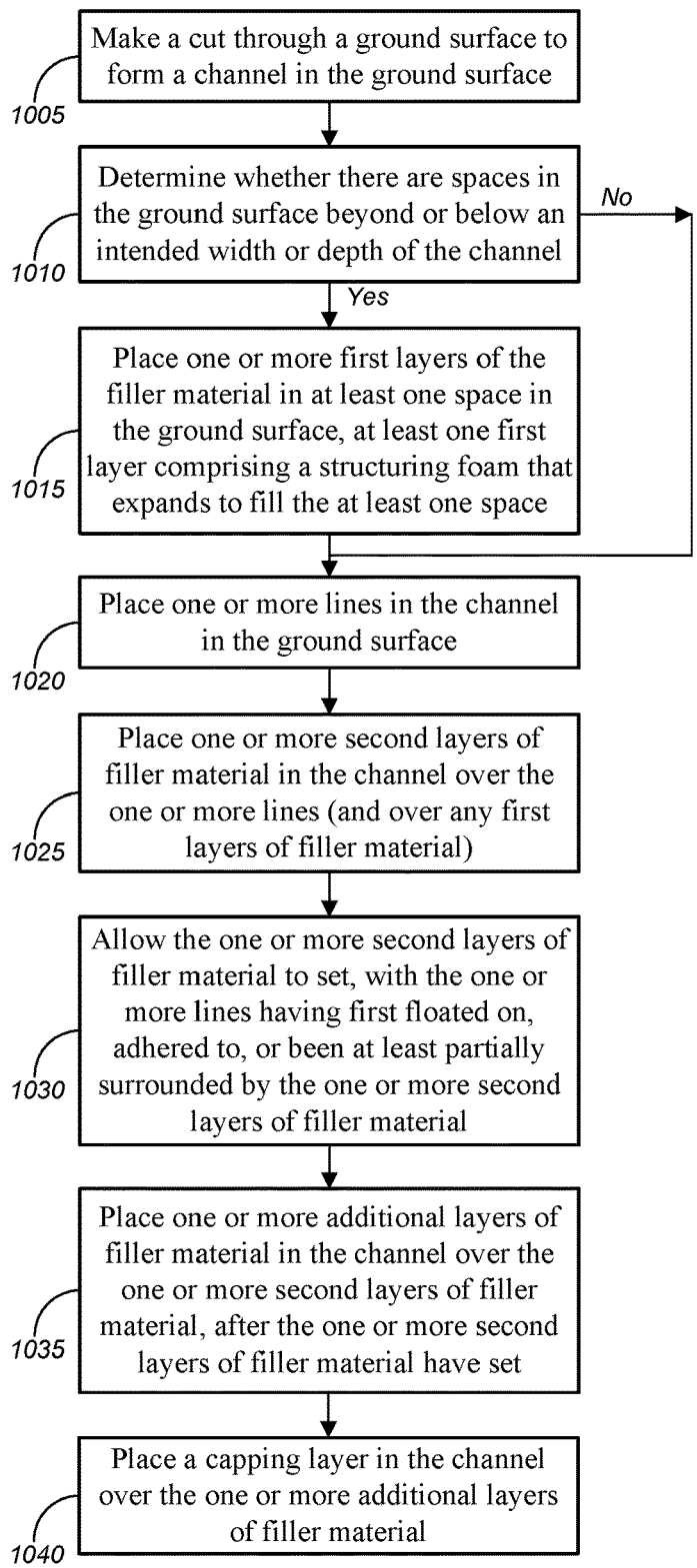
FIGS. 10A and 10B are flow diagrams illustrating various methods for implementing FTTP and/or point-to-point fiber insertion within a PON communications system using an apical conduit system that utilizes multiple filler layers and/or for servicing at least one of one or more lines in the apical conduit system, in accordance with various embodiments.
Figure 10B:
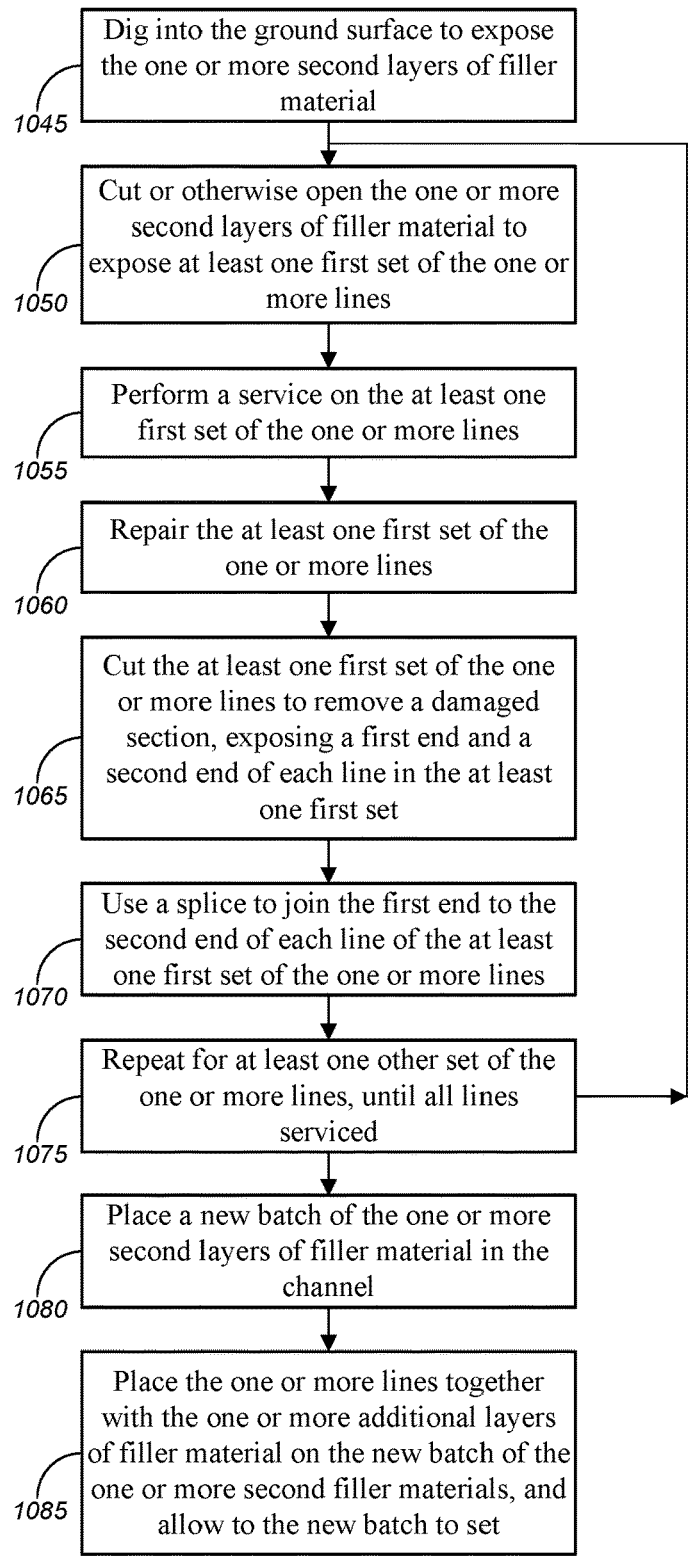

FIGS. 10A and 10B (collectively, "FIG. 10") are flow diagrams illustrating various methods 1000 for implementing FTTP and/or point-to-point fiber insertion within a PON communications system (or alternatively, within an Ethernet fiber communications system, within an EPON, NGPON, or NGPON2 communications system, and/or the like) using an apical conduit system that utilizes multiple filler layers and/or for servicing (e.g., repairing damage to) at least one of one or more lines in the apical conduit system, in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 10 can be implemented by or with (and, in some cases, are described below with respect to) the systems 100, 300, 400, 500, 600, 700, 800, and/or 900 of FIGS. 1, 3, 4, 5, 6, 7, 8, and/or 9, respectively (or components thereof), such methods may also be implemented using any suitable hardware implementation. Similarly, while each of the system 100 (and/or components thereof) of FIG. 1, the system 300 (and/or components thereof) of FIG. 3, the system 400 (and/or components thereof) of FIG. 4, the system 500 (and/or components thereof) of FIG. 5, the system 600 (and/or components thereof) of FIG. 6, the system 700 (and/or components thereof) of FIG. 7, the system 800 (and/or components thereof) of FIG. 8, and/or the system 900 (and/or components thereof) of FIG. 9 can operate according to the method illustrated by FIG. 10 (e.g., by executing instructions embodied on a computer readable medium), the systems 100, 300, 400, 500, 600, 700, 800, and/or 900 can each also operate according to other modes of operation and/or perform other suitable procedures. In the embodiment of FIG. 10, the at least one first layer of filler material, the one or more second layers of filler material, and the one or more additional layers of filler material correspond to the foam-like third filler material or filler material layer 910, the first filler material or filler material layer 365a (i.e., tack coat), and the second filler material or filler material layer 365b, respectively, as described above with respect to FIGS. 7-9.

In FIG. 10A, method 1000 might comprise, at block 1005, making a cut through a ground surface (e.g., roadway surface 305a) to form a channel in the ground surface (e.g., roadway 305). At block 1010, method 1000 might comprise determining whether there are spaces (e.g., voids, spaces, volumes, or cavities 905 of FIG. 9) in the ground surface beyond or below an intended width or depth of the channel. Based on a determination that there is at least one space in the ground surface, the process continues at block 1015, where the method further comprises placing one or more first layers of the filler material (i.e., foam-like third filler material 910 of FIG. 9) in the at least one space in the ground surface. The at least one first layer of filler material comprising a structuring foam that expands to fill the at least one space. The process continues at block 1020.

Based on a determination (at block 1010) that there are no spaces in the ground surface beyond or below an intended width or depth of the channel (at least within a segment of the channel for which the apical conduit filler layers are being applied), the process continues at block 1020. At block 1020, method 1000 comprises placing one or more lines in the channel in the ground surface. Method 1000 further comprises, at block 1025, placing one or more second layers of filler material (i.e., first filler material 365a, first filler material layer 365a, or tack coat layer) in the channel over the one or more lines (and over any first layers of filler material extending or bulging above a bottom portion of the channel). Method 1000 might further comprise allowing the one or more second layers of filler material to set, with the one or more lines having first floated on, adhered to, or been at least partially surrounded by the one or more second layers of filler material (block 1030).

At block 1035, method 1000 might comprise placing one or more additional layers of filler material (i.e., second filler material 365b or second filler material layer 365b) in the channel over the one or more second layers of filler material, after the one or more second layers of filler material have set. Method 1000, at block 1040, might comprise placing a capping layer (i.e., capping material layer, top layer, or the like) in the channel over the one or more additional layers of filler material.

When dealing with fiber optic cables (or other lines) disposed in ground surfaces (including, but not limited to, asphalt roadway surfaces, concrete roadway surfaces, asphalt (non-roadway) pathways, concrete (non-roadway) pathways, stone pathways, and/or the like), there is always a risk that the fiber optic cables (or other lines) may be hit, severed, or otherwise damaged, directly or indirectly by either natural occurrences (e.g., earth shifts, earthquakes, storms, fires and/or the like) or man-made occurrences (e.g., construction, carelessness, accidents, explosions, and/or the like). Accordingly, it may be necessary to repair the lines, as described below in the non-limiting embodiment of FIG. 10B.

In FIG. 10B, method 1000 might further comprise, at block 1045, digging into the ground surface (and/or into the filler materials of the apical conduit system) to expose the one or more second layers of filler material (i.e., the tack coat layer), which is softer and easier to cut into compared to the additional layers of filler material, which is desired to be interlocked with and/or bonded with the ground or roadway material. At bock 1050, method 1000 might comprise cutting or otherwise opening the one or more second layers of filler material to expose at least one first set of the one or more lines. Method 1000 might further comprise performing a service on the at least one first set of the one or more lines (block 1055), which might include, without limitation, repairing the at least one first set of the one or more lines (block 1060). In some embodiments, repairing the at least one first set of the one or more lines might comprise cutting the at least one first set of the one or more lines to remove a damaged section(s), exposing a first end and a second end of each line in the at least one first set of the one or more lines (block 1065) and using a splice to join the first end to the second end of each line of the at least one first set of the one or more lines (block 1070). The process (blocks 1050-1070) might repeat (at block 1075) for at least one other set of the one or more lines, until all lines in the one or more lines have been serviced.

At block 1080, method 1000 might comprise placing a new batch of the one or more second layers of filler material in the channel. Method 1000 might further comprise, at block 1085, placing the one or more lines together with the one or more additional layers of filler material on the new batch of the one or more second filler materials in the channel, thereby encapsulating the repaired lines (and other lines) in the new batch of the one or more second layers of filler material (i.e., tack coat), and to allow the new batch to set.

In some embodiments, the one or more lines might stretch along the length of the channel and into adjacent channels or bores, with minimal or no slack in the lines. In some alternative embodiments, however, a slack loop might be disposed at roughly periodic intervals along the length of each channel. In some cases, the slack loop might comprise a loop of lines having a loop length, including, but not limited to, about 10 feet (~3.05 m), about 20 feet (~6.10 m), about 30 feet (~9.14 m), about 40 feet (~12.19 m), and/or the like). In some instances, the roughly periodic intervals might include, without limitation, about 500 feet (~152.4 m), about 1000 feet (~304.8 m), about 1500 feet (~457.2 m), about 2000 feet (~609.6 m), and/or the like. The periodic spacing of the slack loop allows for extra lengths of lines to be used for repair and/or for expansion through one or more signal distribution devices (e.g., FDH, NAP, etc.), as described in detail above.

Figure 11A:
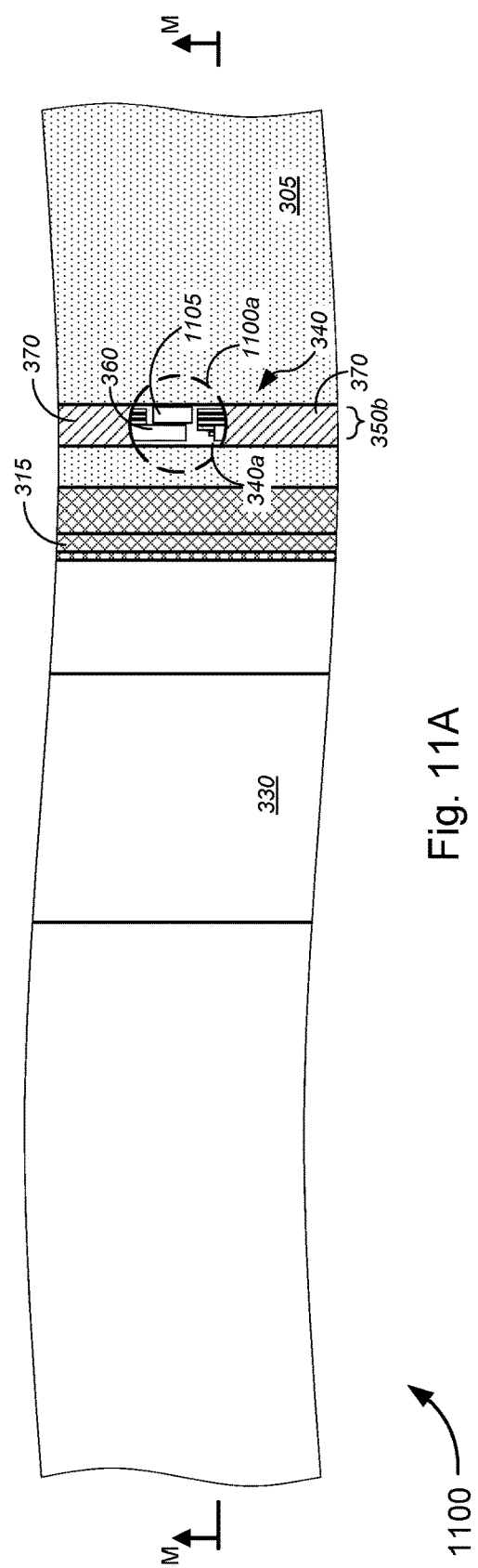
FIGS. 11A-11E are general schematic diagrams illustrating various embodiments of a system for communicatively coupling lines within an apical conduit system and lines within a wireless access point device that is located within a channel of the apical conduit system for implementing FTTP and/or point-to-point fiber insertion within a PON communications system.
Figure 11B:
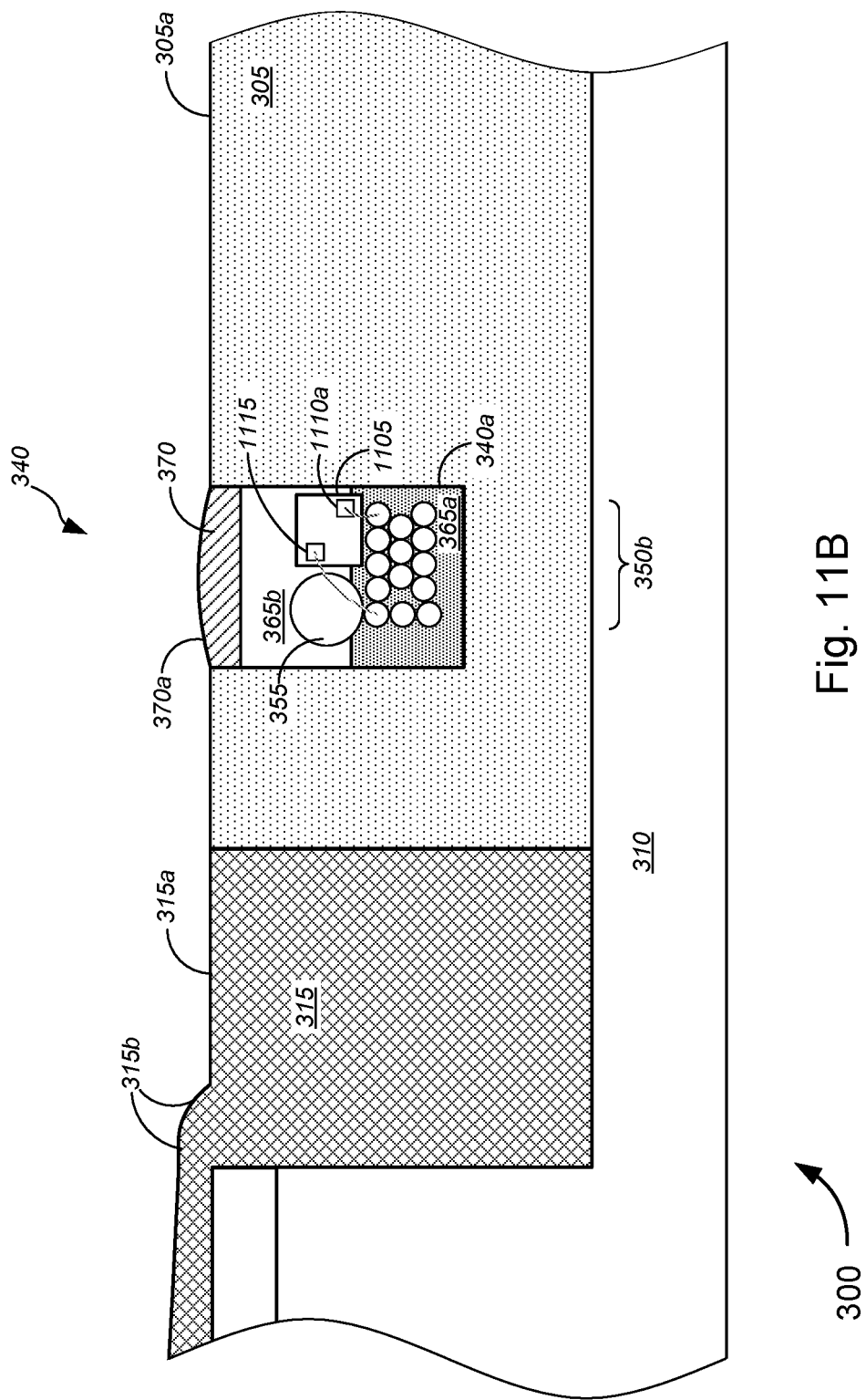
Figure 11C:
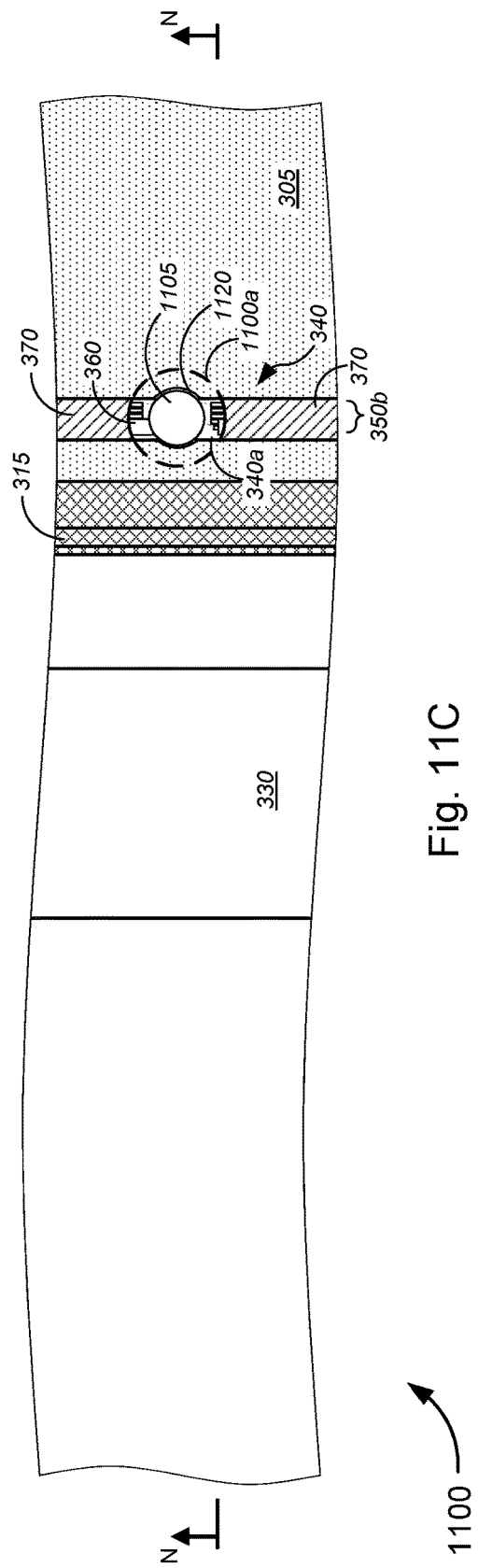
Figure 11D:
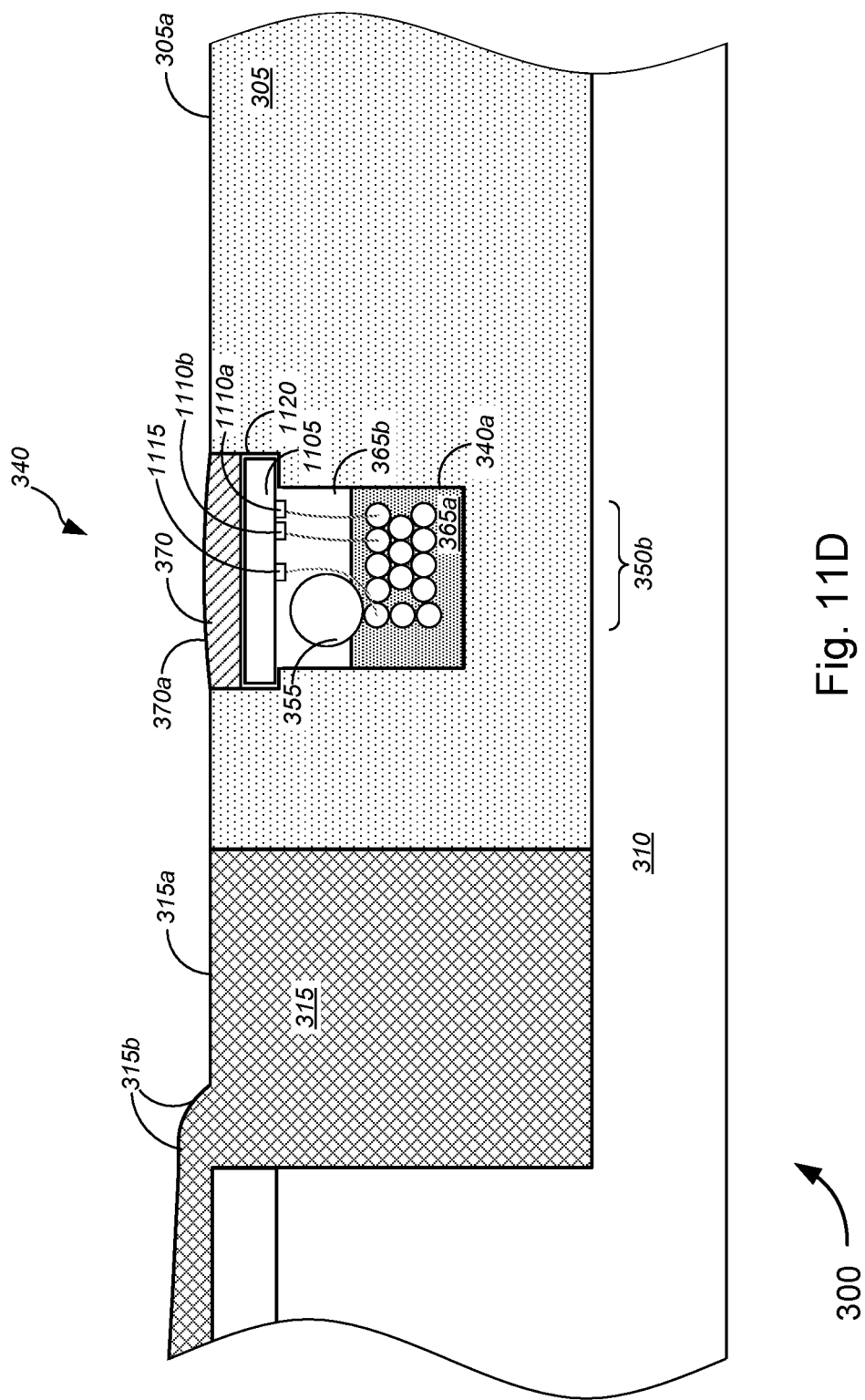
Figure 11E:
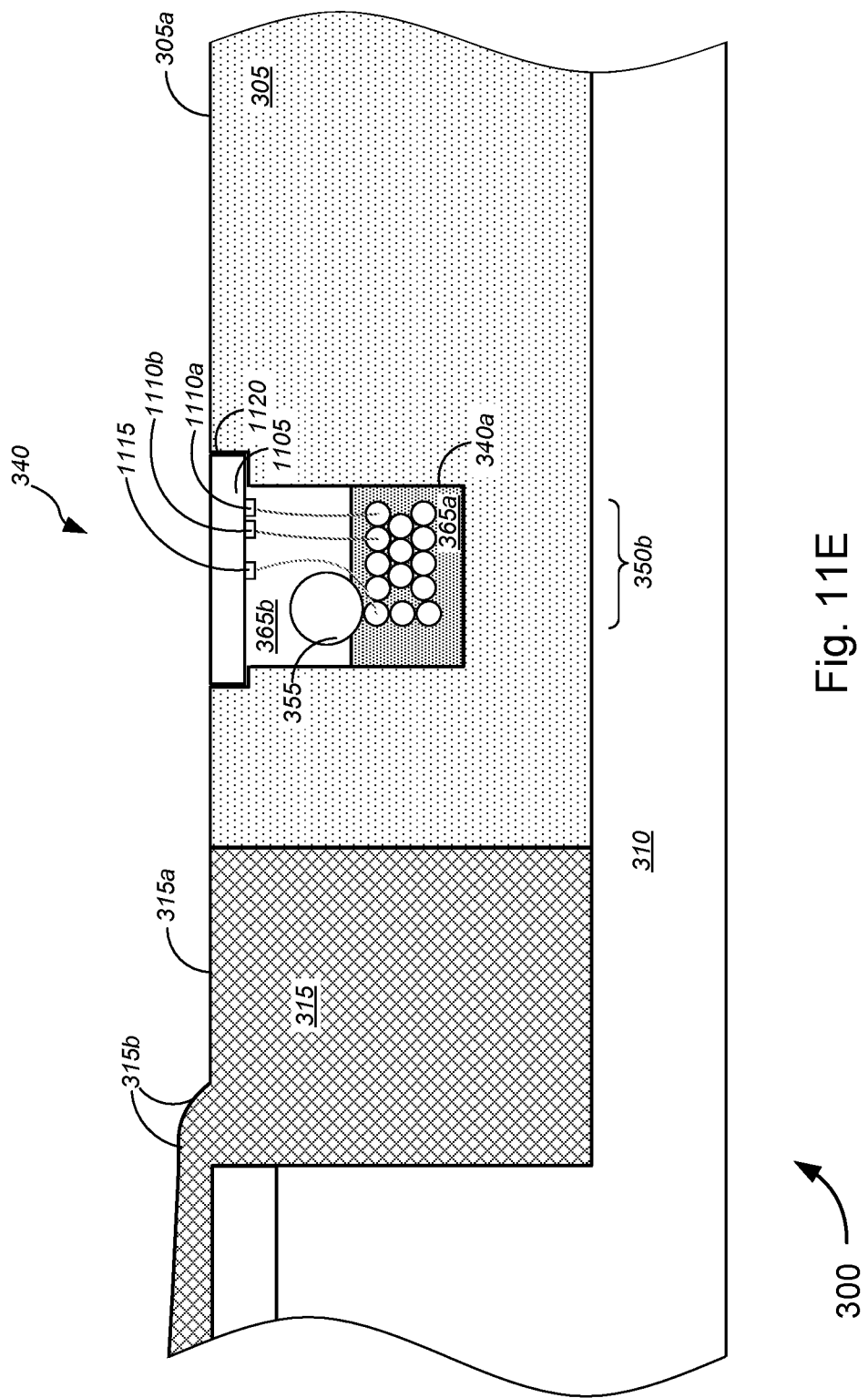

FIGS. 11A-11E (collectively, "FIG. 11") are general schematic diagrams illustrating various views of a system 1100 for communicatively coupling lines within an apical conduit system and lines within a wireless access point device that is located with a channel of the apical conduit system for implementing FTTP, in accordance with various embodiments. FIG. 11A shows a top view of a section 1100 of ground in which components of an apical conduit system are disposed. FIG. 11B shows a partial sectional view of the system 1100 of FIG. 11A, as shown along the M-M direction indicated in FIG. 11A. FIG. 11C shows an alternative embodiment of the top view of the section 1100 of ground in which components of an apical conduit system are disposed. FIGS. 11D and 11E show various embodiments of a partial sectional view of the system or section 1100 of FIG. 11C, as shown along the N-N direction indicated in FIG. 11C. System or section 1100 in FIG. 11 generally corresponds to a section of ground as, for example, indicated by (but not necessarily precisely depicting) dash-lined rectangle 1100 shown in FIG. 1. In FIG. 11, long-dashed lines forming circles and denoted 1100a might represent a cut-out view, in which certain layers or portions of components within the apical conduit system are purposely omitted for ease of illustration.

In the embodiment of FIG. 11, system 1100 might comprise roadway 305, ground 310, curb 315, pathway 330, source slot 335, main slot 340, lines 350, conduit/microduct 355, filler material 365, capping material 370, cross slot 375, far-side slot 390, and road lines 395, and/or the like, which are described in detail with respect to FIGS. 3-6 above. In some instances, roadway 305 might be made of asphalt, concrete, and/or the like. Ground 310 might comprise soil (in some cases, compacted soil), mud, clay, rock, and/or the like. Curb 315 might be made of concrete or the like. A sub-base layer (not shown) might be disposed between the roadway 305 and ground 310. In some cases, curb 315 might comprise a portion of a roadway surface 315a and a portion of a non-roadway surface 315b.

As shown in FIG. 11A, a wireless access point device 1105 might be disposed within channel 340a along with lines 350b and conduit/microduct 355 (in some cases, in-line with 350b and/or conduit/microduct 355). Wireless access point device 1105 might be any suitable device, including, but not limited to, wireless access point device 250 as described in detail above with respect to FIG. 2K (in such a case, description of the wireless access point device 250 is applicable to the wireless access point device 1100 of FIG. 11). In this manner, a wireless access point may be embedded in a roadway surface, thereby allowing wireless connectivity by user devices nearby (e.g., in the neighborhood), while preventing potential tampering by people, as the device is embedded in the roadway surface (compared with some wireless access points which might be accessible via hand holes or other such container structures that, in some cases, might not have secure locking mechanisms, for example).

With reference to FIG. 11B, wireless access point device 1105 might be disposed within channel 340a along with lines 350b and conduit/microduct 355, and when the first filler material 365a has been applied, the wireless access point device 1105 (like at least some of the lines 350b and conduit/microduct 355) might rise or float to a surface of the first filler material 365a. Upon setting, the first filler material 365a might hold the wireless access point device 1105 (along with the lines 350b and conduit/microduct 355) in place within channel 340a. In some embodiments, if the first filler material 365a is different from the second filler material 365b, the first filler material 365a might further be applied again (after setting of the tack coat layer) to fully or completely submerge or encapsulate the lines, conduits, and wireless access point device 1105, in a manner similar to that as described above with respect to FIG. 3D.

As shown in FIG. 11B, wireless access point device 1105 might further comprise ports or pass-throughs 1110 and 1115 that allow power lines and data lines to communicatively couple with the wireless access point contained therein. With reference to both FIGS. 2K and 11B, the ports or pass-throughs 1110a and 1110b might allow pass-through of data lines (e.g., F2 or F3 lines) to communicatively couple with data input/output ports of the wireless access point to allow wireless connectivity with user devices nearby. In some cases, the ports or pass-throughs 1110a and 1110b might be on the same wall of the container or housing of the wireless access point device 1105, while, in other cases, the ports or pass-throughs 1110a and 1110b might be on opposing walls of the container or housing of the wireless access point device 1105 (e.g., as shown in FIG. 2K). The port or pass-through 1115 allows a power line to communicatively couple with the power supply port of the wireless access point to provide power to the wireless access point. Although FIG. 11 shows only one wireless access point device 1105 being disposed within a channel of the apical conduit system, any suitable number of wireless access point devices 1105 may be distributed throughout one or more channels of the apical conduit system within any particular area (e.g., residential neighborhood, commercial district, a downtown area, or other population centers, etc.) depending on the wireless connectivity requirements of the people in those areas.

In FIGS. 11C and 11D, rather than being in-line with (or directly on top of) the lines 350b and/or conduit/microduct 355, as in the case with the embodiments of FIGS. 11A and 11B, an embodiment (or set of embodiments) may be implemented or provided in which the wireless access point device 1105 might be disposed at or near the top of the channel or slot 340 of the apical conduit system. In some cases, depressions or grooves 1120 may be provided or cut into the road surface 305 at or near the top of the channel. The depressions or grooves 1120 might have an overall shape corresponding to a shape of the container or housing of the wireless access point device 1105 (in the case of the embodiment as shown in FIGS. 11C and 11D, the shape would be circular; but any suitable polygonal shape may be used, so long as the shape of the depressions or grooves 1120 corresponds to the shape of the wireless access point device 1105). As shown in FIG. 11D (and in FIG. 2L), the ports or pass-throughs 1110 and 1115 might be provided on a bottom surface of the container or housing of the wireless access point device 1105. This configuration allows for ease of connection of the cables (i.e., signal as well as power cables) that are disposed within the channel with the ports (e.g., ports 265 and 270 as shown in FIG. 2L) of the wireless access point contained within the container or housing of the wireless access point device. This configuration further allows for ease of access to the wireless access point within the wireless access point device (e.g., through a lid, cover, or other openable/closeable mechanism on a top surface of the wireless access point device (not shown) that would not be covered by the filler material (which, in some cases, may be a resilient material from which it may be difficult to access components (e.g., wires, lines, wireless access point devices, etc.) that are encapsulated therein). Capping material, on the other hand, is far easier to remove than the filler material (e.g., polyurea or the like).

When installing the wireless access point device 1105 in a channel or slot in which the lines and conduits may already be disposed, one or more lines (containing data/signal lines and containing a power line) may be communicatively coupled to the corresponding ports in the wireless access point (e.g., ports 265-270) via ports or pass-throughs 1110-1115. Once the wireless access point and the wireless access point device have been wired and otherwise configured, the wireless access point device may be disposed on the depression or groove 1120. Thereafter, the tack coat layer of the filler material 365a may be applied (if not utilizing the conduit/cable capture device 360). After setting, the filler material 365b may be applied a second time (and may cover a portion of the wireless access point device 1105, but not a top surface thereof). In some cases, the capping material may be applied to cover both the wireless access point device 1105, along with the filler material in the channel.

With reference to FIG. 11E, rather than covering the wireless access point device 1105 with the capping material as shown in FIG. 11D, the wireless access point is made flush with the top surface 305a of the roadway 305. In such a case, the depression or groove 1120 need not be as deep as in the embodiment of FIG. 11D. The embodiment of FIG. 11E is otherwise similar or identical to the embodiment of FIG. 11D, and the descriptions of FIG. 11D may be applied to FIG. 11E.

In some embodiments (not shown), the wireless access point device 1105, which might have dimensions to fit within the channel (without the use of the depressions or grooves 1120), might be disposed in the channel after communicatively coupling to one or more lines or cables disposed in the channel and after application of the tack coat layer (as described with respect to FIG. 3D). After the wireless access point device 1105 floats or rises to the top portion of the second application of the filler material, more of the filler material may be applied (followed by the capping material) or the capping material may be applied directly over top of the wireless access point device 1105 and the rest of the filler material already placed in the channel.

In the embodiments of FIGS. 11C-11E, because the wireless access point device is larger than the channel (i.e., the wireless access point device is about 2-3 inches in diameter), it is possible that a tire of a vehicle might run over or rest on top of the device (either directly or through the capping material layer). Accordingly, the container or housing of the wireless access point device 1105 must be made to be weight-bearing or otherwise capable of withstanding the weight of a vehicle (even a large vehicle) as focused through the point of contact at the bottom portion of a tire of the vehicle. In contrast, in the embodiment of FIGS. 11A-11B, the wireless access point device 1120 is small enough to fit within the channel or slot, which might have a width that is smaller than a width of a tire of a vehicle—in which case, the roadway 305 on either side of the channel would distribute and hold the weight of the vehicle (especially when the filler material, which in some cases is stronger than conventional asphalt or concrete, has filled a substantial portion of the channel).

According to some embodiments, accessing the wireless access point within the wireless access point device (after installation) may be similar to the processes for accessing and repairing damaged lines or conduits as described in detail with respect to FIGS. 9 and 10. For example, in some embodiments, for wireless access point devices similar to that as shown in FIG. 11E, in which the wireless access point device is accessible at surface 305a of roadway 305, a method of repairing, upgrading, or accessing for other purposes (e.g., testing or the like) the wireless access point or other components of the wireless access point device might include, without limitation, accessing, via a lid of a wireless access point device that is disposed within at least a portion of a channel in a ground surface, a wireless access point contained within the wireless access point device. In some cases, this might include open the lid of the container of the wireless access point device. In some instances, this might include removing the lid of the container. Thereafter, the method might include repairing or replacing at least one component of the wireless access point, upgrading the at least one component, and/or testing the at least one component, or the like. The lid may subsequently be closed.

For wireless access point devices that are covered by a capping material (as shown, for example, in FIG. 11D, the method of repairing, upgrading, or accessing for other purposes (e.g., testing or the like) the wireless access point or other components of the wireless access point device might include, without limitation, removing a first capping material from the channel in the ground surface (the capping material covering the wireless access point device); accessing, via the lid of the wireless access point device that is disposed within at least a portion of the channel in the ground surface, a wireless access point contained within the wireless access point device; repairing or replacing at least one component of the wireless access point, upgrading the at least one component, and/or testing the at least one component, or the like; closing the lid of the wireless access point device; and placing a second capping material in the channel over the wireless access point device, after closing the lid of the wireless access point device.

Figure 12A:
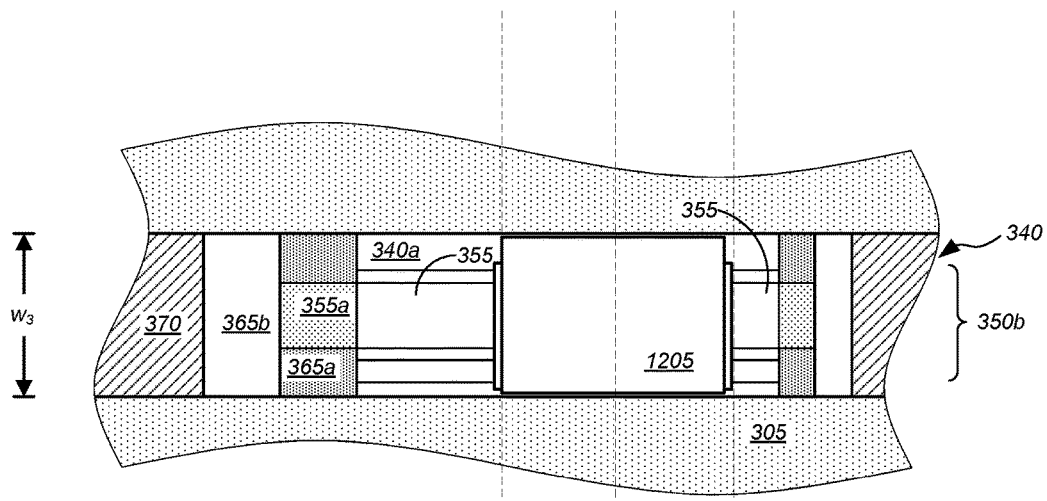
FIGS. 12A-12R are general schematic diagrams illustrating various embodiments of another system for communicatively coupling lines within an apical conduit system and lines within a wireless access point device that is located within a channel of the apical conduit system for implementing FTTP and/or point-to-point fiber insertion within a PON communications system.
Figure 12B:
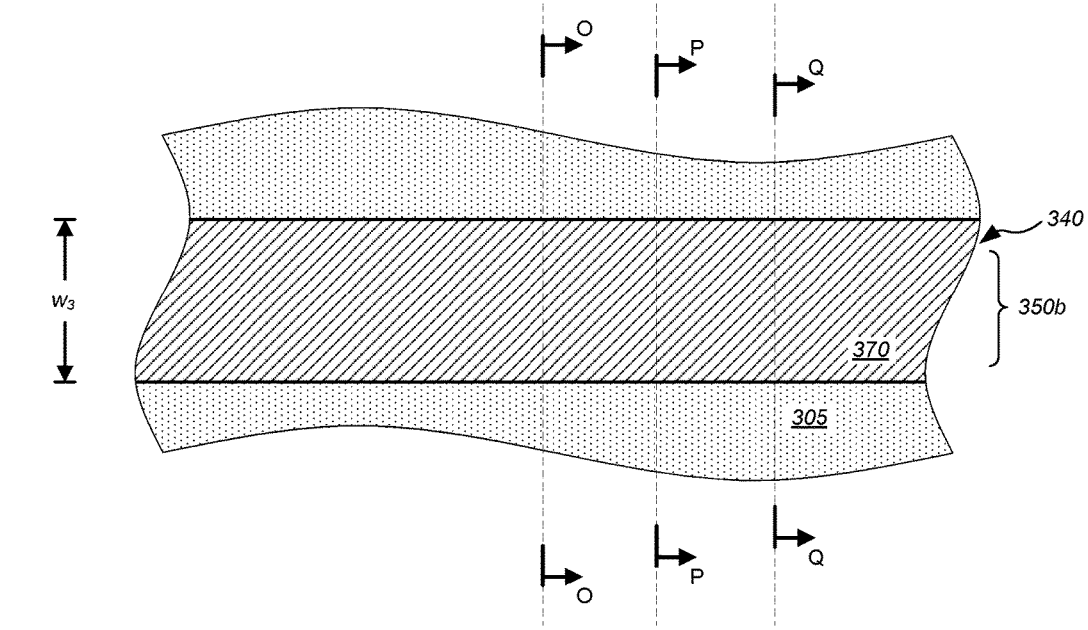
Figure 12F:
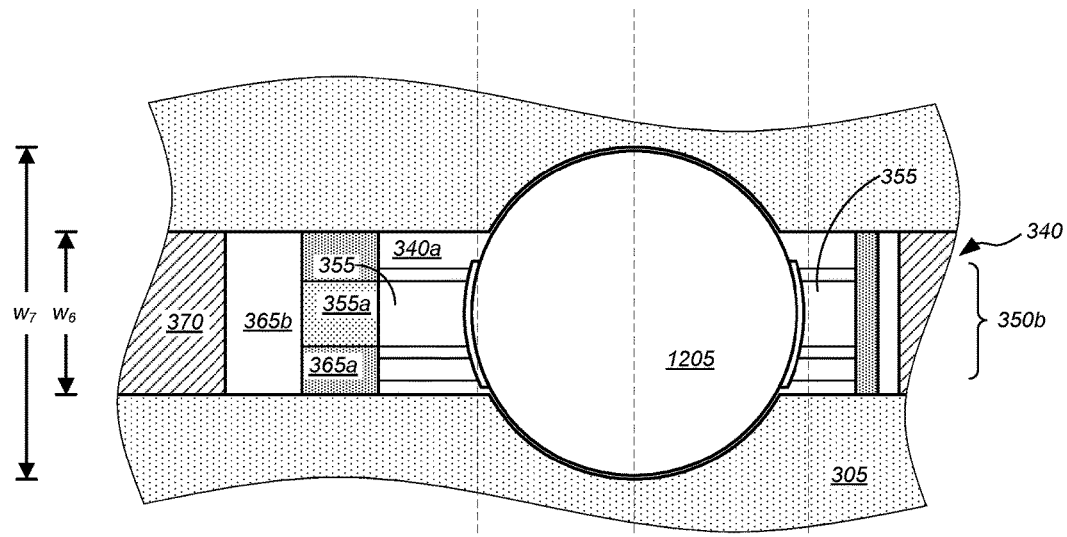
Figure 12G:
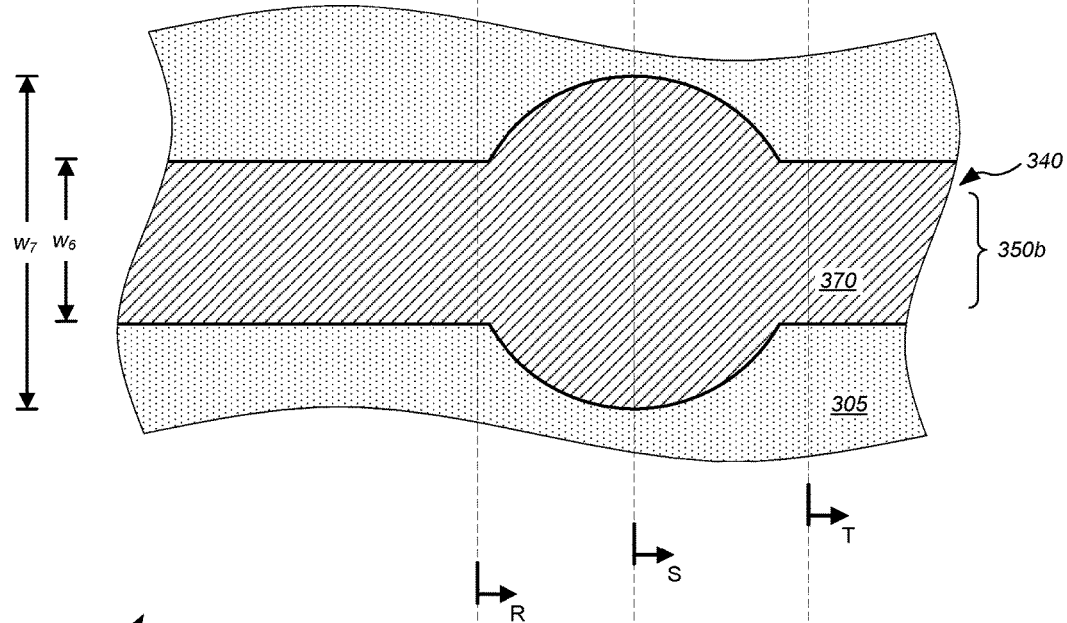
Figure 12K:
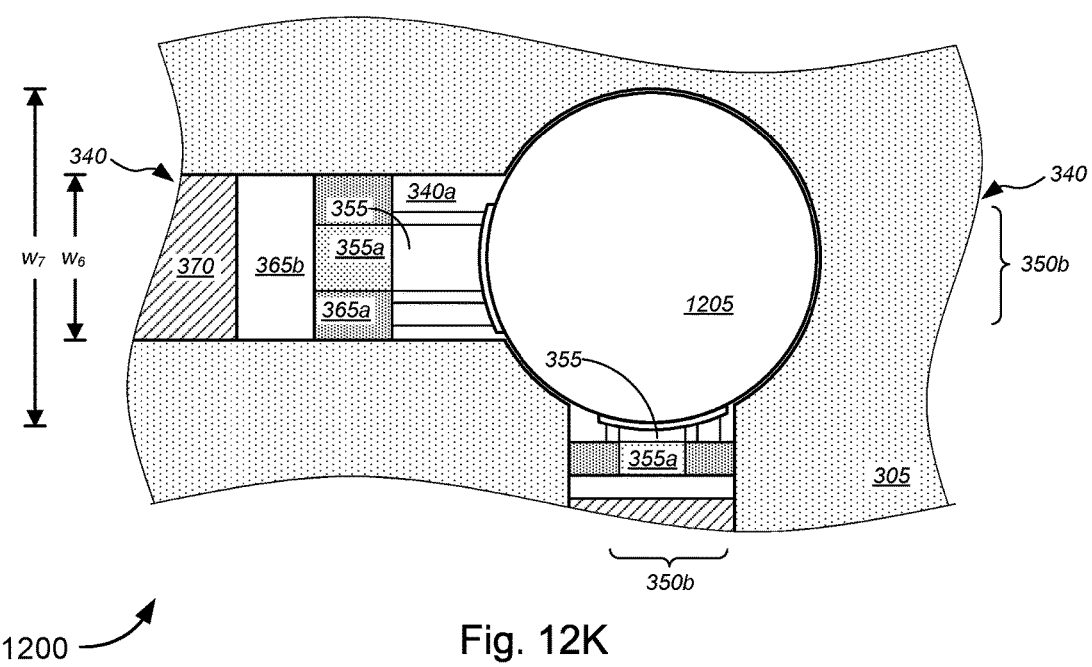
Figure 12L:
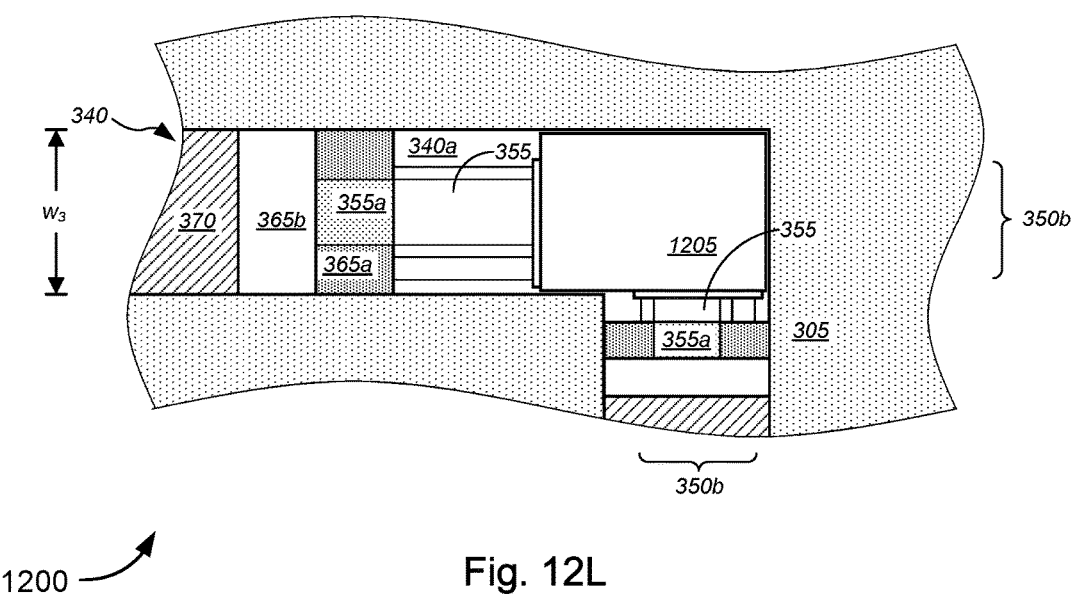
Figure 12M:
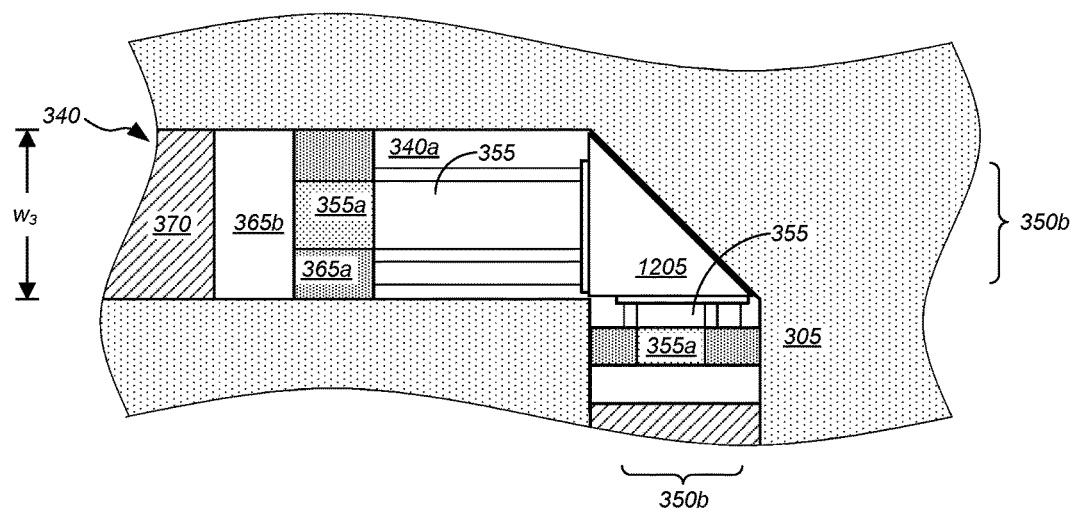
Figure 12N:
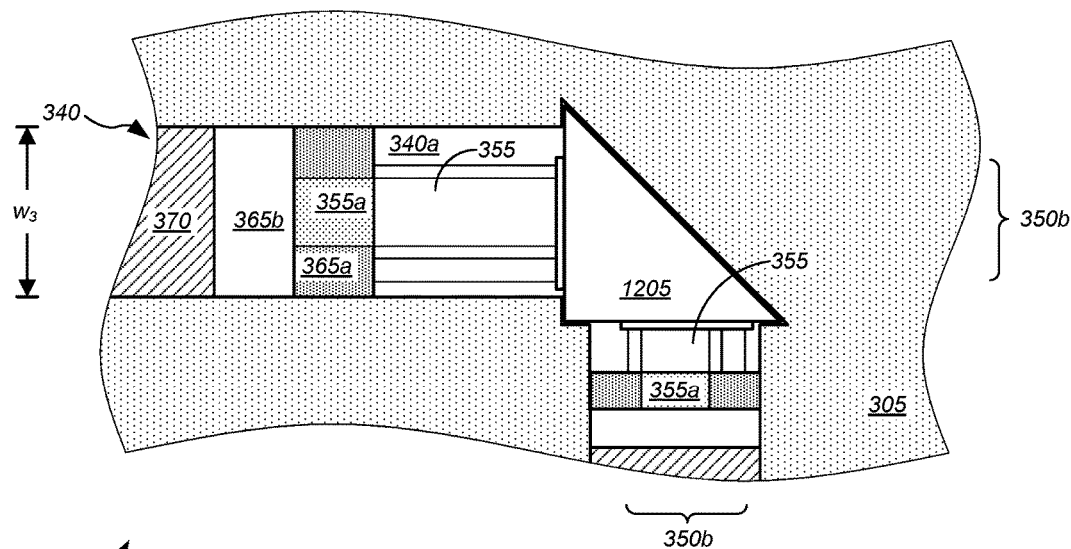
Figure 12O:
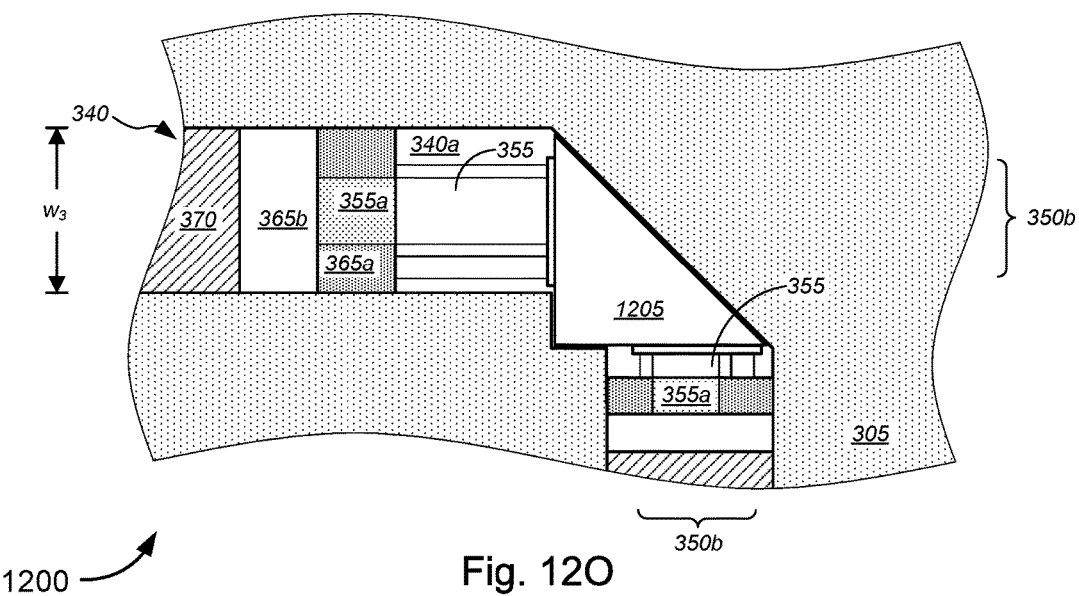
Figure 12P:
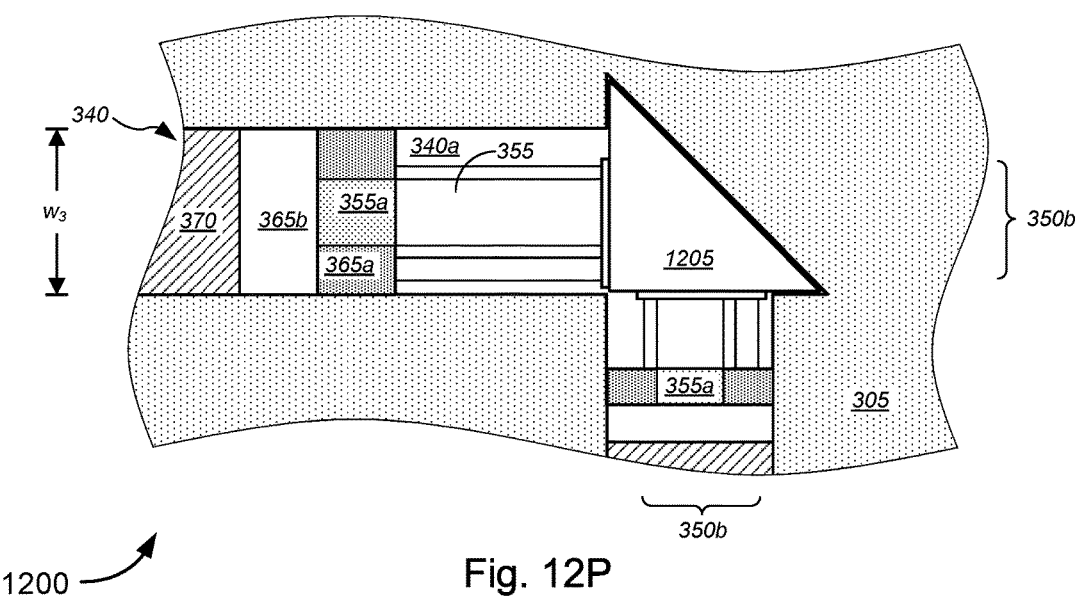
Figure 12Q:
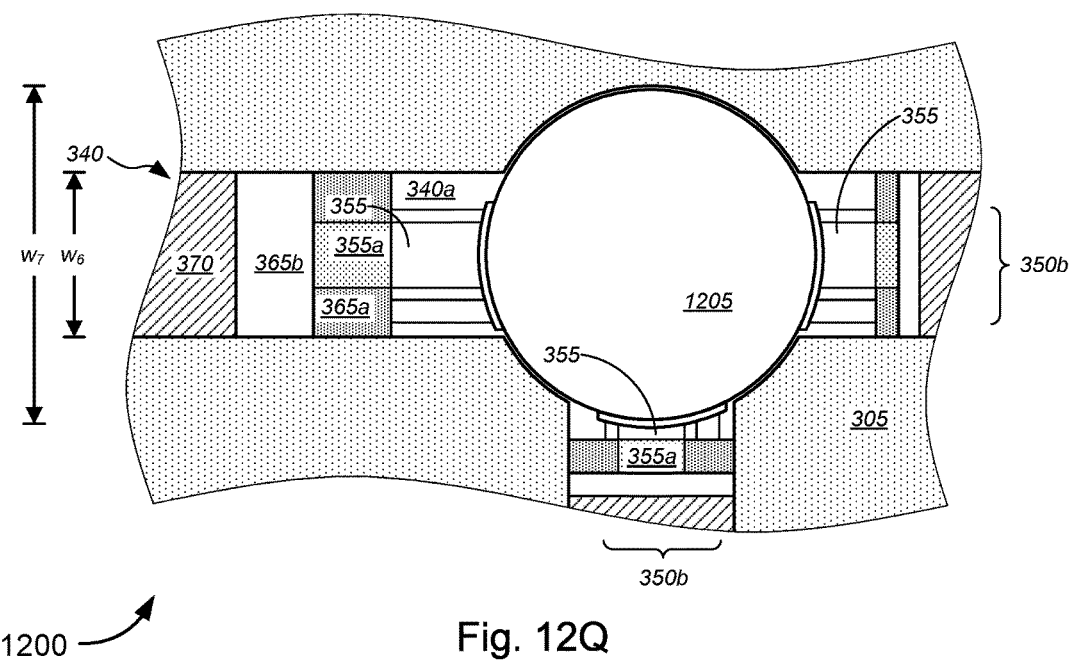
Figure 12R:
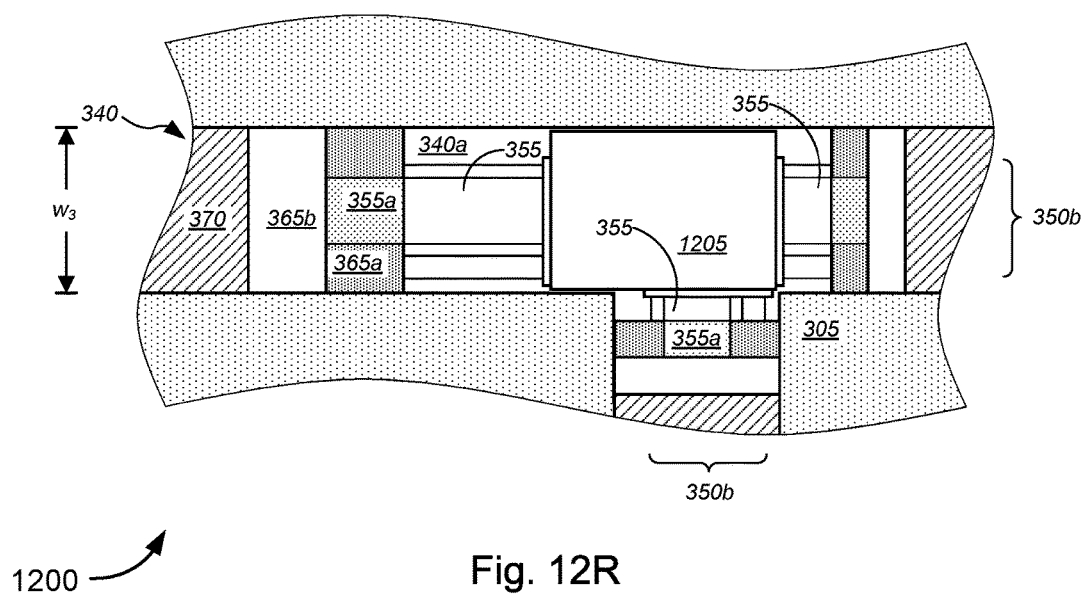

FIGS. 12A-12R (collectively, "FIG. 12") are general schematic diagrams illustrating various embodiments of another system 1200 for communicatively coupling lines within an apical conduit system and lines within a wireless access point device that is located within a channel of the apical conduit system for implementing FTTP and/or point-to-point fiber insertion within a PON communications system. FIGS. 12A-12E depict an embodiment of a rectangular wireless access point device that fits within a channel of the apical conduit system, while FIGS. 12F-12J depict an embodiment of a circular wireless access point device that fits within a road bore that intersects with a channel of the apical conduit system. FIGS. 12K-12P depict various embodiments of wireless access point devices of various shapes that are disposed at a right angled turn of a channel of the apical conduit system. FIGS. 12Q and 12R depict various embodiments of wireless access point devices of various shapes that are disposed at a T-intersection of channels of the apical conduit system.

With reference to FIG. 12A, a top view is shown of a section of ground in which an apical conduit slot (in this example, an apical conduit main slot 340) is shown disposed in a ground surface (in this example, roadway 305). As shown in the non-limiting example of FIG. 12A, the one or more lines (including, but not limited to, F2 optical fiber cables 350b and conduit/microduct 355, or the like) might be disposed in the channel 340a of main slot 340, with the first filler layer 365a (e.g., a tack coat layer, as described above with respect to FIG. 3D) over the one or more lines (either in a continuous manner as in FIGS. 7A-7E or in a non-continuous or spot manner as in FIGS. 7F-7J) along the length of the channel 340a of main slot 340. In the embodiment of FIG. 12A, a rectangular wireless access point device 1205 is configured to fit within the channel having a width of $w_3$ (which is equivalent to width $w_2$ of the channel in the embodiment of FIG. 7), and is disposed within the channel. The wireless access point device 1205 comprises two grommet-type pass throughs (or the like) for the one or more lines to be fed into and out of the container of the wireless access point device 1205.

FIG. 12B depicts a top view of the same (or equivalent) section of ground as shown in FIG. 12A, except that the second filler material layer 365b and the capping material layer 370 have been applied over the one or more lines, the wireless access point device 1205, and the first filler material layer 365a in channel 340a of main slot 340. Dashed lines through FIGS. 12A and 12B show the corresponding same (or equivalent) sections of ground between the two figures.

FIG. 12C is a partial sectional view of system 1200, as shown along the O-O direction indicated in FIG. 12B, depicting a section of the apical conduit slot (in this case, the main slot 340), in the channel (in this case, channel 340a) of which is disposed the rectangular wireless access point device 1205, which comprises a container 1205a, a lid or tray 1205b, and a grommet-type pass through or other type of pass through 1205c. As shown in FIG. 12C, the one or more lines are fed through the grommet-type (or other) pass through 1205c, the first filler material layer 365a (e.g., a tack coat layer) is disposed in the channel over or on top of the one or more lines (in a manner as shown, e.g., in FIG. 7B). After the first filler material layer 365a sets, the second filler material layer 365b is disposed over the first filler material layer 365b, up to the top of the lid or tray 1205b. The capping material 370 is disposed over or on top of the second filler material layer 365b and the lid or tray 1205b. In some cases, as shown in FIG. 12E, a surface 370a of the capping layer 370 might bulge a little bit above the surface 305a of roadway 305, while in other cases (not shown), the surface 370a might be substantially flat with respect to surface 305a. As shown in FIG. 12C, the channel 340a has a width $w_3$ and a depth $D_{16}$ (which are equivalent to width $w_2$ and $D_2$ of the channel of FIG. 7). The wireless access point device 1205 has a width $w_4$ that is less than the width $w_3$ of the channel 340a, and has a depth $D_{17}$ that is less than the depth $D_{16}$ of the channel, while the grommet-type (or other) pass through 1205c of the wireless access point device 1205 has a width $w_5$ that is less than the width $w_4$ of the wireless access point device 1205, and has a depth $D_{18}$ that is less than the depth $D_{17}$ of the wireless access point device 1205.

FIG. 12D is a partial sectional view of system 1200, as shown along the P-P direction indicated in FIG. 12B, depicting a section of the apical conduit slot (in this case, the main slot 340), in the channel (in this case, channel 340a) of which is disposed the wireless access point device 1205. As shown in FIGS. 12A and 12B, the P-P direction runs through the wireless access point device 1205 at about the half-way point. Within the wireless access point device 1205 is disposed an access point 1210, which communicatively couples to the one or more lines that are fed through the grommet-type (or other) pass through 1205c of the wireless access point device 1205, and communicatively couples to an antenna, antenna array, or antenna system that is disposed in the lid or tray 1205b (examples of the antennas being shown and described below with respect to FIGS. 14A-14K and 15A-15B). As shown in FIG. 12D, the container 1205a has a depth $D_{19}$ that is less than the depth $D_{17}$ of the wireless access point device 1205, while the lid or tray 1205b has a depth $D_{20}$ that is less than the depth $D_{19}$ of the container 1205a. The view or embodiment of FIG. 12D is otherwise similar to that of FIG. 12C, and similar descriptions are applicable to FIG. 12D.

FIG. 12E is a partial sectional view of system 1200, as shown along the Q-Q direction indicated in FIG. 12B, depicting a section of the apical conduit slot (in this case, the main slot 340), in the channel (in this case, channel 340a) of which is disposed a capping material layer 370 over or on top of the second filler material layer 365b, the first filler material layer 365a (e.g., a tack coat layer), and the one or more lines (as shown, e.g., in FIG. 7C). In some cases, as shown in FIG. 12E, a surface 370a of the capping layer 370 might bulge a little bit above the surface 305a of roadway 305, while in other cases (not shown), the surface 370a might be substantially flat with respect to surface 305a. The embodiment of FIG. 12E is similar, if not identical, to the embodiment of FIG. 7E.

Turning to FIG. 12F, a top view is shown of a section of ground in which an apical conduit slot (in this example, an apical conduit main slot 340) is shown disposed in a ground surface (in this example, roadway 305). As shown in the non-limiting example of FIG. 12F, the one or more lines (including, but not limited to, F2 optical fiber cables 350b and conduit/microduct 355, or the like) might be disposed in the channel 340a of main slot 340, with the first filler layer 365a (e.g., a tack coat layer, as described above with respect to FIG. 3D) over the one or more lines (either in a continuous manner as in FIGS. 7A-7E or in a non-continuous or spot manner as in FIGS. 7F-7J) along the length of the channel 340a of main slot 340. In the embodiment of FIG. 12F, a circular (or cylindrical) wireless access point device 1205 is configured to fit within a road bore that intersects with the channel. The channel has a width of $w_6$ (which is equivalent to width $w_2$ of the channel in the embodiment of FIG. 7), while the road bore has a diameter $w_7$, which is greater than the width $w_6$ (in some cases, about twice or three times the width $w_6$). The wireless access point device 1205 comprises two grommet-type pass throughs (or the like) for the one or more lines to be fed into and out of the container of the wireless access point device 1205.

FIG. 12G depicts a top view of the same (or equivalent) section of ground as shown in FIG. 12F, except that the second filler material layer 365b and the capping material layer 370 have been applied over the one or more lines, the wireless access point device 1205, and the first filler material layer 365a in channel 340a of main slot 340. Dashed lines through FIGS. 12F and 12G show the corresponding same (or equivalent) sections of ground between the two figures.

FIG. 12H is a partial sectional view of system 1200, as shown along the R-R direction indicated in FIG. 12G, depicting a section of the apical conduit slot (in this case, the main slot 340), in the channel (in this case, channel 340a) of which is disposed the circular (or cylindrical) wireless access point device 1205, which comprises a container 1205a, a lid or tray 1205b, and a grommet-type pass through or other type of pass through 1205c. As shown in FIG. 12H, the one or more lines are fed through the grommet-type (or other) pass through 1205c, the first filler material layer 365a (e.g., a tack coat layer) is disposed in the channel over or on top of the one or more lines (in a manner as shown, e.g., in FIG. 7B). After the first filler material layer 365a sets, the second filler material layer 365b is disposed over the first filler material layer 365b, up to the top of the lid or tray 1205b. The capping material 370 is disposed over or on top of the second filler material layer 365b and the lid or tray 1205b. In some cases, as shown in FIG. 12J, a surface 370a of the capping layer 370 might bulge a little bit above the surface 305a of roadway 305, while in other cases (not shown), the surface 370a might be substantially flat with respect to surface 305a. As shown in FIG. 12H, the channel 340a has a width $w_6$ and a depth $D_{21}$ (which are equivalent to width $w_2$ and $D_2$ of the channel of FIG. 7). The wireless access point device 1205 has a depth $D_{22}$ (equivalent to depth $D_{17}$) that is less than the depth $D_{21}$ of the channel, while the grommet-type (or other) pass through 1205c of the wireless access point device 1205 has a width $w_8$ (equivalent to width $w_5$) that is less than the width $w_6$ of the channel, and has a depth $D_{23}$ (equivalent to depth $D_{18}$) that is less than the depth $D_{22}$ (equivalent to depth $D_{17}$) of the wireless access point device 1205.

FIG. 12I is a partial sectional view of system 1200, as shown along the S-S direction indicated in FIG. 12G, depicting a section of the apical conduit slot (in this case, the main slot 340), in the channel (in this case, channel 340a) of which is disposed the wireless access point device 1205. As shown in FIGS. 12F and 12G, the S-S direction runs through the wireless access point device 1205 at about the half-way point. Within the wireless access point device 1205 is disposed an access point 1210, which communicatively couples to the one or more lines that are fed through the grommet-type (or other) pass through 1205c of the wireless access point device 1205, and communicatively couples to an antenna, antenna array, or antenna system that is disposed in the lid or tray 1205b (examples of the antennas being shown and described below with respect to FIGS. 14A-14K and 15A-15B). As shown in FIG. 12I, the circular (or cylindrical) wireless access point device 1205 has a width $w_9$ that is less than the width $w_7$ of the road bore that intersects with the channel 340a, and the container 1205a has a depth $D_{24}$ (equivalent to depth $D_{19}$) that is less than the depth $D_{22}$ of the wireless access point device 1205, while the lid or tray 1205b has a depth $D_{25}$ (equivalent to depth $D_{20}$) that is less than the depth $D_{24}$ of the container 1205a. The view or embodiment of FIG. 12I is otherwise similar to that of FIGS. 12D and 12H, and similar descriptions are applicable to FIG. 12I.

FIG. 12J is a partial sectional view of system 1200, as shown along the T-T direction indicated in FIG. 12G, depicting a section of the apical conduit slot (in this case, the main slot 340), in the channel (in this case, channel 340a) of which is disposed a capping material layer 370 over or on top of the second filler material layer 365b, the first filler material layer 365a (e.g., a tack coat layer), and the one or more lines (as shown, e.g., in FIG. 7C). In some cases, as shown in FIG. 12J, a surface 370a of the capping layer 370 might bulge a little bit above the surface 305a of roadway 305, while in other cases (not shown), the surface 370a might be substantially flat with respect to surface 305a. The embodiment of FIG. 12J is similar, if not identical, to the embodiments of FIGS. 7E and 12E.

FIG. 12K depicts a circular (or cylindrical) wireless access point device 1205 in a road bore that intersects two channels at a right angle or substantially 90 degree angle. The embodiment of FIG. 12K is otherwise similar, or identical to, the embodiment of FIGS. 12F-12J, and similar descriptions apply to FIG. 12K. FIG. 12L depicts a rectangular wireless access point device 1205 disposed at the intersection of two channels at a right angle or substantially 90 degree angle. The embodiment of FIG. 12L is otherwise similar, or identical to, the embodiment of FIGS. 12A-12E, and similar descriptions apply to FIG. 12L. FIGS. 12M-12P depict triangular wireless access point devices 1205 either at the intersection of two channels (FIG. 12M) or in a road bore that intersects two channels, all at a right angle or substantially 90 degree angle. In the embodiments of FIGS. 12N-12P, the road bores (rather than being circular or cylindrical) are triangular in shape, and are configured to have the middle of the two equal length shorter sides aligned with each channel (with the triangular road bore extending within the acute angle region between the two channels) (FIG. 12N), to have the longer side intersect with the outside walls of the two channels (FIG. 12O), or to have the tip of corner of the two equal length shorter sides within the width of the two channels (with the triangular road bore extending within the obtuse angle region defined by the two channels) (FIG. 12P). With reference to FIGS. 12N-12P, in some cases, the right triangle might be about 2 inches (~5.08 cm) by 2 inches (~5.08 cm), or longer, along the equal shorter sides. The embodiments of FIGS. 12M-12P are otherwise similar, or identical to, the embodiments of FIGS. 12K and 12M, and similar descriptions apply to FIGS. 12M-12P.

Although FIGS. 12K through 12P depict the two channels as intersecting at a right angle or at substantially 90 degrees, any angle may be implemented with the grommet-type (or other type) of pass through 1205c being reconfigured (as necessary) to feed the one or more lines into or out of the wireless access point device 1205. In some cases, an appropriate-shaped wireless access point device 1205 may be utilized for the particular angle of intersection of two channels. For example, the triangular wireless access point device 1205 might be suitable for 90 degree or 45 degree angles of intersection, while the rectangular wireless access point device 1205 might be suitable for 90 degree angle of intersection, and the circular (or cylindrical) wireless access point device 1205 might be suitable for 0-360 degree angles of intersection.

FIG. 12Q depicts a circular (or cylindrical) wireless access point device 1205 in a road bore that intersects three channels, or is at the T-intersection of two channels that intersect at a right angle or substantially 90 degree angle. The embodiment of FIG. 12Q is otherwise similar, or identical to, the embodiment of FIGS. 12F-12J and 12K, and similar descriptions apply to FIG. 12Q. FIG. 12R depicts a rectangular wireless access point device 1205 disposed at the intersection of three channels, or is at the T-intersection of two channels that intersect at a right angle or substantially 90 degree angle. The embodiment of FIG. 12R is otherwise similar, or identical to, the embodiment of FIGS. 12A-12E and 12L, and similar descriptions apply to FIG. 12R.

Although FIGS. 12Q and 12R depict a T-intersection of two channels that intersect at a right angle or at substantially 90 degrees, any angle may be implemented with the grommet-type (or other type) of pass through 1205c being reconfigured (as necessary) to feed the one or more lines into or out of the wireless access point device 1205. In some cases, an appropriate-shaped wireless access point device 1205 may be utilized for the particular angle of intersection of two channels. For example, the triangular wireless access point device 1205 (of FIGS. 12M-12P) might be suitable for 90 degree or 45 degree angles of intersection, while the rectangular wireless access point device 1205 (of FIGS. 12A-12E and 12L) might be suitable for 90 degree angle of intersection, and the circular (or cylindrical) wireless access point device 1205 (of FIGS. 12F-12J and 12K) might be suitable for 0-360 degree angles of intersection.

Figure 13A:
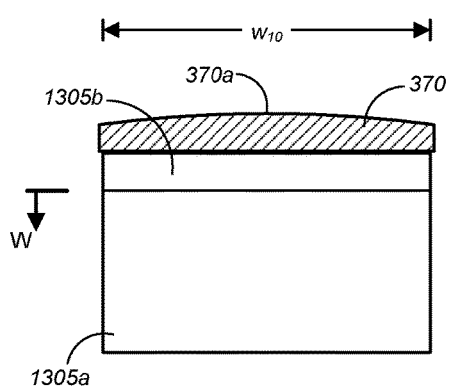
FIGS. 13A-13P are general schematic diagrams illustrating various embodiments of a wireless access point device that is configured to be disposed within a channel of an apical conduit system for implementing FTTP and/or point-to-point fiber insertion within a PON communications system.
Figure 13B:
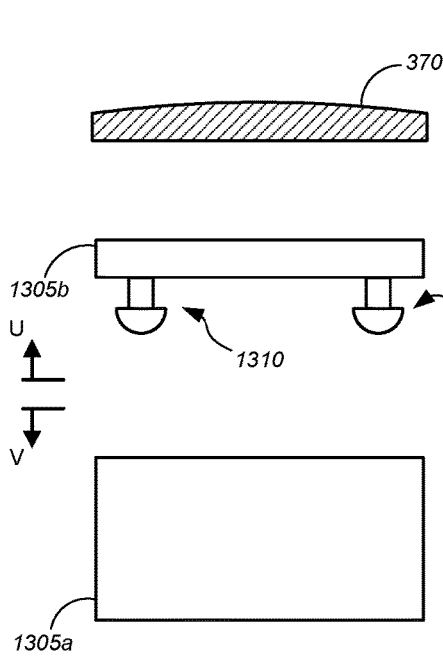
Figure 13C:
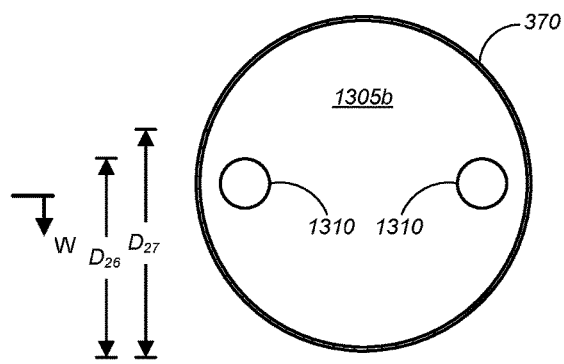
Figure 13D:
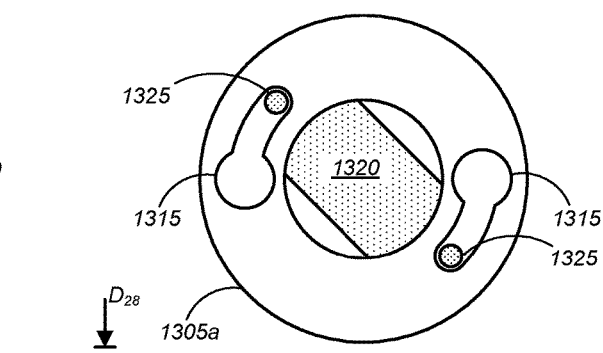
Figure 13E:
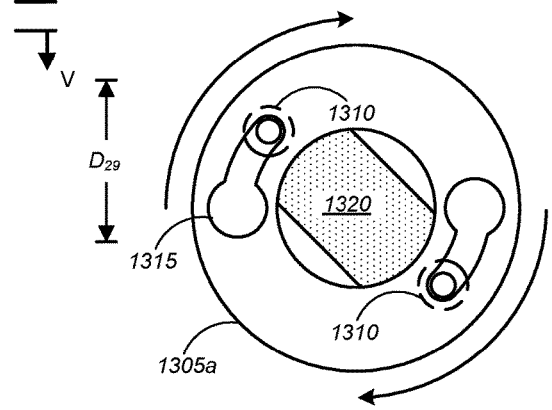
Figure 13F:
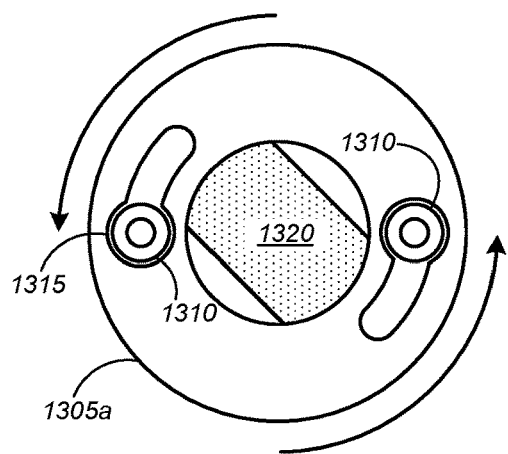
Figure 13G:
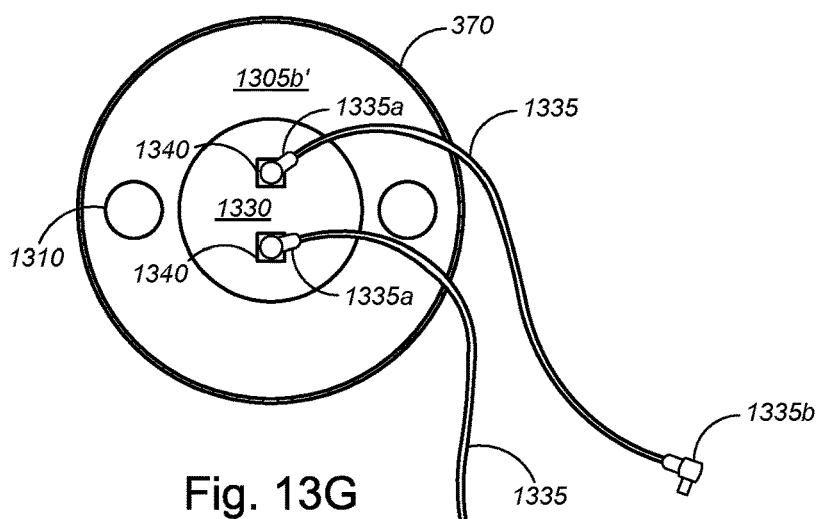
Figure 13H:
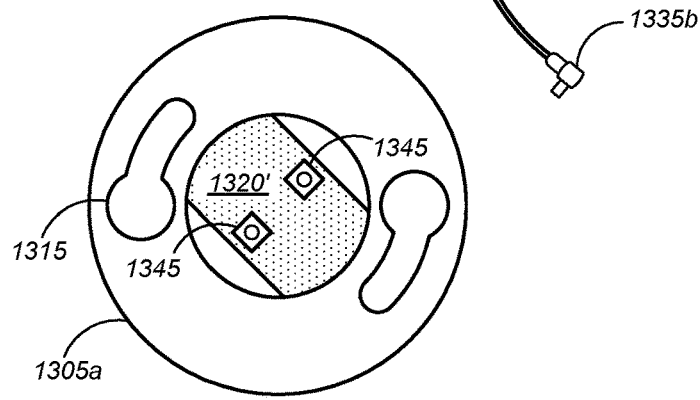
Figure 13I:
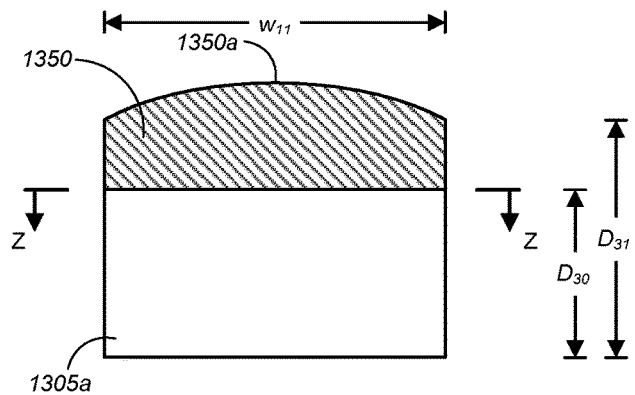
Figure 13K:
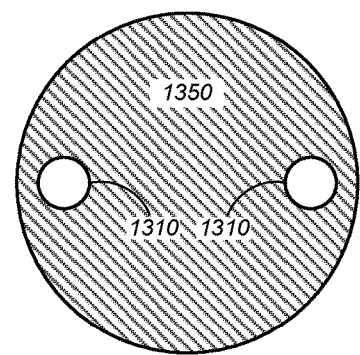
Figure 13J:
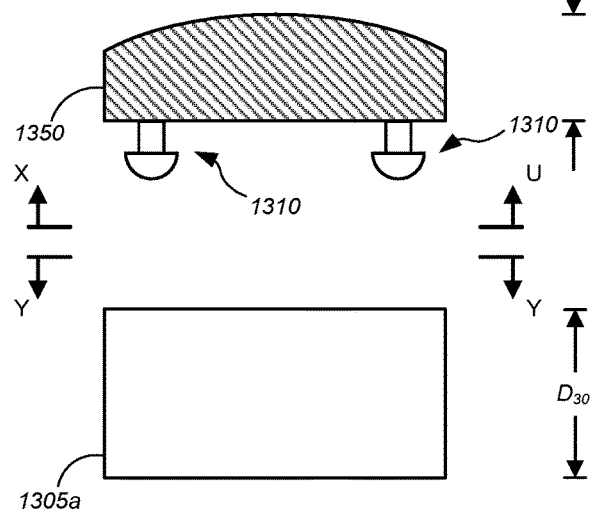
Figure 13L:
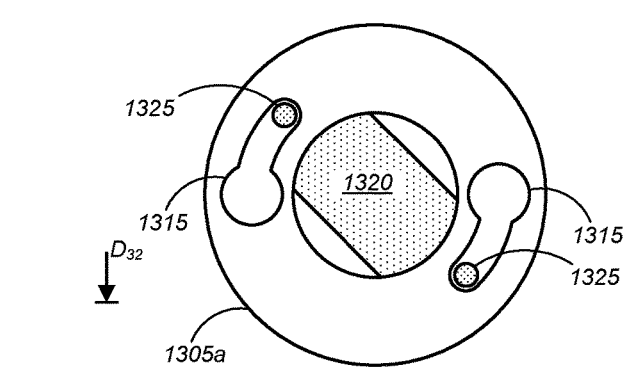
Figure 13M:
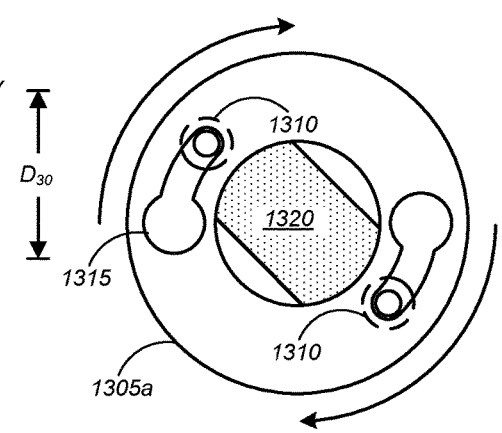
Figure 13N:
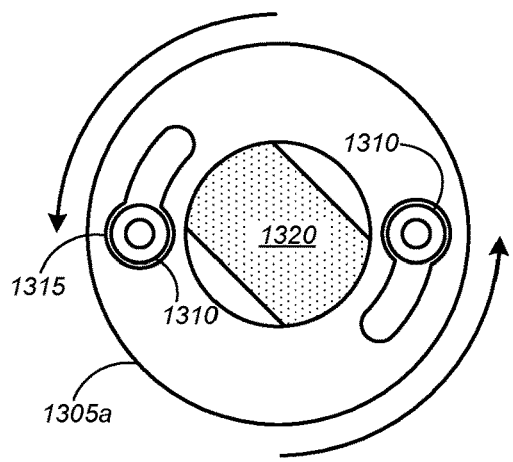
Figure 13O:
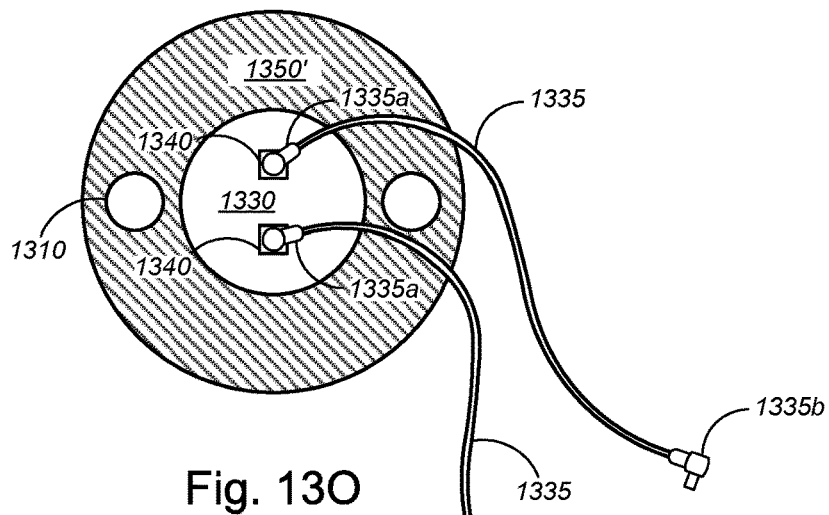
Figure 13P:
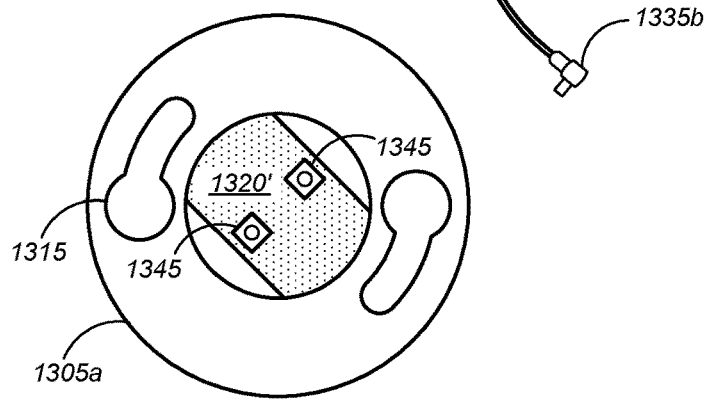

FIGS. 13A-13P (collectively, "FIG. 12") are general schematic diagrams illustrating various embodiments of a wireless access point device that is configured to be disposed within a channel of an apical conduit system for implementing FTTP and/or point-to-point fiber insertion within a PON communications system. FIGS. 13A-13H depict one embodiment 1300 of a wireless access point device that comprises a tray and a container, and that has an antenna or antenna system disposed in the tray that rotably couples with the container. FIGS. 13I-13P depict another embodiment 1300' of a wireless access point device that comprises capping module or dome and a container, and that has an antenna or antenna system disposed in the capping module or dome that rotably couples with the container.

With reference to FIGS. 13A-13H, a circular (or cylindrical) wireless access point device 1300 is shown. In some embodiments, the wireless access point device 1300 is similar, or identical, to wireless access point device 1205 as shown and described with respect to FIGS. 12F-12J and 12K. According to some embodiments, wireless access point 1300 might comprise a container or enclosure 1305a and a lid or tray 1305b. When the wireless access point device 1300 is disposed in a road bore or channel of an apical conduit system (as shown and described with respect to FIGS. 12F-12J and 12K, for example), a capping material layer 370 may be disposed on top of or over the wireless access point device 1300 (and on top of or over the one or more lines, the first filler material layer 365a, and the second filler material layer 365b as described above). The channel or road bore might have a depth $D_{27}$ (equivalent to depth $D_2$, $D_{16}$, or $D_{21}$) and a width $w_6$ or $w_7$. The container or enclosure 1305a has a width or diameter $w_{10}$ and a depth $D_{29}$, while the lid or tray 1305b has a width or diameter $w_{10}$ and a depth $D_{28}$. In some instances, diameter or width $w_{10}$ might be equivalent to diameter or width $w_9$ of the embodiment of FIGS. 12F-12J and 12K, while, in some cases, diameter or width $w_{10}$ might be about 3 or 4 inches (~7.62 cm or ~10.16 cm), depth $D_{29}$ might be about 1.5 inches (~3.81 cm), depth $D_{28}$ might be about 1.0 inch (~2.54 cm), and depth ($D_{27}$-$D_{26}$) might be about 0.5 inches (~1.27 cm).

FIG. 13A shows an elevation view of the wireless access point device 1300, with the capping material 370 shown in relation to the wireless access point device 1300, while FIG. 13B shows an exploded view of the wireless access point device 1300 of FIG. 13A. In the exploded view, pegs 1310 are shown extending from a bottom of the lid or tray 1305b. FIG. 13C depicts a view of the bottom of the lid or tray 1305b as shown along the U-U direction indicated in FIG. 13B. In FIG. 13C, two pegs 1310 are shown on opposite ends of the bottom of the lid or tray 1305b, slightly inward from the edge of the lid or tray 1305b. In FIG. 13C, the edges of the capping material 370 can be seen extending beyond the perimeter of the lid or tray 1305b. FIG. 13D depicts a plan view of the container 1305a as shown along the V-V direction indicated in FIG. 13B. In FIG. 13D, two grooves 1315 are shown in the top surface of the container 1305a. Each groove 1315 has a larger diameter circle—through which the hemispherical portion of a peg 1310 fits—and a channel having a smaller width—through which the cylinder portion of the peg 1310 (but not the hemispherical portion of the peg 1310) fits. In FIG. 13D, an access point ("AP"), optical network terminal ("ONT"), or other such device 1320 is shown through an opening in the top surface of the container 1305a. In the embodiment of 13C and 13D, contact points 1325 may be disposed at the far (or inner) end of the channels of grooves 1310. The contact points allow corresponding contacts at the tips of the hemispherical portions of pegs 1310 to make contact therewith. In some cases, the entire peg 1310 might be made of a conductive material, while in other cases a conductive material within the peg 1310 might connect the tip of the peg 1310 to the antenna, antenna arrays, or antenna system. In this manner, the antenna, antenna arrays, or antenna system, which might be located in the lid or tray 1305b, may be communicatively coupled to the AP, ONT, or other such device 1320 in the container 1305a via the pegs 1310 and the contacts 1325.

FIGS. 13E and 13F depict views of the container 1305a as shown along the W-W direction indicated in FIG. 13A. With reference to FIG. 13E, when the lid or tray 1305b is rotated in the clock-wise direction (as shown with the two arc arrows in FIG. 13E) after the pegs 1310 have been inserted through the larger diameter circles of the grooves 1315, the pegs 1310 travel along the channels of the groove 1315, thereby locking the lid or tray 1305b in place with respect to the container 1305a. Here, the dash-lined circles denote the positions of the edges of the hemispherical portions of the pegs 1310 beneath the top surface of the container 1305a (and are not otherwise visible except as seen through the openings of the channel of the groove 1315). Turning to FIG. 13F, when the lid or tray 1305b is rotated in the counter-clock-wise direction (as shown with the two arc arrows in FIG. 13F), the pegs 1310 travel along the channels of the groove 1315 until the hemispherical portions align with the larger diameter circles of the grooves 1315, thereby allowing the lid or tray 1305b to be separated from the container 1305a.

FIGS. 13G and 13H depict an alternative embodiment compared with the embodiment of FIGS. 13C and 13D. In other words, rather than the interconnection between the antenna, antenna array, or antenna system disposed in the lid or tray 1305a and the AP, ONT, or other such device 1320 disposed in the container 1305a via the pegs 1310 and the contacts 1325, pig-tails or other wire-type connectors 1335 may be used. As shown in FIG. 13G, an opening in the lid or tray 1305b' might expose the antenna, antenna array, or antenna system 1330, which might comprise ports or connectors 1340. In FIG. 13H, the AP, ONT, or other such device 1320' might comprise corresponding ports or connectors 1345. Wire connectors 1335 having a first end connector 1335a and a second end connector 1335b (which might be the same or different from each other), with the first end connector 1335a coupling with the ports or connectors 1340 in the antenna, antenna array, or antenna system 1330 disposed in lid or tray 1305b', while the second end connector 1335b is configured to couple with the ports or connectors 1345 in the AP, ONT, or other such device 1320' disposed in container 1305a. The embodiment of FIGS. 13G and 13H are otherwise similar, or identical, to the embodiment of FIGS. 13C and 13D.

FIGS. 13I-13P depict an alternative set of embodiments from the set of embodiments in FIGS. 13A-13H. In particular, rather than using a lid or tray 1305b, on top of which is disposed the capping material layer 370, an enlarged lid, dome, or radome shell 1350 is used. The channel or road bore, in which the wireless access point device 1300' is disposed, might have a depth $D_{31}$ (equivalent to depth $D_2$, $D_{16}$, $D_{21}$, or $D_{27}$) and a width $w_6$, $w_7$, or $w_{11}$. The container or enclosure 1305a has a width or diameter $w_{11}$ (equivalent to width or diameter $w_{10}$) and a depth $D_{30}$ (equivalent to depth $D_{29}$), while the enlarged lid, dome, or radome shell 1350 has a width or diameter $w_{11}$ and a depth $D_{32}$ (which is larger than depth $D_{28}$ of lid or tray 1305b of FIGS. 13A-13H, in some cases larger than the combined height of the lid or tray 1305b and the capping material layer 370 of FIGS. 13A-13H (i.e., depth $D_{27}$ minus depth $D_{28}$)). In some instances, diameter or width $w_{11}$ might be equivalent to diameter or width $w_9$ of the embodiment of FIGS. 12F-12J and 12K, while, in some cases, diameter or width $w_{11}$ might be about 3 or 4 inches (~7.62 cm or ~10.16 cm), depth $D_{30}$ might be about 2 inches (~5.8 cm), and depth $D_{32}$ or depth ($D_{31}$-$D_{30}$) might be about 1.5 inches (~3.81 cm).

FIG. 13I shows an elevation view of the wireless access point device 1300', while FIG. 13J shows an exploded view of the wireless access point device 1300' of FIG. 13I. In the exploded view, pegs 1310 are shown extending from a bottom of the enlarged lid, dome, or radome shell 1350. FIG. 13K depicts a view of the bottom of the enlarged lid, dome, or radome shell 1350 as shown along the X-X direction indicated in FIG. 13J. In FIG. 13K, two pegs 1310 are shown on opposite ends of the bottom of the enlarged lid, dome, or radome shell 1350, slightly inward from the edge of the enlarged lid, dome, or radome shell 1350. FIG. 13L depicts a plan view of the container 1305a as shown along the Y-Y direction indicated in FIG. 13J. In FIG. 13L, two grooves 1315 are shown in the top surface of the container 1305a. Each groove 1315 has a larger diameter circle—through which the hemispherical portion of a peg 1310 fits—and a channel having a smaller width—through which the cylinder portion of the peg 1310 (but not the hemispherical portion of the peg 1310) fits. In FIG. 13L, an access point ("AP"), optical network terminal ("ONT"), or other such device 1320 is shown through an opening in the top surface of the container 1305a. In the embodiment of 13K and 13L, contact points 1325 may be disposed at the far (or inner) end of the channels of grooves 1310. The contact points allow corresponding contacts at the tips of the hemispherical portions of pegs 1310 to make contact therewith. In some cases, the entire peg 1310 might be made of a conductive material, while in other cases a conductive material within the peg 1310 might connect the tip of the peg 1310 to the antenna, antenna arrays, or antenna system. In this manner, the antenna, antenna arrays, or antenna system, which might be located in the enlarged lid, dome, or radome shell 1350, may be communicatively coupled to the AP, ONT, or other such device 1320 in the container 1305a via the pegs 1310 and the contacts 1325.

FIGS. 13M and 13N depict views of the container 1305a as shown along the Z-Z direction indicated in FIG. 13I. With reference to FIG. 13M, when the enlarged lid, dome, or radome shell 1350 is rotated in the clock-wise direction (as shown with the two arc arrows in FIG. 13M) after the pegs 1310 have been inserted through the larger diameter circles of the grooves 1315, the pegs 1310 travel along the channels of the groove 1315, thereby locking the enlarged lid, dome, or radome shell 1350 in place with respect to the container 1305a. Here, the dash-lined circles denote the positions of the edges of the hemispherical portions of the pegs 1310 beneath the top surface of the container 1305a (and are not otherwise visible except as seen through the openings in the channel of the groove 1315). Turning to FIG. 13N, when the enlarged lid, dome, or radome shell 1350 is rotated in the counter-clock-wise direction (as shown with the two arc arrows in FIG. 13N), the pegs 1310 travel along the channels of the groove 1315 until the hemispherical portions align with the larger diameter circles of the grooves 1315, thereby allowing the enlarged lid, dome, or radome shell 1350 to be separated from the container 1305a.

FIGS. 13O and 13P depict an alternative embodiment compared with the embodiment of FIGS. 13K and 13L. In other words, rather than the interconnection between the antenna, antenna array, or antenna system disposed in the lid or tray 1305a and the AP, ONT, or other such device 1320 disposed in the container 1305a via the pegs 1310 and the contacts 1325, pig-tails or other wire-type connectors 1335 may be used. As shown in FIG. 13O, an opening in the enlarged lid, dome, or radome shell 1350' might expose the antenna, antenna array, or antenna system 1330, which might comprise ports or connectors 1340. In FIG. 13P, the AP, ONT, or other such device 1320' might comprise corresponding ports or connectors 1345. Wire connectors 1335 having a first end connector 1335a and a second end connector 1335b (which might be the same or different from each other), with the first end connector 1335a coupling with the ports or connectors 1340 in the antenna, antenna array, or antenna system 1330 disposed in enlarged lid, dome, or radome shell 1350', while the second end connector 1335b is configured to couple with the ports or connectors 1345 in the AP, ONT, or other such device 1320' disposed in container 1305a. The embodiment of FIGS. 13O and 13P are otherwise similar, or identical, to the embodiment of FIGS. 13K and 13L. The embodiments of FIGS. 13I-13P are otherwise similar to the embodiments of FIGS. 13A-13H, and similar descriptions apply to FIGS. 13I-13P.

In the embodiments of FIG. 13, the container 1305a is designed or configured for reentry to allow access to the AP, ONT, or other such device 1320 or 1320' therein. Further, although two pegs 1310 and corresponding grooves 1315 are shown in the embodiments of FIG. 13, the various embodiments are not so limited and any suitable number of pegs and corresponding grooves may be used (e.g., three pegs/grooves, four pegs/grooves, or more pegs/grooves, etc.).

Although not shown in FIG. 13, rubber seals, grommets, and/or the like may be disposed grooves around or near a perimeter portion of the lid and/or top portion of the container, such that when the lid is affixed to the container, a waterproof seal is formed between the lid and the container. To limit moisture, grommet-type pass-throughs (e.g., pass-through 1205c of FIG. 12) might be used to feed power and/or communications lines into and out of the container (e.g., container 1205a) of the wireless access point device. Alternatively or additionally, the interior of the container of the wireless access point device may be gel-filled. Alternatively or additionally, small desiccant packets or other forms of desiccant may be disposed within the interior of the container and/or the lid.

Figure 14A:
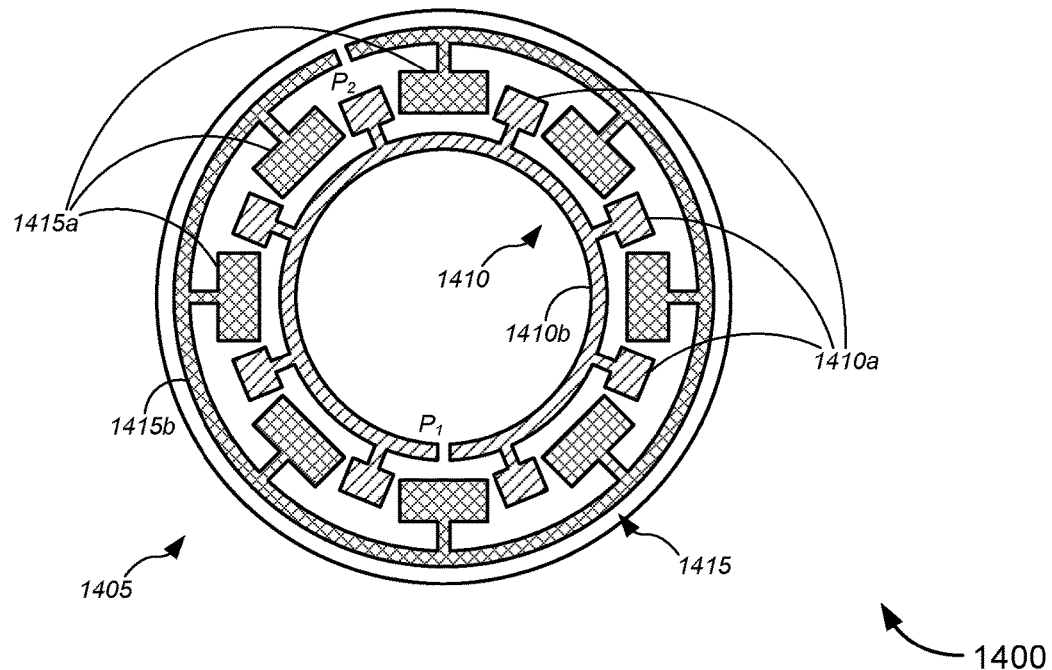

FIGS. 14A-14K (collectively, "FIG. 14") are general schematic diagrams illustrating various antennas or antenna designs 1400 used in the various ground-based signal distribution devices, in accordance with various embodiments. In particular, FIGS. 14A-14D show various embodiments of lateral patch antennas (or arrays of lateral patch antennas), while FIGS. 14E-14H show various embodiments of leaky waveguide antennas (also referred to as "planar antennas," "planar waveguide antennas," "leaky planar waveguide antennas," or "2D leaky waveguide antennas," and/or the like). FIGS. 14I-14K show various embodiments of reversed F antennas or planar inverted F antennas ("PIFA").

FIG. 14A shows antenna 1405, which includes a plurality of arrays of lateral patch antennas comprising a first array 1410 and a second array 1415. Antenna 1405, in some embodiments, may correspond to antenna 230, which is part of lid 215, either disposed completely within the lid 215, disposed below (but mounted to) the lid 215, or disposed partially within, and partially extending below, the lid 215. In some instances, antenna 1405 might correspond to antenna 220, which is disposed below lid 215, either disposed within container 205 (as in the embodiments of FIGS. 2A and 2C), mounted within upper portion 235a of pedestal 235 (as in the embodiments of FIGS. 2I-2K), or otherwise disposed under cover 215 (as in the embodiment of FIG. 2L), or the like.

In the non-limiting example of FIG. 14A, the first array of lateral patch antennas 1410 might comprise x number of lateral patch antennas 1410a connected to a common microstrip 1410b (in this case, x=8). Each lateral patch antenna 1410a has shape and size designed to transmit and receive rf signals at a frequency of about 5 GHz. At least one end of microstrip 1410b communicatively couples with a first port $P_1$, which communicatively couples, via cable distribution/splicing system 225b (and via container 205), to one or more of the at least one optical fiber line, the at least one conductive signal line (including, but not limited to, copper data lines, copper video lines, copper voice lines, or any suitable (non-optical fiber) data cables, (non-optical fiber) video cables, or (non-optical fiber) voice cables, and/or the like), and/or the like that are provided in the one or more conduits 105.

Also shown in the non-limiting example of FIG. 14A, the second array of lateral patch antennas 1415 might likewise comprise y number of lateral patch antennas 1415a connected to a common microstrip 1415b (in this case, y=8). In some embodiments x equals y, while in other embodiments, x might differ from y. Each lateral patch antenna 1415a has shape and size designed to transmit and receive rf signals at a frequency of about 2.4 GHz. At least one end of microstrip 1415b communicatively couples with a second port $P_2$, which communicatively couples, via cable distribution system 225 (and via container 205), to one or more of the at least one optical fiber line, the at least one conductive signal line (including, but not limited to, copper data lines, copper video lines, copper voice lines, or any suitable (non-optical fiber) data cables, (non-optical fiber) video cables, or (non-optical fiber) voice cables, and/or the like), and/or the like that are provided in the one or more conduits 105. In some embodiments, the first port $P_1$ and the second port $P_2$ might communicatively couple to the same one or more of the at least one optical fiber line, the at least one conductive signal line, and/or the like, while in other embodiments, the first port $P_1$ and the second port $P_2$ might communicatively couple to different ones or more of the at least one optical fiber line, the at least one conductive signal line, and/or the like.

Although 8 lateral patch antennas are shown for each of the first array 1410 or the second array 1415 (i.e., x=8; y=8), any suitable number of lateral patch antennas may be utilized, so long as: each lateral patch antenna remains capable of transmitting and receiving data, video, and/or voice rf signals at desired frequencies, which include, but are not limited to, 600 MHz, 700 MHz, 2.4 GHz, 5 GHz, 5.8 GHz, and/or the like; each lateral patch antenna has wireless broadband signal transmission and reception characteristics in accordance with one or more of IEEE 802.11a, IEEE 802.11b, IEEE 802.11g, IEEE 802.11n, IEEE 802.11ac, IEEE 802.11ad, and/or IEEE 802.11af protocols; and/or each lateral patch antenna has wireless broadband signal transmission and reception characteristics in accordance with one or more of Universal Mobile Telecommunications System ("UMTS"), Code Division Multiple Access ("CDMA"), Long Term Evolution ("LTE"), Personal Communications Service ("PCS"), Advanced Wireless Services ("AWS"), Emergency Alert System ("EAS"), and/or Broadband Radio Service ("BRS") protocols.

Further, although 2 arrays of patches are shown in FIG. 14A, any number of arrays may be used, including, but not limited to, 1, 2, 3, 4, 6, 8, or more. Each array has a feeding structure, not unlike the microstrip patch feed design shown in FIG. 14A (or in FIG. 14C). In some embodiments, multiple arrays of patches may be connected to a plurality of ports, which can be connected to a multiport Wi-Fi access, using multiple-input and multiple-output ("MIMO") functionality, and in some cases using IEEE 802.11a/b/g/n/ac/ad/af standards.

Patch separation between adjacent patches in each array are typically half-lambda separation or $\lambda/2$ separation (where lambda or $\lambda$ might refer to the wavelength of the rf signal(s)). This allows for some intertwining between patches, particular, intertwining between patches of two or more different arrays of patches. In some embodiments feed lines to the multiple arrays can be separate, or may be combined for dual-/multi-mode devices.

Figure 14B:
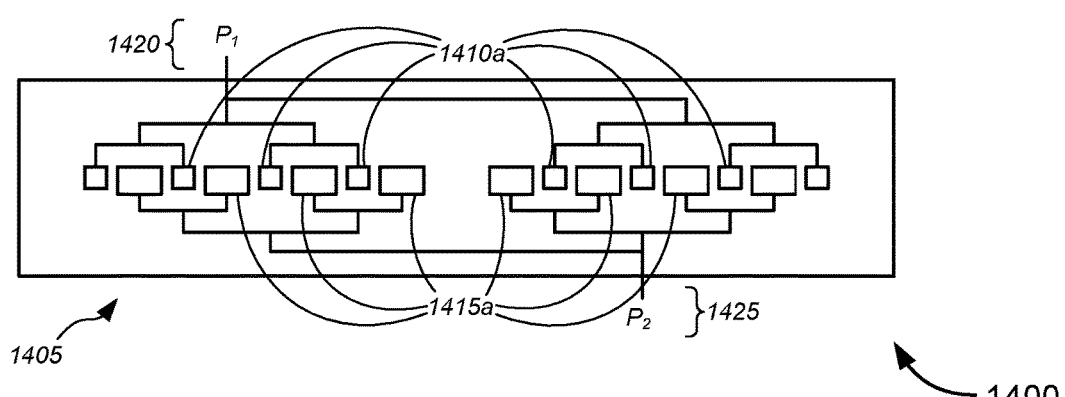

In the example of FIGS. 14A and 14B, the two arrays 1410 and 1415 each have its own, separate feed lines 1410b and 1415b, respectively, leading to separate ports $P_1$ and $P_2$, respectively. FIG. 14B shows a schematic diagram of an example of feed line configuration for the two arrays 1410 and 1415. In particular, in FIG. 14B, each of the lateral patches 1410a of the first array 1410 share a single feed line 1410b that lead to port $P_1$ (or port 1420). Likewise, each of the lateral patches 1415a share a single feed line 1415b that lead to port $P_2$ (or port 1425). Feed lines 1410b and 1415b are separate from each other, as ports 1420 and 1425 are separate from each other.

Figure 14C:
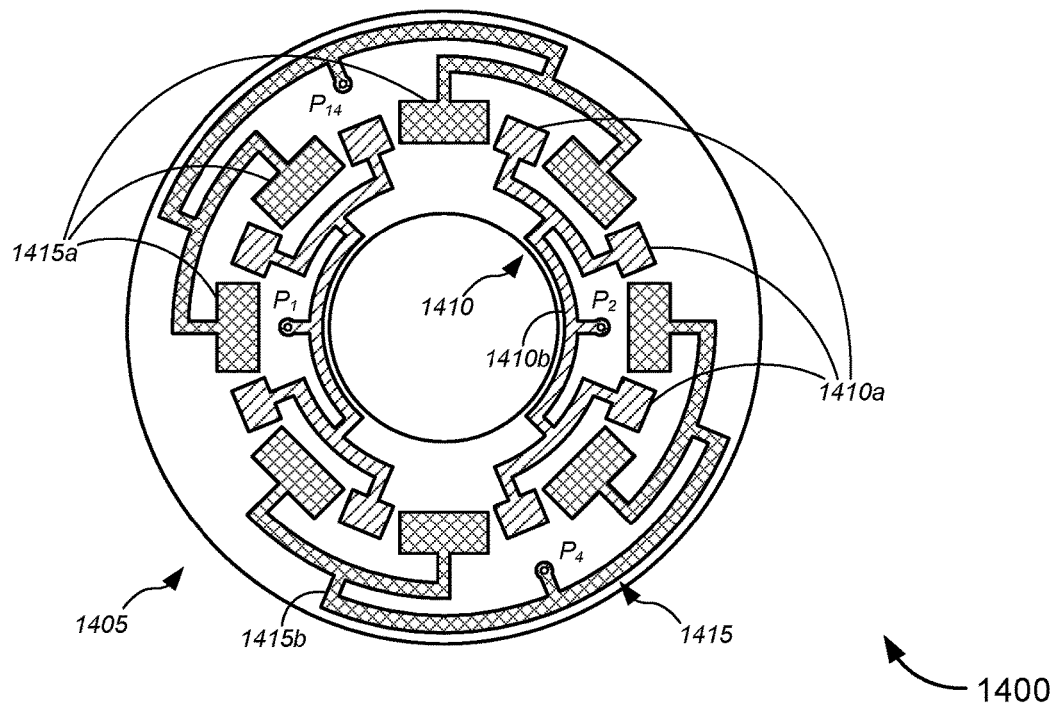
Figure 14D:
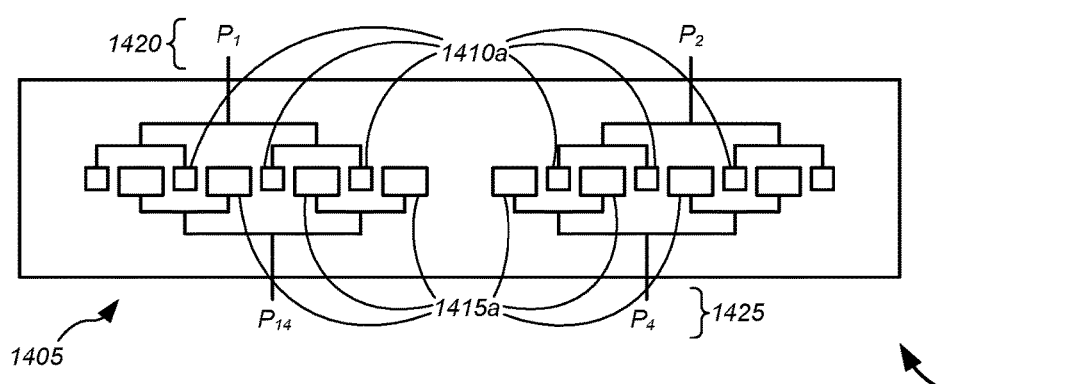

FIGS. 14C and 14D are similar to FIGS. 14A and 14B, respectively, except that the first array 1410 or the second array 1415 are each configured as two separate arrays (totaling four separate arrays in the embodiment of FIG. 14C). In particular, in FIG. 14C, the first array 1410 comprises a third array and a fourth array. The third array might comprise x' number of lateral patch antennas 1410a connected to a common microstrip 1410b (in this case, x'=4), while the fourth array might comprise x" number of lateral patch antennas 1410a connected to a common microstrip 1410b (in this case, x"=4). Although the third array and fourth array are shown to have the same number of lateral patch antennas 1410a (i.e., x'=x"), the various embodiments are not so limited and each array can have different numbers of lateral patch antennas 1410a (i.e., can be x'≠x"). Similarly, although x' and x" are each shown to equal 4 in the example of FIG. 14C, any suitable number of lateral patch antennas may be used, as discussed above with respect to the number of lateral patch antennas for each array.

Similarly, the second array 1415 comprises a fifth array and a sixth array. The fifth array might comprise y' number of lateral patch antennas 1415a connected to a common microstrip 1415b (in this case, y'=4), while the sixth array might comprise y" number of lateral patch antennas 1415a connected to a common microstrip 1415b (in this case, y"=4). Although the fifth array and sixth array are shown to have the same number of lateral patch antennas 1415a (i.e., y'=y"), the various embodiments are not so limited and each array can have different numbers of lateral patch antennas 1415a (i.e., can be y'≠y"). Similarly, although y' and y" are each shown to equal 4 the example of FIG. 14C, any suitable number of lateral patch antennas may be used, as discussed above with respect to the number of lateral patch antennas for each array.

Further, although only two sub-arrays are shown for each of the first array 1410 and for the second array 1415, any suitable number of sub-arrays may be utilized for each of the first array 1410 and for the second array 1415, and the number of sub-arrays need not be the same for the two arrays. In the case that antenna 1405 comprises three or more arrays, any number of sub-arrays for each of the three or more arrays may be utilized, and the number of sub-arrays may be different for each of the three or more arrays.

Turning back to FIGS. 14C and 14D, each of the third, fourth, fifth, and sixth arrays are separately fed by separate microstrips 1410b/1415b, each communicatively coupled to separate ports, $P_1$-$P_4$, respectively. FIG. 14D shows a schematic diagram of an example of feed line configuration for each of the two sub-arrays for each of the two arrays 1410 and 1415. In particular, in FIG. 14D, each of the lateral patches 1410a of the third array share a single feed line 1410b that lead to port $P_1$, while each of the lateral patches 1410a of the fourth array share a single feed line 1410b that lead to port $P_2$. Ports $P_1$ and $P_2$ (i.e., ports 1420) may subsequently be coupled together to communicatively couple, via cable distribution system 225 (and via container 205), to one or more of the at least one optical fiber line, the at least one conductive signal line (including, but not limited to, copper data lines, copper video lines, copper voice lines, or any suitable (non-optical fiber) data cables, (non-optical fiber) video cables, or (non-optical fiber) voice cables, and/or the like), and/or the like that are provided in the one or more conduits 105. Alternatively, ports $P_1$ and $P_2$ (i.e., ports 1420) may each separately communicatively couple, via cable distribution system 225 (and via container 205), to one or more of the at least one optical fiber line, the at least one conductive signal line, and/or the like that are provided in the one or more conduits 105.

Likewise, each of the lateral patches 1415a of the fifth array share a single feed line 1415b that lead to port $P_3$ (or port 1425), while each of the lateral patches 1415a of the sixth array share a single feed line 1415b that lead to port $P_4$. Ports $P_3$ and $P_4$ (i.e., ports 1425) may jointly or separately be communicatively coupled, via cable distribution system 225 (and via container 205), to one or more of the at least one optical fiber line, the at least one conductive signal line (including, but not limited to, copper data lines, copper video lines, copper voice lines, or any suitable (non-optical fiber) data cables, (non-optical fiber) video cables, or (non-optical fiber) voice cables, and/or the like), and/or the like that are provided in the one or more conduits 105. Feed lines 1410b and 1415b are separate from each other, as ports 1420 and 1425 are separate from each other.

The embodiments of FIGS. 14C and 14D are otherwise similar, or identical to, the embodiments of FIGS. 14A and 14B, respectively. As such, the descriptions of the embodiments of FIGS. 14A and 14B similar apply to the embodiments of FIGS. 14C and 14D, respectively.

Figure 14E:
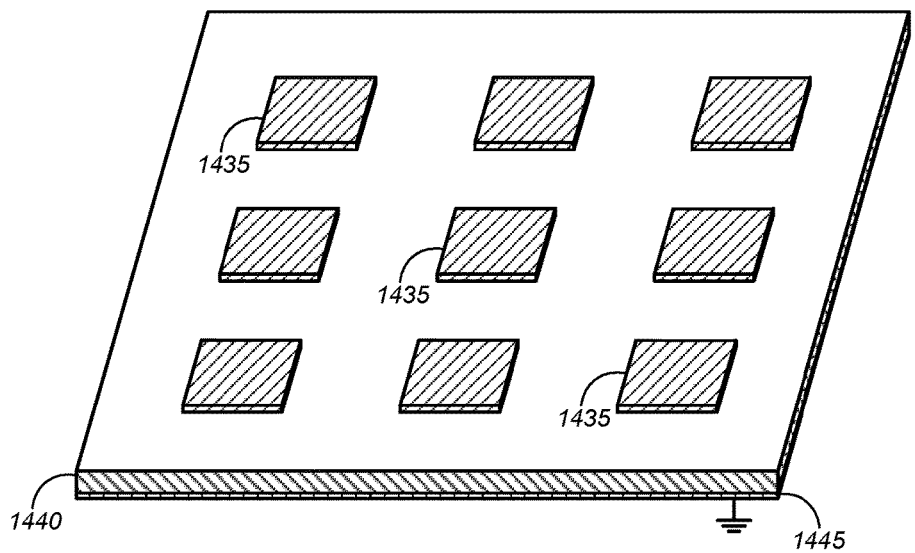
Figure 14F:
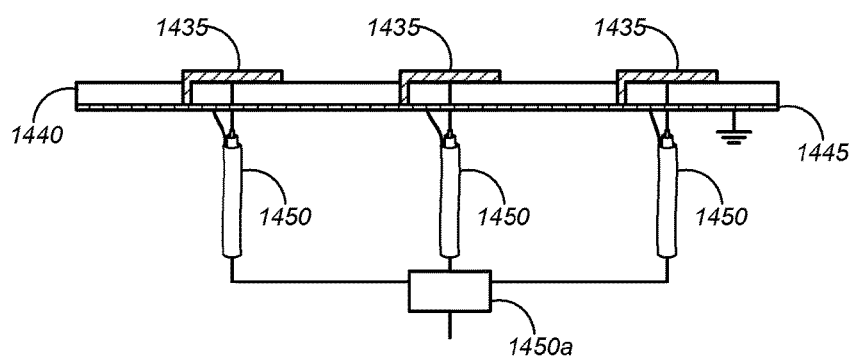

FIGS. 14E-14H show embodiments of leaky planar waveguide antennas 1430 and 1455. In FIG. 14E, antenna 1430 comprises a plurality of patch antennas 1435 disposed or fabricated on a thin dielectric substrate 1440. Antenna 1430 further comprises a ground plane 1445. In some embodiments, each of the plurality of patch antennas 1435 might comprise an L-patch antenna 1435 (as shown in FIG. 14F), with a planar portion substantially parallel with the ground plane 1445 and a grounding strip that extends through the dielectric substrate 1440 to make electrical contact with the ground plane 1445 (in some cases, the grounding strip is perpendicular with respect to each of the planar portion and the ground plane 1445). According to some embodiments, each of the plurality of patch antennas 1435 might comprise a planar patch antenna 1435 (i.e., without a grounding strip connecting the planar portion with the ground plane 1445). Dielectric substrate 1440 is preferably made of any dielectric material, and is configured to have a dielectric constant (or relative permittivity) $\varepsilon_r$ that ranges between about 3 and 10.

FIG. 14F shows a plurality of L-patch antennas 1435 each being electrically coupled to one of a plurality of cables 1450. Although a plurality of cables 1450 is shown, a single cable 1450 with multiple leads connecting each of the plurality of L-patch antennas 1435 may be used. The grounding lead for each of the plurality of cables 1450 may be electrically coupled to the ground plane 1445. In the case that a plurality of cables 1450 are used, the signals received by each antenna 1435 may be separately received and relayed to one of the at least one optical fiber line, the at least one conductive signal line, and/or the like that are provided in the one or more conduits 105, or the received signals may be combined and/or processed using a combiner 1450a (which might include, without limitation, a signal processor, a multiplexer, signal combiner, and/or the like). For signal transmission, signals from the at least one conductive signal line, and/or the like that are provided in the one or more conduits 105 may be separately relayed to each of the antennas 1435 via individual cables 1450, or the signals each of the at least one conductive signal line, and/or the like can be divided using a divider 1450a (which might include, but is not limited to, a signal processor, a demultiplexer, a signal divider, and/or the like) prior to individual transmission by each of the antennas 1435.

Figure 14G:
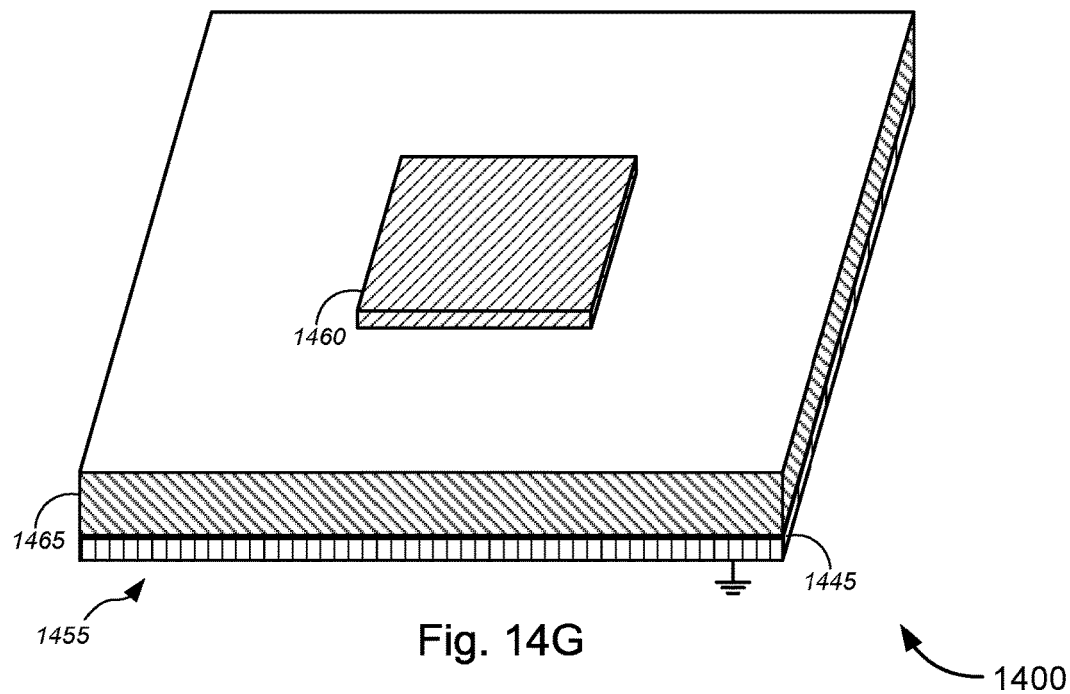
Figure 14H:
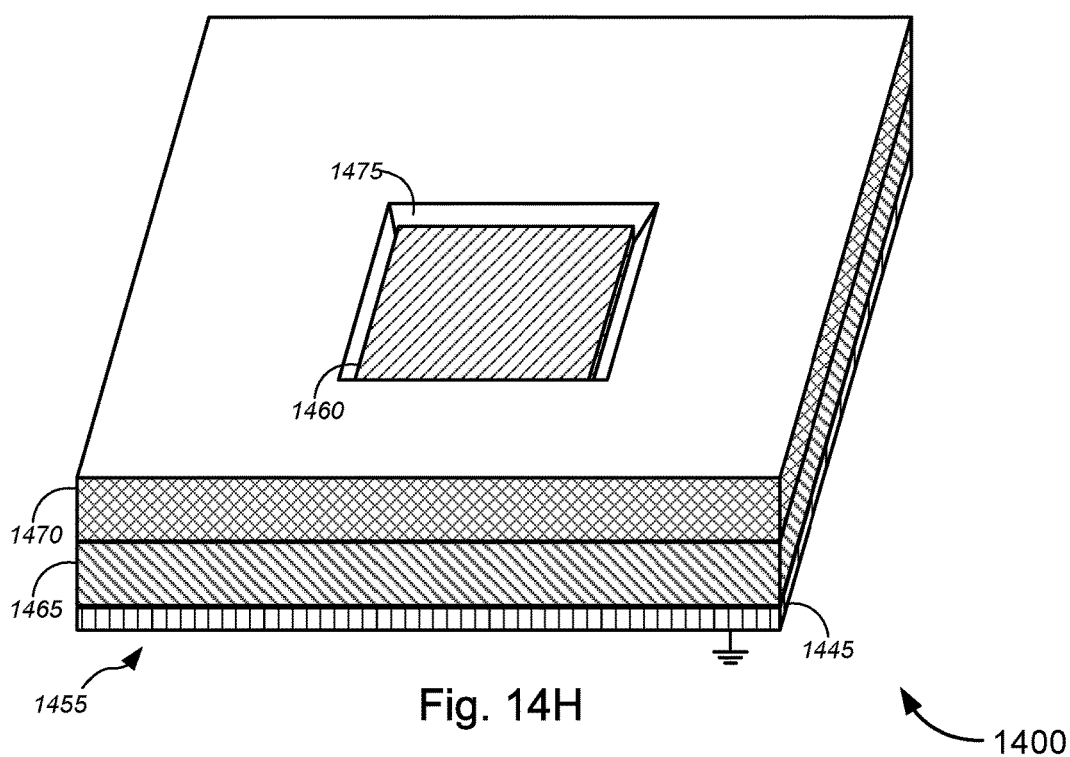

FIGS. 14G and 14H illustrate antennas without and with additional elements (including, without limitation, additional directing elements, a second dielectric layer, optional elements atop the second dielectric layer, and/or the like), respectively, that may be added to the planar structure to further direct antenna radiation patterns to predetermined angles (e.g., lower or higher elevation angles, or the like). In FIG. 14G, antenna 1455 might comprise a patch antenna 1460, which might include a planar patch antenna, an L-patch antenna, or the like. Antenna 1455 might further comprise a dielectric substrate 1465 on which patch antenna 1460 might be disposed. Antenna 1455 might further comprise a ground plane 1445. Dielectric substrate 1465 and ground plane 1445, in some embodiments, might be similar, or identical to, dielectric substrate 1440 and ground plane 1445, respectively, described above with respect to FIGS. 14E and 14F, and thus the corresponding descriptions of dielectric substrate 1440 and ground plane 1445 above apply similarly to dielectric substrate 1465 and ground plane 1445. In some instances, the dimensions of each of dielectric substrate 1465 and ground plane 1445 of FIGS. 14G-14H might differ from the dimensions of each of dielectric substrate 1440 and ground plane 1445 of FIGS. 14E-14F, respectively. In still other cases, dielectric substrate 1465 and dielectric substrate 1440 might differ in terms of their corresponding dielectric material having different dielectric constant (or relative permittivity) $\varepsilon_r$ (although in some embodiments, the dielectric constant or relative permittivity $\varepsilon_r$ of each of dielectric substrate 1465 ($\varepsilon_{r1}$) and dielectric substrate 1440 ($\varepsilon_r$) might range between about 3 and 10).

In FIG. 14H, antenna 1455 might further comprise additional elements 1470, which might include, but are not limited to, additional directing elements, a second dielectric layer, optional elements atop the second dielectric layer, and/or the like. The additional elements 1470 serve to further direct antenna radiation patterns to predetermined angles (e.g., lower or higher elevation angles, or the like). FIG. 4 illustrates radiation patterns for some exemplary planar antennas. The additional elements 1470 might comprise opening 1475, which might be configured to have either a perpendicular inner wall or a tapered inner wall, in order to facilitate focusing of the radiation patterns. In some embodiments the dielectric constant or relative permittivity $\varepsilon_{r2}$ of additional elements 1470 is chosen to be less than the dielectric constant or relative permittivity $\varepsilon_{r1}$ of dielectric substrate 1465. With a lower dielectric constant or relative permittivity compared with that of the dielectric substrate 1465 below it, the additional elements 1470 might focus the radiation patterns or signals closer to the horizon.

FIGS. 14G and 14H show an antenna 1455 including a single patch antenna 1455, which could include a planar patch antenna, an L-patch antenna, or the like. In some instances, the single antenna 1455 might be part of a larger array of antennas, while, in other cases, the single antenna 1455 might be a stand-alone antenna. For the purposes of illustration, only a single antenna is shown in FIGS. 14G and 14H to simplify the description thereof.

FIGS. 14I-14K show embodiments of reversed F antennas or planar inverted F antennas ("PIFA"), which are typically used for wide, yet directed antenna radiation patterns. As shown in FIG. 14I, a plurality of PIFA elements 1490 can be placed around the top (i.e., an annulus or crown) of a pedestal or other signal distribution device, thus achieving a good omnidirectional coverage around the signal distribution device, focused at low elevation (i.e., horizon bore sight). The signal distribution device might include, but is not limited to, one or more hand holes 115, one or more flowerpot hand holes 120, one or more pedestal platforms 125, one or more network access point ("NAP") platforms 130, one or more fiber distribution hub ("FDH") platforms 135, and/or the like. According to some embodiments, some PIFA elements can be placed inside pedestal plastic structures.

In the embodiment shown in FIG. 14I, in particular, antenna 1480 might comprise a plurality of PIFA elements 1490 disposed on base portion 1485. In this embodiment, 4 PIFA elements 1490 are shown disposed at different corners of a square base portion 1485, which might be disposed on/in a top portion (e.g., upper portion 235a), annulus (e.g., annular ring mount 235a"), crown, or lid (e.g., lid 215) of a pedestal (e.g., pedestal 125), though the various embodiments may include any suitable number of PIFA elements 1490. For example, 2 or 4 more PIFA elements might be placed on each side of the base portion 1485.

As shown in FIGS. 14I-14K, each PIFA element 1490 might comprise an antenna portion 1490a, a shorting pin 1490b, a feed point 1490c, and a ground plane 1445. In some embodiments, the antenna portion 1490a might be a rectangular segment having length, width, and area dimensions configured to transmit and receive rf signals having particular frequencies. The shorting pin 1490b might be one of a rectangular segment having a width that is the same as the width of the antenna portion 1490a, a rectangular segment having a width smaller than the width of the antenna portion 1490a, or a wire connection, and the like. The feed point 1490c might, in some instances, include one of a pin structure, a block structure, a wire connection, and/or the like. The feed point 1490c might communicatively couple to cable 1450, which might communicatively couple to one of the at least one optical fiber line, the at least one conductive signal line, and/or the like that are provided in the one or more conduits 105. Like in the embodiment of FIG. 14F, the grounding lead for each cable 1450 may be electrically coupled to the ground plane 1445. In some cases, the ground plane 1445 might be circular (as shown, e.g., in FIGS. 14I and 14K), rectangular, square, or some other suitable shape.

In some embodiments, several PIFA elements 1490 may be combined in a similar manner as described above with respect to the combiner/divider 1450a (in FIG. 14F). Alternatively, some or all of the PIFA elements 1490 may be left independent for a MIMO antenna array (as also described above). According to some embodiments, some PIFA elements might further comprise dielectric substrates, not unlike the dielectric substrates described above with respect to FIGS. 14E-14H.

Although the above embodiments in FIGS. 14A-14K refer to customized transceiver or radio elements, some embodiments might utilize commercial grade radio equipment with built-in smart antennas. Many Wi-Fi radio manufacturers are improving antennas to include arrays that are well-suited for adapting to difficult propagation environments, such as ones created by a low pedestal or hand hole with obstructing buildings around. Placing such commercial devices with good smart antenna capabilities in the top (i.e., dome, cover, or lid) of the pedestal (or in the lid of hand holes) may achieve sufficient results in limited reach scenarios.

Further, although the various antenna types described above are described as stand-alone or independent antenna options, the various embodiments are not so limited, and the various antenna types may be combined into a single or group of sets of antennas. For example, the planar waveguide antennas of FIGS. 14E-14H may be combined with lateral microstrip patch arrays of FIGS. 14A-14D and/or with the lateral PIFA arrays of FIGS. 14I-14K, due to their different (and sometimes complementary) main orientations. Lateral arrays can, for instance, provide good access to nearby homes, whereas top leaky waveguide antennas can add access to a higher location (including, but not limited to, multi-story multi-dwelling units, or the like), or can provide backhaul to a nearby utility pole or structure with another access point, and/or the like.

In some embodiments, antenna 1405, 1430, 1455, or 1480 may be disposed within wireless access point device 1105 of FIGS. 11D and 11E, may be disposed within tray 1205b of wireless access point device 1205 of FIG. 12, may be disposed within tray 1305b or 1305b' of the wireless access point device 1300 of FIGS. 13A-13H, or may be disposed within capping module or dome 1350 or 1350' of the wireless access point device 1300' of FIGS. 13I-13P.

Figure 15A:
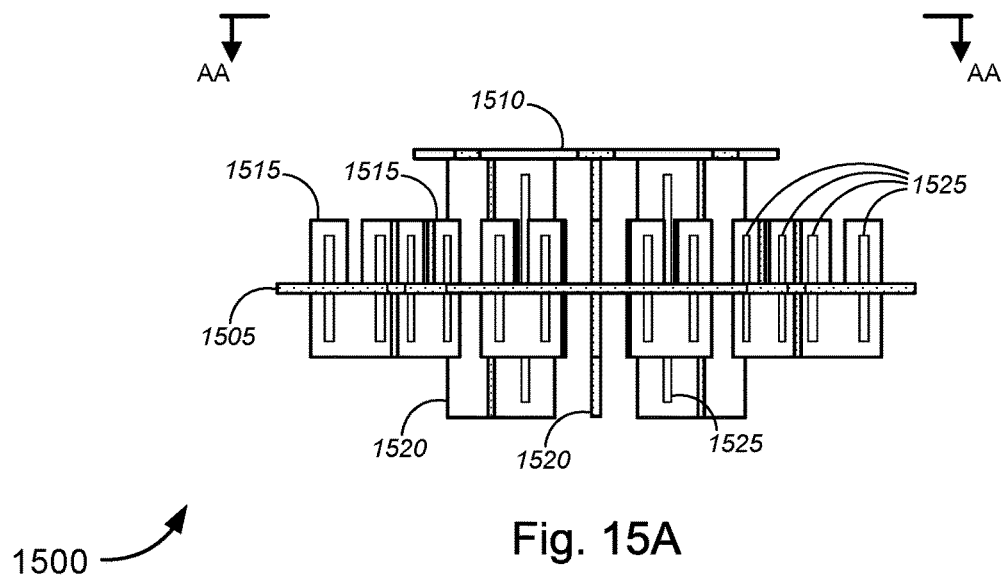
FIGS. 15A and 15B are general schematic diagrams illustrating an exemplary three-dimensional antenna system or antenna design that may be used in the various ground-based signal distribution devices, in accordance with various embodiments.
Figure 15B:
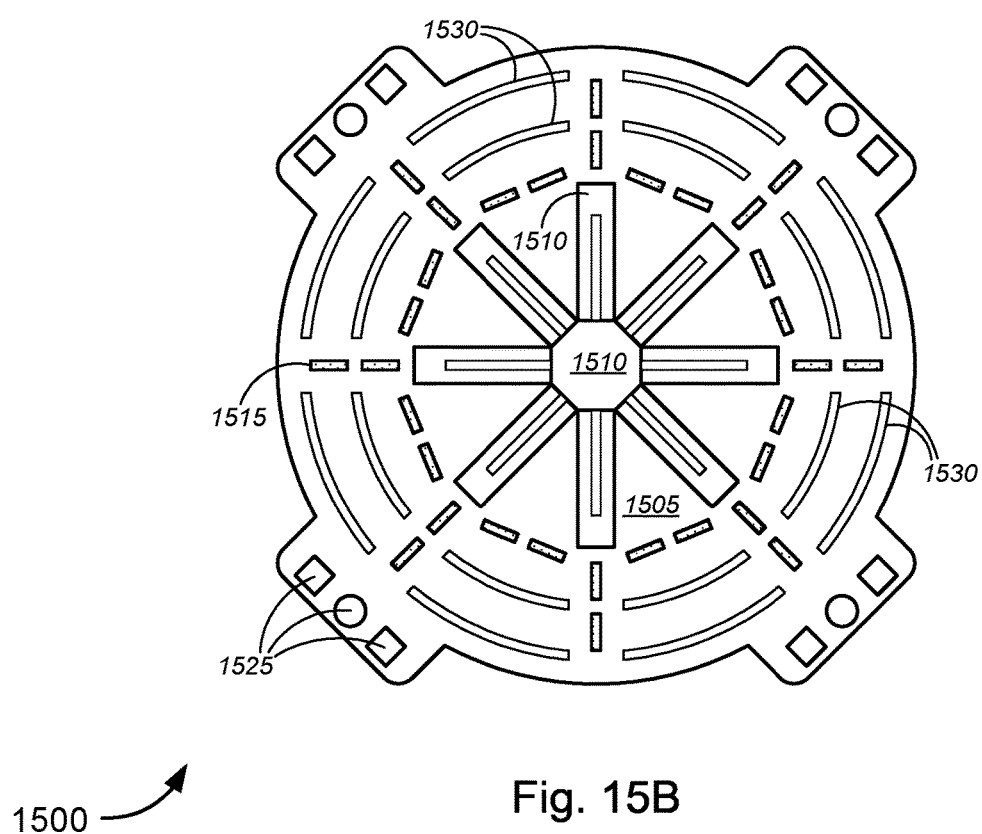

FIGS. 15A and 15B (collectively, "FIG. 15") are general schematic diagrams illustrating an exemplary three-dimensional antenna system or antenna design 1500 that may be used in the various ground-based signal distribution devices, in accordance with various embodiments.

Some access points ("APs") have very small antennas, directly on a circuit board (not shown). These are essentially microstrip patch antennas (similar to the lateral patch antennas of FIGS. 14A-14D), which are a classic, well-known type of antenna that usually comprises a ground plate, a dielectric substrate, and a top conducting layer made of patches of various shapes (including, but not limited to, rectangular, circular, or other radiating element shapes) and feed-lines. The top layer is initially a conducting plane, and is etched to produce whatever design is printed on it.

Some APs have more elaborate antennas, and are still imbedded in a circuit board, but allow for many more elements—some horizontal, some vertical—for beamforming, smart antennas, multiple-input multiple-output ("MIMO"), and/or the like. The more elements, the more antenna patterns can be modified as needed in order to create antenna gain maxima in a direction needed for propagation and/or minima in a direction where an interference is detected.

Antenna patterns are made of combinations of many radiators called antenna elements. Each antenna element is fed by some type of transmission line (including, without limitation, co-axial line, printed circuit board parallel waveguide, etc.). The phase and amplitude of these feeding lines of the many antenna elements combine into a main beam. This combination can be static, in order to design a certain antenna or a given gain, beamwidth, etc. More recently, smart antennas add dynamic aspects, so the phase and gain of each element can be changed to create different antenna needs as required, including, but not limited to, beamforming or beam steering in order to maximize transmission in one direction, or more generally for MIMO. Classic antenna theory designs may be employed to combine all these elements.

Active antenna elements may be fed by feed line signals and may radiate into the air to transmit—and conversely to capture energy from the air and focus it into the feed lines to receive—signals. There is a fundamental reciprocity theorem of electromagnetic signals, so transmit and receive antenna designs are the same—some antennas can be used for both (i.e., duplex mode), while others are used only for direction (i.e., simplex mode), depending on design.

In addition to active antenna elements, there are passive elements used to modify the radiation pattern. Such passive elements are called directors or reflectors. They consist of dipoles (e.g., rods), patches, plates, or the like, of metal or dielectric materials. Usually, large elements placed behind an active element mostly reflect signals, and are called reflectors. Smaller elements placed at appropriate places in front of the active elements are called directors, and they focus the radiated energy a certain way. Multi-antenna systems like that can be passive, where phase can be changed with feed line delays, attenuators, and/or the like. More elaborate (i.e., smart antennas or smart arrays) use active devices that can even amplify signals to some elements.

FIG. 15 depicts an embodiment of an antenna comprising a plurality of antenna elements. In some embodiments, at least one set of antenna elements are active elements that vary feeds to different elements for beam forming, MIMO, and/or the like. Antenna 1500, in some cases, might comprise a main circuit board 1505 comprising a number of antenna elements. Antenna 1500 might also comprise an automatic signal optimizer 1510, which might modify radio frequency ("rf") transmissions based on the orientation of the access point device. Antenna 1500 might further comprise a plurality of first components 1515 and a plurality of second components 1520, the first and second components being of different size, each of the first and second components 1515 and 1520 comprising vertically polarized antenna elements. With reference to FIG. 15B, which is a top plan view of the view shown in FIG. 15A (as shown along the AA-AA direction in FIG. 15A), the main circuit board 1505 might comprise an array of horizontally polarized antenna elements. The antenna 1500, in some embodiments, can integrate high-gain, directional antenna elements (including, but not limited to, the horizontally and vertically polarized antenna elements) to deliver increased signal gain compared to conventional antennas that have only one of horizontally polarized antenna elements or vertically polarized antenna elements. Antennas such as antenna 1500 may be available from Ruckus Wireless, inc. or the like.

FIGS. 16A and 16B (collectively, "FIG. 16") are general schematic diagrams illustrating various systems 1600 for implementing wireless transmission of signals from a wireless access point within or above a ground-based signal distribution device, in accordance with various embodiments.

FIG. 16A depicts a wireless access point device 1205, such as shown and described above with reference to FIGS. 12A-12R and 13A-13H. As shown in FIG. 16A, wireless access point device 1205 might comprise a container 1205a and a lid or tray 1205b. Disposed within the container 1205a might be an access point 1210, while an antenna, antenna array, or antenna system might be disposed within the lid or tray 1205b (not shown). The wireless access point device 1205 might be disposed within a channel 340a of an apical conduit system, the channel being disposed within a roadway 305 (which is on top of a sub-surface or subgrade material 310), as described in detail above. Within the channel 340a may be disposed a first filler material layer 365a and a second filler material layer 365b, both around the wireless access point device 1205. Over or on top of the first and second filler material layers 365, and over or on top of the lid or tray 1205b, a capping material 370 may be disposed.

When implementing a wireless access point within a ground-based structure (such as described above), dielectric and electrical permittivity considerations should be taken into account, including, without limitation, the dielectric and electrical permittivity of the filler or capping layers (which in some embodiments may be a polyurea-based compound), the dielectric and electrical permittivity of a thick lid optionally including antenna elements, or the like. Both of these typically have relative permittivity in the range of 2 to 5, and will work well with embedded antenna elements.

The capping material layer 370 might have a dielectric constant (or relative permittivity) $\varepsilon_r$ of about 2 to 4, while the road surface might have a dielectric constant (or relative permittivity) $\varepsilon_r$ of about 3-5. Good, classic patterns for rf signals (e.g., as depicted by the sets of parallel arrows pointing outward from the wireless access point device 1205 in FIG. 16A) may be achieved. Although the arrows in FIG. 16A are shown pointing outward (indicating transmission), the wireless access point device 1205 may also receive (which might be denoted by arrows pointing inward toward the wireless access point device 1205 (not shown)).

Even better signal transmission/reception may be achieved when the antenna is placed in a hard radome shell (or the like), which might be shaped like standard road markers. FIG. 16B depicts a wireless access point device 1205, such as shown and described above with reference to FIGS. 13I-13P. As shown in FIG. 16A, wireless access point device 1205 might comprise a container 1205a. Disposed within the container 1205a might be an access point 1210, while an antenna, antenna array, or antenna system might be disposed within the enlarged lid, dome, or radome shell 1350 (not shown). The wireless access point device 1205 might be disposed within a channel 340a of an apical conduit system, the channel being disposed within a roadway 305 (which is on top of a sub-surface or subgrade material 310), as described in detail above. Within the channel 340a may be disposed a first filler material layer 365*a* and a second filler material layer 365*b*, both around the wireless access point device 1205. The enlarged lid, dome, or radome shell 1350 may be disposed over or on top of the first and second filler material layers 365, and over container 1205*a*. As shown in FIG. 16B, the surface of the enlarged lid, dome, or radome shell 1350 extends above the roadway surface 305*a*. In some cases, the enlarged lid, dome, or radome shell 1350 might be made of a non-skid material or the like. Better rf signals (compared with the embodiment of FIG. 16A) may be achieved (e.g., as depicted by the sets of parallel arrows pointing outward from the wireless access point device 1205 in FIG. 16B). Although the arrows in FIG. 16B are shown pointing outward (indicating transmission), the wireless access point device 1205 may also receive (which might be denoted by arrows pointing inward toward the wireless access point device 1205 (not shown)).

According to some embodiments, the lid of the wireless access device (e.g., the lid 1205*a* of wireless access point device 1205 of FIGS. 12 and 16A, the lid 1305*b* of wireless access point device 1300 of FIGS. 13A-13H, or the lid 1350 of wireless access point device 1300' of FIGS. 13I-13P and FIG. 16B) may be configured or designed to be ripped and replaced when the road is milled. In some cases, only about 1 to 1.5 inches (i.e., ~2.54 to ~3.81 cm) of the road (and the top coat or capping material) is milled. In such embodiments, remnants of the lid might serve to protect the AP within the container from the process of milling, to be ripped out after the road milling process has been completed. Alternatively, these lids may be salvaged before the road is milled, so as to be reused after re-paving of the road. In such cases, a sacrificial cap might take the place of the lid, so as to protect the AP within the container from the process of milling, to be removed (and replaced with the original lids) after road milling process has been completed or after re-pavement of the road.

Various different ways may be implemented to communicatively couple the AP (in the container) with the antennas (in the lid), including, but not limited to, conducting pegs (e.g., as shown and described with respect to the embodiments of FIGS. 13C, 13D, 13K, and 13L), magnets (not shown), and/or any type of snap-on connectors (e.g., as shown and described with respect to the embodiments of FIGS. 13G, 13H, 13O, and 13P), or the like. According to some embodiments, all active elements might be disposed in the container, while only passive elements are disposed in the lid. Alternatively, the lid might contain all or most of the active and passive elements of the antenna. The coupling between the AP in container and the antenna(s) in the lid can be achieved, in some instances, using co-axial lines, direct contacts, or the like, while coupling, in other cases, might be achieved without use of co-axial lines or direct contacts, but by use of dielectric material for coupling (not shown), in which case the lid might only have passive elements.

Figure 17A:
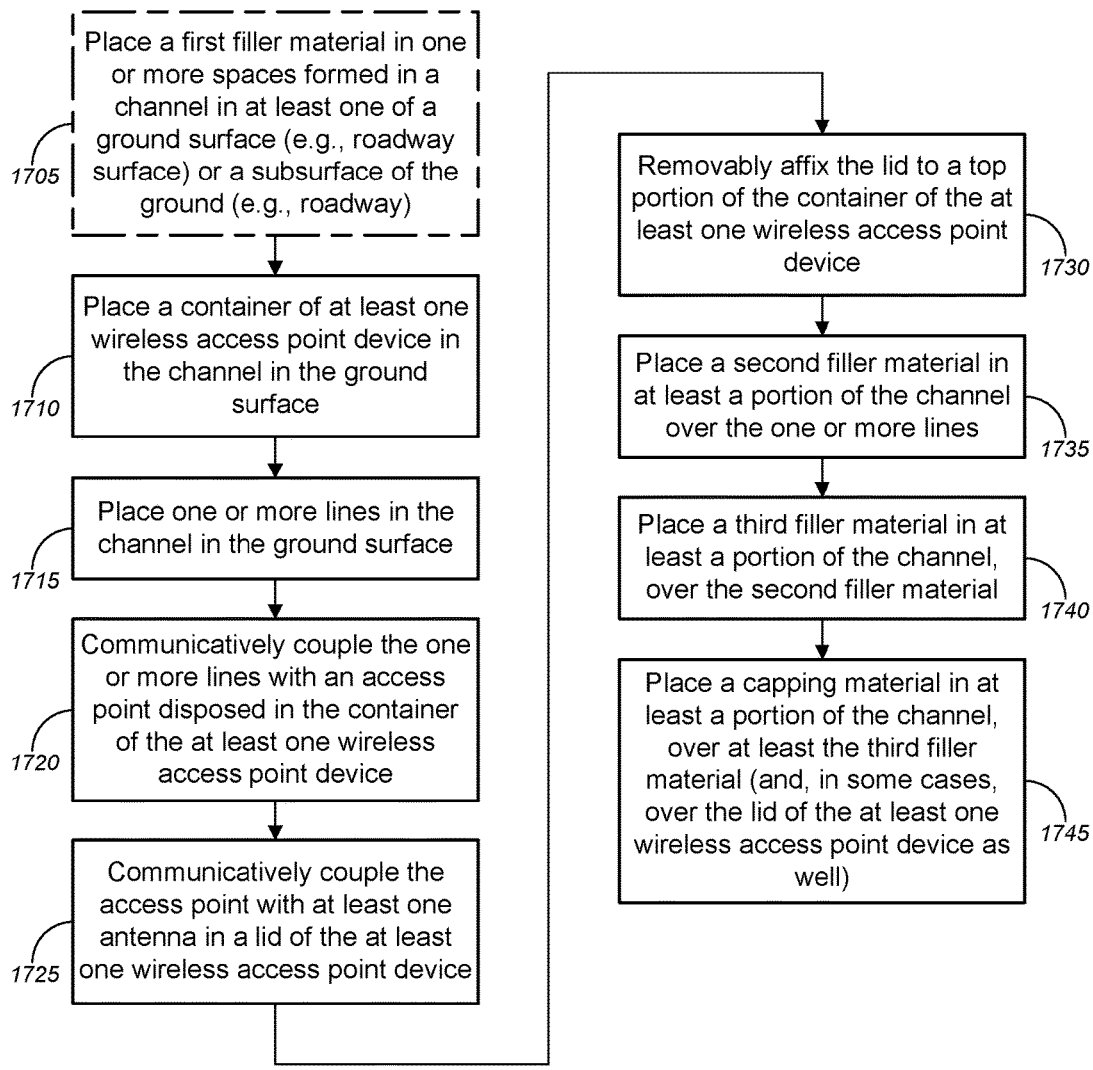
FIGS. 17A and 17B are flow diagrams illustrating various methods for implementing wireless access point service within a channel of an apical conduit system for implementing FTTP and/or point-to-point fiber insertion within a PON communications system, in accordance with various embodiments.
Figure 17B:
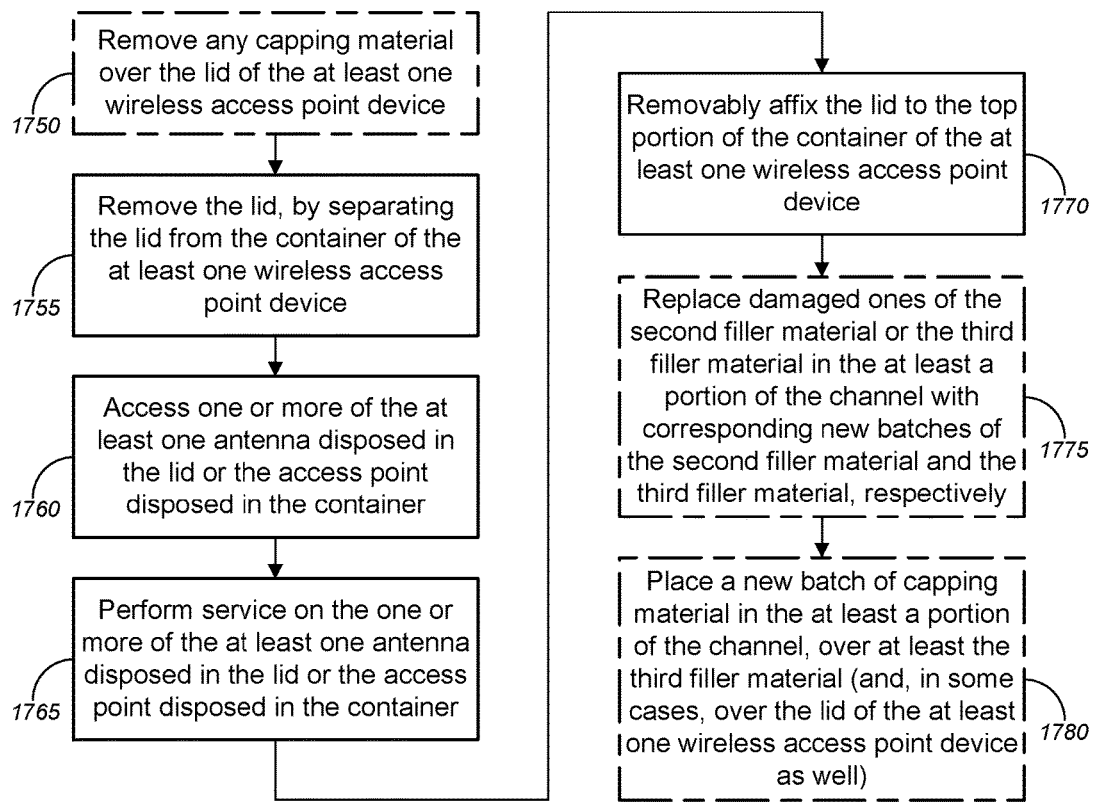

FIGS. 17A and 17B (collectively, "FIG. 17") are flow diagrams illustrating various methods for implementing wireless access point service within a channel of an apical conduit system for implementing FTTP and/or point-to-point fiber insertion within a PON communications system (or alternatively, within an Ethernet fiber communications system, within an EPON, NGPON, or NGPON2 communications system, and/or the like), in accordance with various embodiments. FIG. 17A is directed to a method 1700 of installing at least one wireless access point device, along with one or more lines, within a channel of an apical conduit system, while FIG. 17B is directed to servicing (in some cases, repairing) the access point and/or the antenna(s) in the wireless access point device, after the wireless access point device has been installed in the channel of the apical conduit system. In the embodiment of FIG. 17, the first filler material, the second filler material, and the third filler material correspond to the foam-like third filler material or filler material layer 910, the first filler material or filler material layer 365*a* (i.e., tack coat), and the second filler material or filler material layer 365*b*, respectively, as described above with respect to FIGS. 7-9.

While the techniques and procedures are depicted and/or described in a certain order for purposes of illustration, it should be appreciated that certain procedures may be reordered and/or omitted within the scope of various embodiments. Moreover, while the method illustrated by FIG. 17 can be implemented by or with (and, in some cases, are described below with respect to) the systems 100, 300, 400, 500, 600, 700, 800, 900, 1100, 1200, and/or 1600 of FIGS. 1, 3, 4, 5, 6, 7, 8, 9, 11, 12, and/or 16, respectively (or components thereof) and/or implemented by or with (and, in some cases, are described below with respect to) the apparatuses 1300, 1400, and 1500 of FIGS. 13, 14, and/or 15, respectively, such methods may also be implemented using any suitable hardware implementation. Similarly, while each of the system 100 (and/or components thereof) of FIG. 1, the system 300 (and/or components thereof) of FIG. 3, the system 400 (and/or components thereof) of FIG. 4, the system 500 (and/or components thereof) of FIG. 5, the system 600 (and/or components thereof) of FIG. 6, the system 700 (and/or components thereof) of FIG. 7, the system 800 (and/or components thereof) of FIG. 8, the system 900 (and/or components thereof) of FIG. 9, the system 1100 (and/or components thereof) of FIG. 11, the system 1200 (and/or components thereof) of FIG. 12, the apparatus 1300 (and/or components thereof) of FIG. 13, the apparatus 1400 (and/or components thereof) of FIG. 14, the apparatus 1500 (and/or components thereof) of FIG. 15, and/or the system 1600 (and/or components thereof) of FIG. 16 can operate according to the method illustrated by FIG. 17 (e.g., by executing instructions embodied on a computer readable medium), the systems 100, 300, 400, 500, 600, 700, 800, 900, 1100, 1200, and/or 1400 and/or the apparatuses 1300, 1400, and 1500 can each also operate according to other modes of operation and/or perform other suitable procedures.

In FIG. 17A, method 1700 might comprise, at optional block 1705, placing a first filler material (i.e., foam-like third filler material 910 of FIG. 9, or the like) in one or more spaces (i.e., one or more voids, spaces, volumes, or cavities 905 of FIG. 9, or the like) (if any) that are formed in at least one of a sub-surface/sub-grade of the ground (i.e., the roadway, or the like) or a ground surface (e.g., a roadway surface or the like), below or beyond an intended depth or width of a channel in the ground surface. At block 1710, method 1700 might comprise placing a container of at least one wireless access point device (e.g., container 1205*a* of wireless access point device 1205 of FIGS. 12 and 16, container 1305*a* of wireless access point device 1300 of FIG. 13, or the like) in the channel in the ground surface.

Method 1700 might further comprise, at block 1715, placing one or more lines in the channel in the ground surface. The one or more lines might include, without limitation, at least one of one or more conduits, one or more optical fiber cables, one or more conductive signal lines, one or more power lines, and/or the like. The one or more conductive signal lines might include, but are not limited to, copper data lines, copper video lines, copper voice lines, or any suitable (non-optical fiber) data cables, (non-optical fiber) video cables, or (non-optical fiber) voice cables, and/or the like. Method 1700 might further comprise communicatively coupling the one or more lines with an access point ("AP") device (e.g., access point device disposed in the container 1205a of the at least one wireless access point device 1210 disposed in wireless access point device 1205 of FIGS. 12 and 16, access point device disposed in container 1305a of wireless access point device 1300 of FIG. 13, or the like) that is disposed in the container of the at least one wireless access point device (block 1720) and communicatively coupling the access point with at least one antenna (e.g., antenna, antenna array, or antenna system 1330 of FIG. 13, antenna, antenna array, or antenna systems 1405, 1430, 1455, and 1480 of FIG. 14, antenna, antenna array, or antenna system 1500 of FIG. 15, or the like, as described above with respect to FIGS. 11-16) that is disposed in a lid of the at least one wireless access point device (block 1725).

At block 1730, method 1700 might comprise removably affixing the lid to a top portion of the container of the at least one wireless access point device. In some embodiments, the lid and container might couple in a manner similar to that as described above with respect to FIG. 13, with two or more pegs disposed on the underside of the lid engaged with corresponding two or more grooves disposed on a top portion of the container. In other embodiments, the lid and the container might have complementary threading (e.g., at or near a perimeter of the lid and container, at the relative position of the grooves 1315 of FIG. 13, or the like), such that removably affixing the lid to the top portion of the container might comprise screwing the lid onto the container via the complementary threading. Alternatively, threaded posts may extend upward from the top portion of the container or from the bottom of the container through corresponding openings or posts in the lid, and the lid may be affixed to the container via threaded screws or bolts that engage with the threaded posts. In some cases, a waterproof cap may be used to cover the tops of the screws, and may be configured to be flush with the top surface of the lid (not shown). Such embodiments with the bolted-on lids may be implemented with any shape of container/lid, but more particularly with the non-circular containers/lids. Although not shown in the figures, rubber seals, grommets, and/or the like may be disposed grooves around or near a perimeter portion of the lid and/or top portion of the container, such that when the lid is affixed to the container, a waterproof seal is formed between the lid and the container. In the embodiments having the bolted-on lids, similar seals, grommets, and/or grooves may additionally surround the posts or openings and the waterproof cap, as appropriate. For the embodiments other than the peg/groove interface, wire connectors (e.g., wire connectors 1335, such as shown and described with respect to FIGS. 13G, 13H, 13O, and 13P, or the like) may be used.

Method 1700, at block 1735, might comprise placing a second filler material (i.e., a tack coat or first filler material 365a of FIGS. 3D and 7-9) in at least a portion of the channel, over at least a portion of the one or more lines (and, in some cases, around the wireless access point device). Method 1700 might further comprise placing a third filler material (i.e., second filler material 365b of FIGS. 3D and 7-9) in at least a portion of the channel, over the one or more lines (and, in some cases, over the second filler material as well) (block 1740) and placing a capping material in at least a portion of the channel, above the third filler material (and, in some cases, over the lid of the at least one wireless access point device as well) (block 1745). In some embodiments, the first filler material might include a structural foam that expands to fill any spaces (i.e., the void, space, volume, or cavity 905 or the like), while the second filler material might include a first thermosetting material or the like, and the third filler material might include a second thermosetting material or the like that has a hardness factor higher than that of the first thermosetting material or the like. In some cases, the structural foam might include, without limitation, a polyurea-based foam, while the first thermosetting material might include, without limitation, a first type or compound of polyurea or the like, and the second thermosetting material might include, without limitation, a second type or compound of polyurea or the like. The capping material, in some cases, might serve as road lines on the roadway surface.

To perform service on the at least one antenna and/or the access point, it is necessary to access the at least one wireless access point device in the channel of the apical conduit system. Here, service to be performed might include, without limitation, repairing, testing, trouble-shooting, upgrading, updating, replacing, and/or the like, one or more components (or at least the components if not the entire device) of the at least one antenna and/or the access point. FIG. 17B depicts a method 1700' for perform such servicing. Referring to FIG. 17B, method 1700' might comprise, at optional block 1750, removing any capping material that is over the lid of the at least one wireless access point device (i.e., this is particularly applicable for embodiments such as shown and described with reference to FIGS. 12, 13A-13H, and 16A, or the like).

At block 1755, method 1700' might comprise removing the lid, by separating the lid from the container of the at least one wireless access point device. Method 1700' might further comprise accessing one or more of the at least one antenna disposed in the lid or the access point disposed in the container (block 1760) and performing service (including, but not limited to, repairs, testing, trouble-shooting, upgrading, updating, replacement, and/or the like) on the one or more of the at least one antenna disposed in the lid or the access point disposed in the container (block 1765).

Method 1700', at block 1770, might comprise removably affixing the lid to the top portion of the container of the at least one wireless access point device (similar to the process at block 1730 of FIG. 17A). Method 1700' might further comprise replacing damages ones of the second filler material or the third filler material in the at least a portion of the channel with corresponding new batches of the second filler material and the third filler material, respectively (optional block 1775), and/or placing a new batch of capping material in the at least a portion of the channel, over at least the third filler material (and, in some cases, over the lid of the at least one wireless access point device as well) (optional block 1780; similar to the process at block 1745 of FIG. 17A).

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   placing at least one wireless access point device in a channel in a ground surface;
   placing one or more lines in the channel;
   communicatively coupling the one or more lines with the at least one wireless access point device;
   placing one or more first layers of filler material in at least a portion of the channel over the one or more lines; and
   placing one or more additional layers of filler material in at least a portion of the channel around the at least one wireless access point device and over the one or more first layers of filler material, after the one or more first layers of filler material have set, with the one or more lines having floated on, adhered to, or been at least partially surrounded by the first layer of filler material prior to the first layer of filler material setting;
   wherein each of the at least one wireless access point device comprises a device container, a device lid, an access point device disposed in the device container, and an antenna disposed in the device lid, the access point device being communicatively coupled to at least one of the one or more lines via one or more pass-throughs in at least one wall of the device container, and the antenna being communicatively coupled to the access point device.

2. The method of claim 1, wherein at least one of the one or more lines comprises at least one of one or more telecommunications lines, one or more power lines, one or more cables, one or more optical fiber cables, or one or more conduits.

3. The method of claim 1, wherein at least one of the one or more first layers of filler material prevents the one or more lines from floating into any of the one or more additional layers of filler material.

4. The method of claim 1, wherein at least one of one or more first layers of filler material comprises a soft material that can be cut or otherwise opened to expose the one or more lines without harm to the one or more lines.

5. The method of claim 1, wherein at least one of the one or more additional layers of filler material is a hard material that cannot easily be cut or otherwise opened to expose the one or more lines without harm to the one or more lines.

6. The method of claim 1, wherein at least one of the one or more first layers of filler material comprises polyurea, and wherein at least one of the one or more additional layers of filler material comprises polyurea.

7. The method of claim 1, wherein a top surface of the device lid is below a surface of the ground, wherein the method further comprises:
   placing a capping material in at least a portion of the channel over the device lid of the at least one wireless access point device and over the one or more additional layers of filler material.

8. The method of claim 7, wherein the capping material comprises a shearable top coat that can be sheared without harming any of the one or more lines.

9. The method of claim 1, wherein a top surface of the device lid extends above a surface of the ground, wherein the method further comprises:
   placing a capping material in at least a portion of the channel over the one or more additional layers of filler material.

10. The method of claim 1, wherein the antenna transmits and receives wireless broadband signals according to a set of protocols selected from a group consisting of IEEE 802.11a, IEEE 802.11b, IEEE 802.11g, IEEE 802.11n, IEEE 802.11ac, IEEE 802.11ad, and IEEE 802.11af.

11. The method of claim 1, wherein the antenna transmits and receives wireless broadband signals according to a set of protocols selected from a group consisting of Universal Mobile Telecommunications System ("UMTS"), Code Division Multiple Access ("CDMA"), Long Term Evolution ("LTE"), Personal Communications Service ("PCS"), Advanced Wireless Services ("AWS"), Emergency Alert System ("EAS"), and Broadband Radio Service ("BRS").

12. The method of claim 1, wherein the antenna comprises at least one of a plurality of lateral patch antennas, a plurality of arrays of patch antennas, a two-dimensional ("2D") leaky waveguide antenna, or a three-dimensional ("3D") array of antenna elements.

13. The method of claim 1, wherein the antenna comprises at least one active antenna element.

14. The method of claim 1, further comprising:
   removing the device lid;
   accessing one or more of the antenna disposed in the device lid or the access point device disposed in the device container; and
   performing service on the one or more of the antenna disposed in the device lid or the access point device disposed in the device container.

15. An system, comprising:
   at least one wireless access point device disposed in a channel in a ground surface;
   one or more lines disposed in the channel, the one or more lines communicatively coupled with the at least one wireless access point device;
   one or more first layers of filler material disposed in at least a portion of the channel over the one or more lines; and
   one or more additional layers of filler material disposed in at least a portion of the channel around the at least one wireless access point device and over the one or more first layers of filler material;
   wherein each of the at least one wireless access point device comprises a device container, a device lid, an access point device disposed in the device container, and an antenna disposed in the device lid, the access point device being communicatively coupled to at least one of the one or more lines via one or more pass-throughs in at least one wall of the device container, and the antenna being communicatively coupled to the access point device.

16. The system of claim 15, wherein at least one of the one or more lines comprises at least one of one or more telecommunications lines, one or more power lines, one or more cables, one or more optical fiber cables, or one or more conduits.

17. The system of claim 15, wherein at least one of the one or more first layers of filler material prevents the one or more lines from floating into any of the one or more additional layers of filler material.

18. The system of claim 15, wherein at least one of one or more first layers of filler material comprises a soft material that can be cut or otherwise opened to expose the one or more lines without harm to the one or more lines.

19. The system of claim 15, wherein at least one of the one or more additional layers of filler material is a hard material that cannot easily be cut or otherwise opened to expose the one or more lines without harm to the one or more lines.

20. The system of claim 15, wherein at least one of the one or more first layers of filler material comprises polyurea, and wherein at least one of the one or more additional layers of filler material comprises polyurea.

21. The system of claim 15, wherein a top surface of the device lid is below a surface of the ground, wherein a capping material is disposed in at least a portion of the channel over the device lid of the at least one wireless access point device and over the one or more additional layers of filler material, wherein the capping material comprises a shearable top coat that can be sheared without harming any of the one or more lines.

22. The system of claim 15, wherein a top surface of the device lid extends above a surface of the ground, wherein a capping material is disposed in at least a portion of the channel over the one or more additional layers of filler material, wherein the capping material comprises a shearable top coat that can be sheared without harming any of the one or more lines.

23. The system of claim 15, wherein the antenna comprises at least one of a plurality of lateral patch antennas, a plurality of arrays of patch antennas, a two-dimensional ("2D") leaky waveguide antenna, or a three-dimensional ("3D") array of antenna elements.

24. The system of claim 15, wherein the antenna comprises at least one active antenna element.

25. The system of claim 15, wherein the ground surface is a roadway surface.

\* \* \* \* \*